(12) United States Patent
Janecek

(10) Patent No.: US 12,374,976 B2
(45) Date of Patent: Jul. 29, 2025

(54) ELECTRIC MOTOR

(71) Applicant: Electric Torque Machines, Inc., Minneapolis, MN (US)

(72) Inventor: Thomas F. Janecek, Flagstaff, AZ (US)

(73) Assignee: Electric Torque Machines, Inc., Minneapolis, MN (US)

( * ) Notice: Subject to any disclaimer, the term of this patent is extended or adjusted under 35 U.S.C. 154(b) by 184 days.

(21) Appl. No.: 18/018,145

(22) PCT Filed: Aug. 11, 2021

(86) PCT No.: PCT/US2021/045502
§ 371 (c)(1),
(2) Date: Jan. 26, 2023

(87) PCT Pub. No.: WO2022/035940
PCT Pub. Date: Feb. 17, 2022

(65) Prior Publication Data
US 2023/0353026 A1 Nov. 2, 2023

Related U.S. Application Data

(60) Provisional application No. 63/163,995, filed on Mar. 22, 2021, provisional application No. 63/064,429, filed on Aug. 12, 2020.

(51) Int. Cl.
*H02K 21/14* (2006.01)
*H02K 1/14* (2006.01)
(Continued)

(52) U.S. Cl.
CPC .......... *H02K 21/145* (2013.01); *H02K 1/145* (2013.01); *H02K 1/278* (2013.01); *F04D 25/06* (2013.01); *H02K 2201/12* (2013.01)

(58) Field of Classification Search
CPC ....... H02K 21/145; H02K 1/145; H02K 1/278
See application file for complete search history.

(56) References Cited

U.S. PATENT DOCUMENTS 2,243,318 A 5/1941 William
5,306,183 A 4/1994 Holt et al.
(Continued)

FOREIGN PATENT DOCUMENTS

DE 29500878 U1 10/1995
DE 102009012478 A1 * 9/2010 ............... H02K 3/30
(Continued)

OTHER PUBLICATIONS

DE-102009012478-A1_translate (Year: 2010).*
(Continued)

*Primary Examiner* — Tulsidas C Patel
*Assistant Examiner* — Mohammed Ahmed Qureshi
(74) *Attorney, Agent, or Firm* — Kinney & Lange, P.A.

(57) ABSTRACT

An electric motor includes a rotor and a stator formed by a plurality of stator phases. The stator phases include coils that extend fully about the motor axis of the motor. The stator phases further includes flux rings disposed on opposite axial sides of the coil and that are joined by axial returns. The stator phases electromagnetically drive rotation of the rotor on the motor axis.

20 Claims, 23 Drawing Sheets

(51) Int. Cl.
*H02K 1/278* (2022.01)
*F04D 25/06* (2006.01)

(56) References Cited

U.S. PATENT DOCUMENTS

| | | |
|---|---|---|
| 6,924,579 B2 | 8/2005 | Calley |
| 7,199,500 B2 | 4/2007 | Yoshia |
| 7,626,308 B2 | 12/2009 | Kang et al. |
| 7,876,019 B2 | 1/2011 | Calley |
| 8,242,658 B2 | 8/2012 | Calley et al. |
| 8,395,291 B2 | 3/2013 | Calley et al. |
| 8,405,275 B2 | 3/2013 | Calley et al. |
| 8,415,848 B2 | 4/2013 | Calley et al. |
| 8,749,108 B2 | 6/2014 | Dyer et al. |
| 8,760,023 B2 | 6/2014 | Calley et al. |
| 8,854,171 B2 | 10/2014 | Janecek |
| 8,952,590 B2 | 2/2015 | Calley et al. |
| 8,970,205 B2 | 3/2015 | Janecek et al. |
| 8,994,243 B2 | 3/2015 | Calley et al. |
| 9,006,951 B2 | 4/2015 | Janecek et al. |
| 9,236,773 B2 | 1/2016 | Janecek et al. |
| 9,360,020 B2 | 6/2016 | Janecek |
| 9,509,181 B2 | 11/2016 | Janecek et al. |
| 9,618,003 B2 | 4/2017 | Janecek et al. |
| 9,749,108 B2 | 8/2017 | Hoshino et al. |
| 11,646,635 B2 | 5/2023 | Janecek et al. |
| 2002/0074891 A1 | 6/2002 | Gieras et al. |
| 2004/0046478 A1 | 3/2004 | Zierer et al. |
| 2005/0012427 A1 | 1/2005 | Seki et al. |
| 2009/0206696 A1 | 8/2009 | Calley |
| 2011/0221298 A1 | 9/2011 | Calley et al. |
| 2012/0119599 A1 | 5/2012 | Calley et al. |
| 2012/0119609 A1 | 5/2012 | Janecek |
| 2012/0234108 A1 | 9/2012 | Janecek et al. |
| 2012/0235519 A1 | 9/2012 | Dyer et al. |
| 2013/0002068 A1 | 1/2013 | Miyasaka et al. |
| 2013/0015733 A1 | 1/2013 | Rasch et al. |
| 2015/0048712 A1* | 2/2015 | Janecek ............... H02K 15/022 29/596 |
| 2015/0147188 A1 | 5/2015 | Danielsson |
| 2017/0113773 A1 | 4/2017 | Kaiser et al. |
| 2020/0031445 A1 | 1/2020 | We |
| 2020/0083762 A1 | 3/2020 | Nitta et al. |
| 2023/0058117 A1 | 2/2023 | Williams et al. |

FOREIGN PATENT DOCUMENTS

| | | |
|---|---|---|
| DE | 102010018145 A1 | 10/2011 |
| DE | 102011084296 A1 | 4/2013 |
| DE | 112014006362 T5 | 11/2016 |
| EP | 1063754 A2 | 12/2000 |
| EP | 1587207 A1 | 10/2005 |
| EP | 2006977 A2 | 12/2008 |
| EP | 2159903 A2 | 3/2010 |
| EP | 2594477 A1 | 5/2013 |
| EP | 2686939 A2 | 1/2014 |
| EP | 3082231 A1 | 10/2016 |
| GB | 2491880 A | 12/2012 |
| JP | 2009005420 A | 1/2009 |
| WO | 2010064368 A1 | 6/2010 |
| WO | 2012125790 A2 | 9/2012 |
| WO | 2015089518 A1 | 6/2015 |
| WO | 2015163871 A1 | 10/2015 |
| WO | 2021163156 A1 | 8/2021 |
| WO | 2022035940 A1 | 2/2022 |
| WO | 2022066616 A2 | 3/2022 |
| WO | 2022165015 A1 | 8/2022 |
| WO | 2023043904 A1 | 3/2023 |
| WO | 2023055690 A2 | 4/2023 |
| WO | 2023114290 A1 | 6/2023 |

OTHER PUBLICATIONS

International Preliminary Report on Patentability for PCT Application No. PCT/US2021/045502, Dated Feb. 23, 2023, pp. 19.
International Search Report and Written Opinion for PCT Application No. PCT/US2021/045502, Dated Jan. 24, 2022, pp. 26.
Invitation to Pay Additional Fees for PCT Application No. PCT/US2021/045502, Dated Nov. 25, 2021, pp. 23.

* cited by examiner

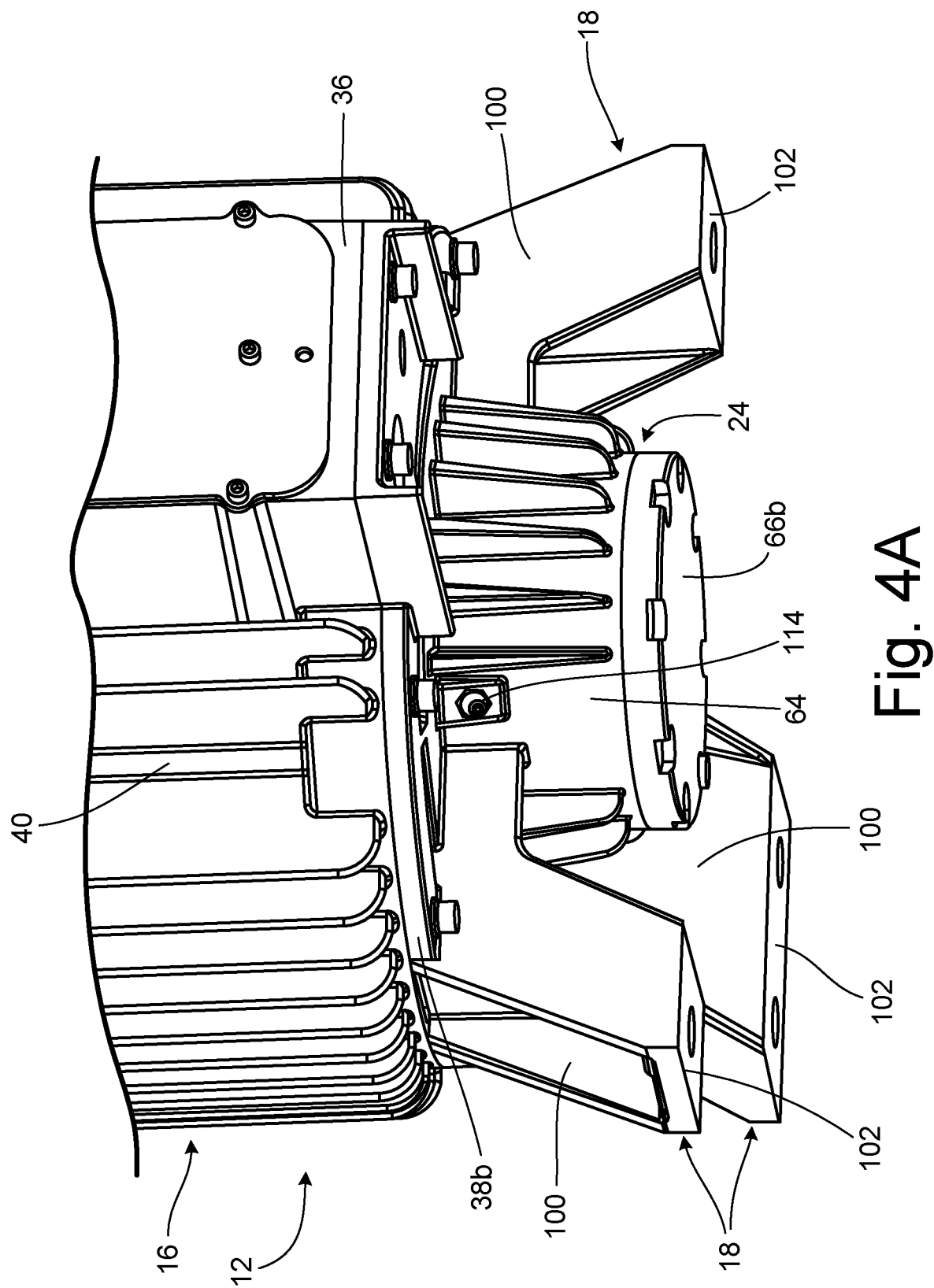

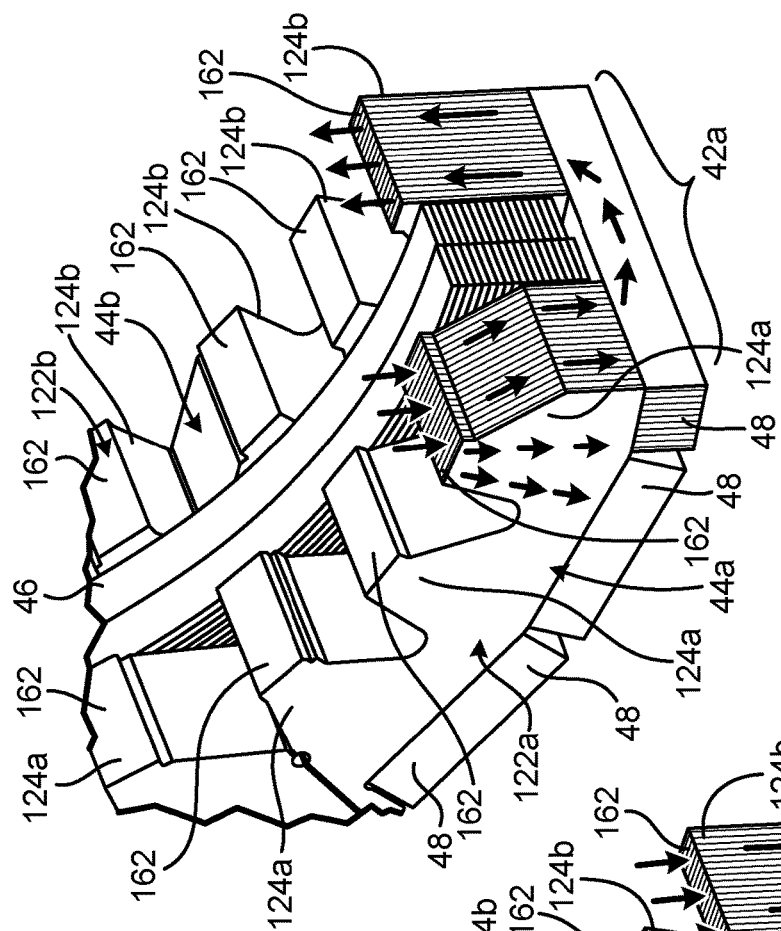
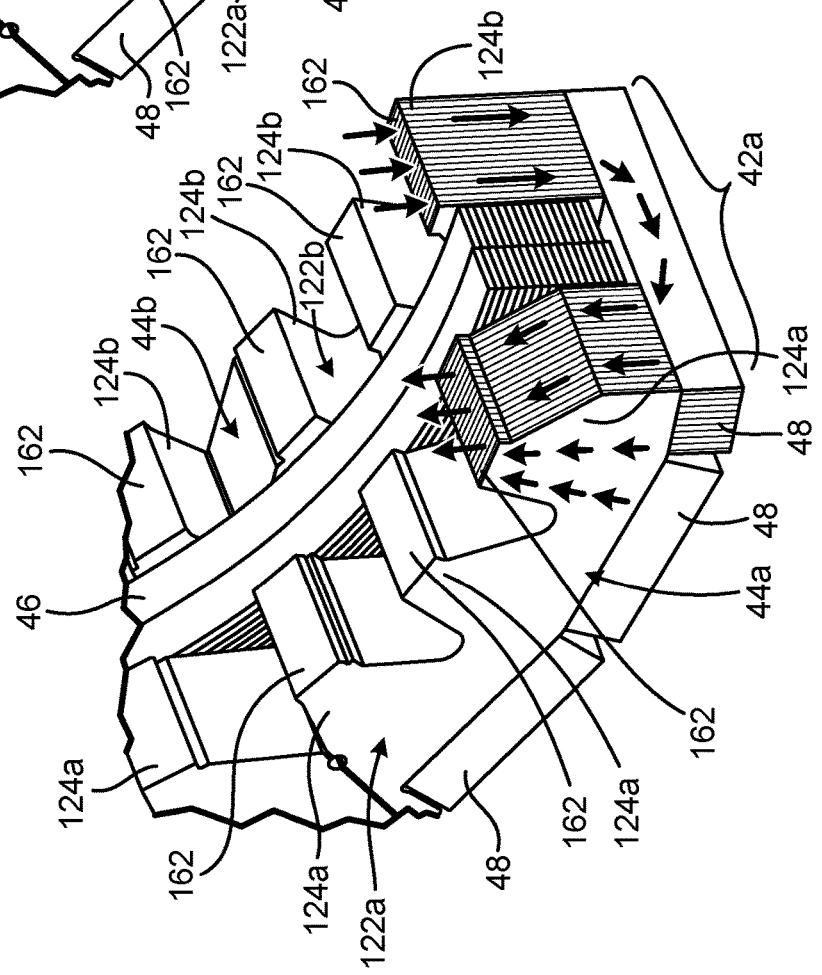

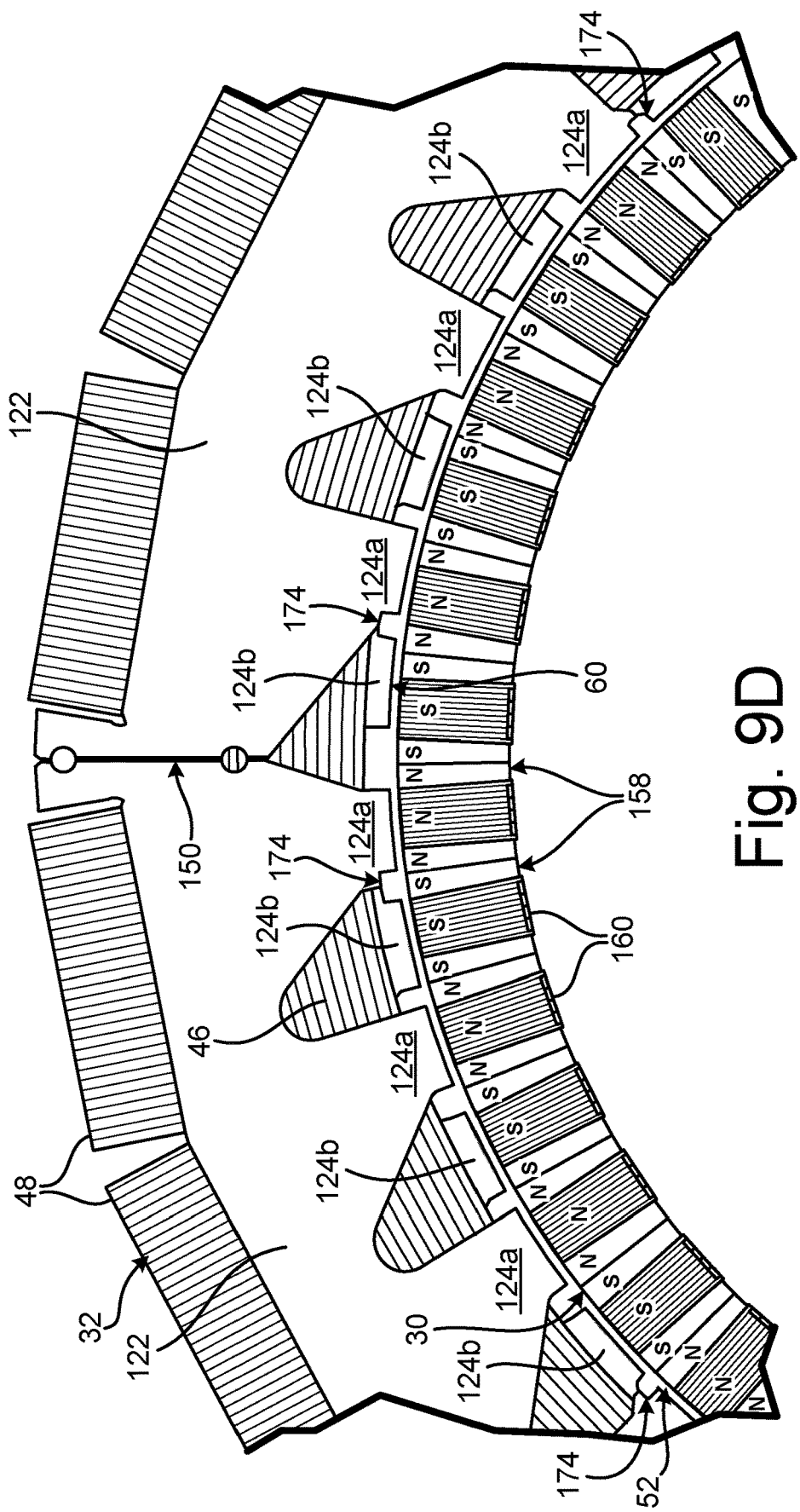

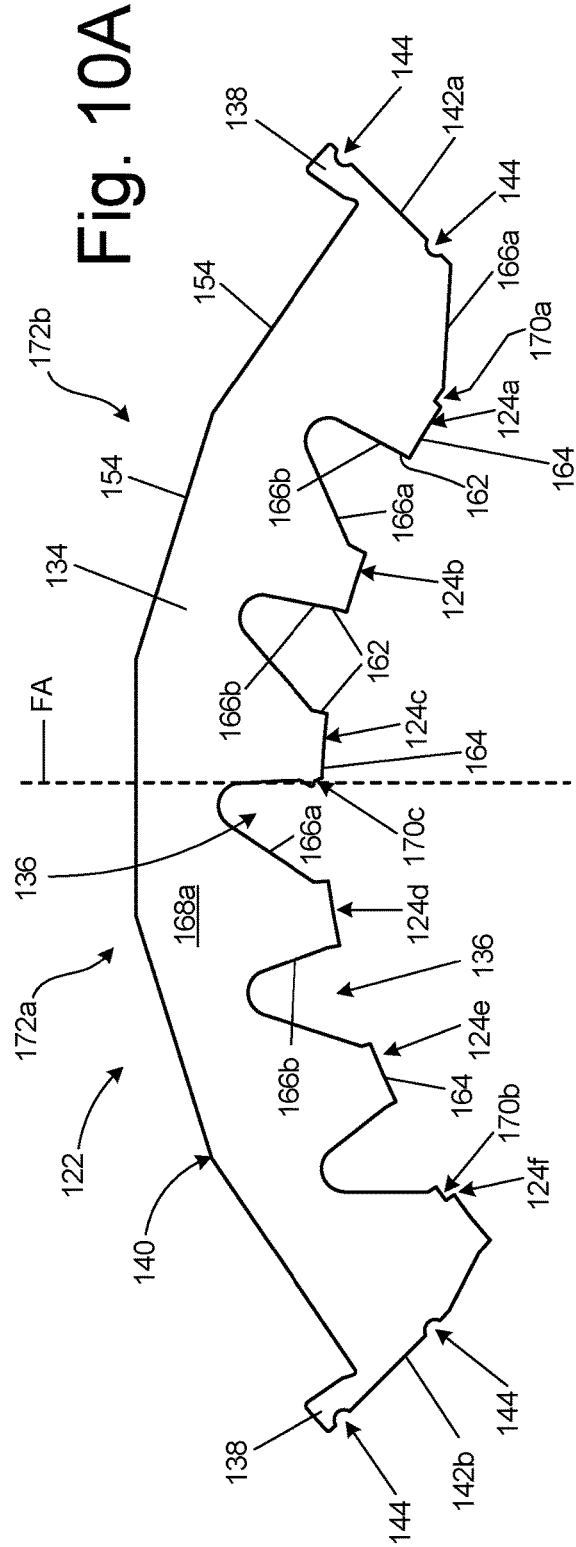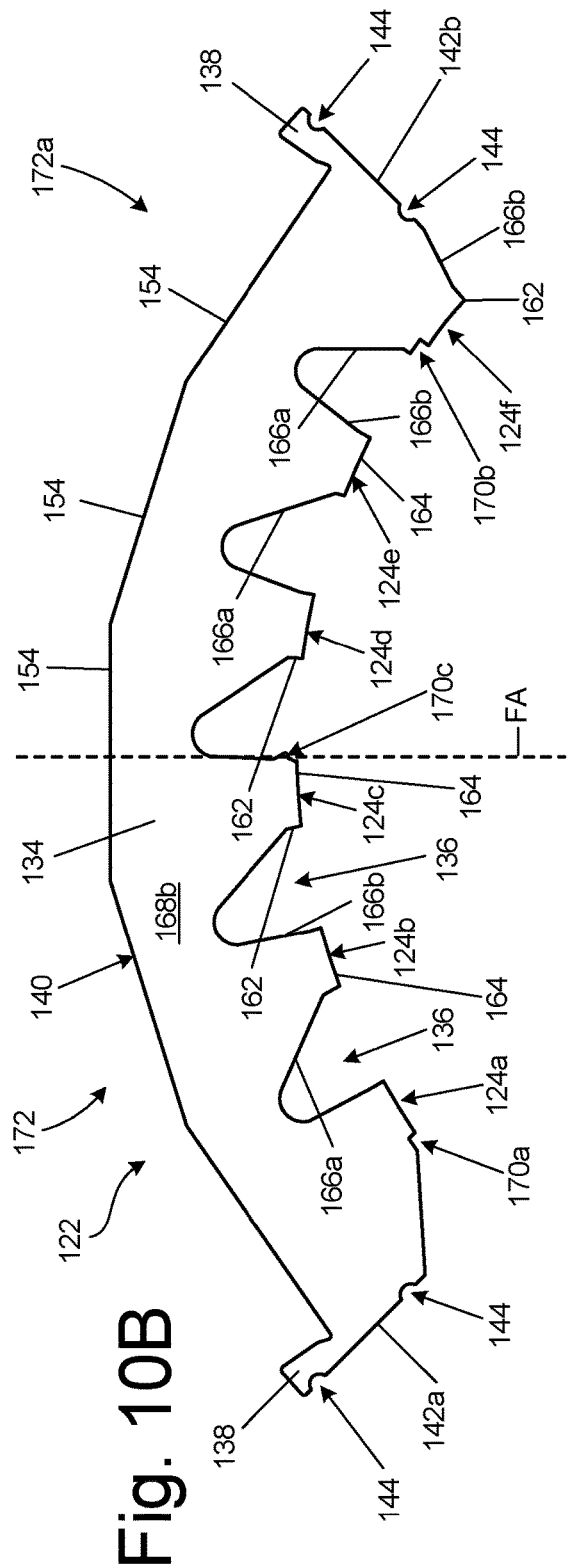

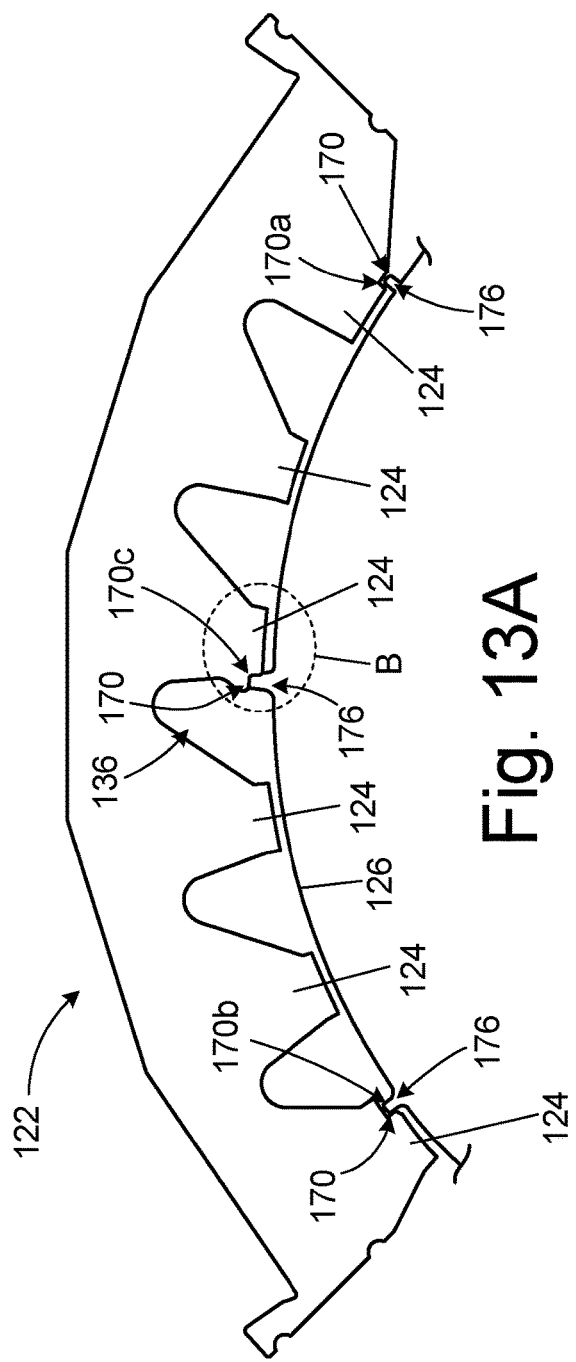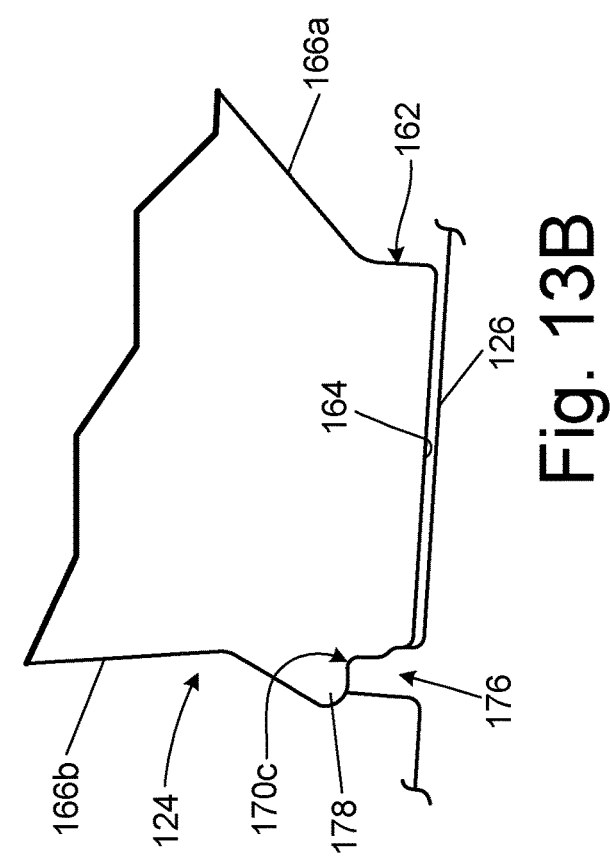

ELECTRIC MOTOR

CROSS-REFERENCE TO RELATED APPLICATION(S)

This application claims the benefit of U.S. Provisional Application No. 63/064,429 filed Aug. 12, 2020 and entitled "ELECTRIC MOTOR," and claims the benefit of U.S. Provisional Application No. 63/163,995 filed Mar. 22, 2021 and entitled "ELECTRIC MOTOR," the disclosures of which are hereby incorporated by reference in their entireties.

BACKGROUND

The present disclosure relates generally to electric machines. More specifically, the present disclosure relates to transverse flux electric machines.

Electric motors utilize electricity to generate a mechanical output. Some electric motors generate rotational outputs. In alternating current (AC) induction motors, a stator is electrically energized to electromagnetically drive rotation of a rotor about a motor axis. The stator includes laminates and windings. The rotor includes permanent magnets that are acted on by the electromagnetic field induced by current through the stator to cause rotation of the rotor. Such electric motors include coils that extend axially relative to the rotational axis and that extend axially beyond the ends of the rotor to wrap around and form the ends of the coil windings.

SUMMARY

According to an aspect of the disclosure, an electric motor includes a rotor configured to rotate on a rotational axis to generate a mechanical output, the rotor comprising a rotor body and a permanent magnet array; and a stator spaced radially relative to the rotor and disposed about the rotational axis. The stator includes a stator phase formed from a first pair of flux rings, a first coil disposed axially between the first pair of flux rings, and an annular array of axial returns extending between the first pair of flux rings to electrically connect the first pair of flux rings. A first flux ring of the pair of flux rings includes a plurality of first ring segments disposed circumferentially about the rotor axis, wherein each first ring segment of the plurality of first ring segments is spaced circumferentially from each adjacent first ring segment of the plurality of first ring segments by a first circumferential gap.

According to an additional or alternative aspect of the disclosure, an electric motor includes a rotor configured to rotate on a rotational axis; and a stator spaced radially relative to the rotor and disposed about the rotational axis. The stator includes a plurality of stator phases. A first stator phase of the plurality of stator phases includes a first flux ring having an annular array of first spurs, a second flux ring having an annular array of second spurs; a first coil disposed axially between the first flux ring and the second flux ring; and a first annular array of axial returns extending between the first flux ring and the second flux ring to electrically connect the first flux ring and the second flux ring. The first spurs are axially offset from the second spurs. The first flux ring is formed from a plurality of first ring segments each including an arcuate array of first spurs. The second flux ring is formed from a plurality of second ring segments each including an arcuate array of second spurs.

According to yet another additional or alternative aspect of the disclosure, a stator segment of an electric motor includes a segment body extending arcuately about an axis; a first circumferential end and a second circumferential end; a first radial side and a second radial side; a first axial face and a second axial face; a plurality of spurs extending from the first radial side of the segment body; and an outer interface surface disposed on the second radial side of the first segment body, the outer interface surface multifaceted such that a plurality of return faces are formed on the outer interface surface. Each spur of the plurality of spurs includes a first side surface extending to a distal end and angled relative to a second side surface that extends to the distal end such that each spur of the plurality of spurs extends circumferentially from the segment body.

According to yet another additional or alternative aspect of the disclosure, a stator phase of an electric motor includes a plurality of first stator segments disposed about a motor axis and forming a first flux ring, the plurality of first stator segments having a first plurality of spurs extending radially therefrom; a plurality of second stator segments disposed about a motor axis and forming a second flux ring, the plurality of second stator segments having a second plurality of spurs extending radially therefrom; a coil disposed axially between the first flux ring and the second flux ring; and a plurality of axial returns extending axially between each first stator segment of the first flux ring and each second stator segment of the second flux ring. Each first stator segment of the plurality of first stator segments has a first configuration and a second configuration, the first configuration and the second configuration defining radial and circumferential locations of each of the first plurality of spurs and first interface surfaces of each first stator segment, and the first interface surfaces configured to interface with the plurality of axial returns. The second configuration is flipped about a radial axis relative to the first configuration. Each second stator segment of the plurality of second stator segments has the first configuration and the second configuration. Each first stator segment of the plurality of first stator segments is in the first configuration to form the first flux ring and each second stator segment of the plurality of second stator segments is in the second configuration to form the second flux ring.

According to yet another additional or alternative aspect of the disclosure, an electric motor includes a rotor configured to rotate on a motor axis; and a stator disposed on the motor axis and spaced radially from the rotor by an air gap. The stator includes a first stator phase having a first annular array of spurs and a second annular array of spurs; and a second stator phase having a third annular array of spurs and a fourth annular array of spurs. The first annular array of spurs is axially aligned with the third annular array of spurs.

According to yet another additional or alternative aspect of the disclosure, an electric motor includes a rotor configured to rotate on a motor axis, wherein the rotor comprises a plurality of rotor phases in which magnets of each rotor phase are circumferentially offset about the motor axis relative to magnets of all other rotor phases of the plurality of rotor phases; and a stator disposed on the motor axis and spaced radially from the rotor by an air gap, wherein the stator comprises a plurality of stator phases in which spurs of each stator phase of the plurality of stator phases are aligned with spurs of all other stator phases of the plurality of stator phases.

According to yet another additional or alternative aspect of the disclosure, a stator for an electric motor includes a first stator phase disposed annularly about an axis and a second stator phase disposed annularly about the axis. The first stator phase includes a first flux ring having a plurality of first spurs disposed in an annular array; a second flux ring having a plurality of second spurs disposed in an annular array; and a first coil disposed axially between the first flux ring and the second flux ring and extending annularly about the axis. The second stator phase includes a third flux ring having a plurality of third spurs disposed in an annular array; a fourth flux ring having a plurality of fourth spurs disposed in an annular array; and a second coil disposed axially between the first third ring and the fourth flux ring and extending annularly about the axis. The first spurs are axially aligned with the third spurs. The second spurs are axially aligned with the fourth spurs.

According to yet another additional or alternative aspect of the disclosure, an electric motor includes a rotor configured to rotate on a motor axis and a stator disposed on the motor axis and spaced radially from the rotor by an air gap. The rotor includes a first rotor phase having a first hub and a first magnet phase supported by the first hub; and a second rotor phase having a second hub and a second magnet phase supported by the second hub. The first magnet phase is circumferentially offset from the second magnet phase.

According to yet another additional or alternative aspect of the disclosure, a stator phase for an electric motor includes a first flux ring having a plurality of first spurs disposed in a first annular array about an axis; a second flux ring having a plurality of second spurs disposed in a second annular array about the axis; a first coil disposed axially between the first flux ring and the second flux ring and extending annularly about the axis; and an axial return extending between the first flux ring and the second flux ring. A return array formed by a plurality of the axial returns extends about the motor axis. The first flux ring is formed by a first laminate stack, the second flux ring is formed by a second laminate stack, and the axial return is formed by a third laminate stack. The stator phase includes a first laminate boundary and a second laminate boundary. The second laminate boundary is at least partially defined by the axial return.

According to yet another additional or alternative aspect of the disclosure, a stator for an electric motor includes a stator housing, a first stator phase disposed within the stator housing and annularly about an axis, and a second stator phase disposed within the stator housing and annularly about the axis. The first stator phase includes a first flux ring; a second flux ring; a first coil disposed axially between the first flux ring and the second flux ring and extending annularly about the axis; and a first plurality of axial returns arrayed about the axis and extending between the first flux ring and the second flux ring. The second stator phase includes a third flux ring; a fourth flux ring; a second coil disposed axially between the third flux ring and the fourth flux ring and extending annularly about the axis; and a second plurality of axial returns arrayed about the axis and extending between the third flux ring and the fourth flux ring. The first plurality of axial returns form a radial-most laminate structure of the first stator phase.

According to yet another additional or alternative aspect of the disclosure, an electric motor includes a rotor configured to rotate on a motor axis to generate a mechanical output, the rotor has a rotor body and a permanent magnet array; and a stator spaced radially relative to the rotor and disposed about the motor axis. The stator includes a first stator phase formed from a first flux ring, a second flux ring, a first coil disposed axially between the first flux ring and the second flux ring, and a first annular array of axial returns extending between the first flux ring and the second flux ring to electrically connect the first flux ring and the second flux ring. Potting compound extends radially between a first radial compound edge and a second radial compound edge. The second radial compound edge is disposed directly between the first annular array of axial returns and an inner wall of a stator housing of the stator at an axial location of the first flux ring.

According to yet another additional or alternative aspect of the disclosure, an electric motor includes a rotor configured to rotate on a motor axis to generate a mechanical output, the rotor comprising a rotor body and a permanent magnet array; and a stator spaced radially relative to the rotor and disposed about the motor axis. The stator includes a first stator phase formed from a first flux ring, a second flux ring, a first coil disposed axially between the first flux ring and the second flux ring, and a first annular array of axial returns extending between the first flux ring and the second flux ring to electrically connect the first flux ring and the second flux ring. The stator has a first radial side facing the rotor and a second radial side facing away from the rotor. A radial-most laminate structure of the second radial side at a first axial location associated with the first flux ring is formed by alternating first regions and second laminate regions, wherein the first laminate regions are formed by axially oriented laminate and the second laminate regions are formed by radially oriented laminate.

According to yet another additional or alternative aspect of the disclosure, a stator phase for an electric motor includes a first flux ring disposed about a motor axis; a second flux ring spaced axially from the first flux ring; a coil disposed axially between the first flux ring and the second flux ring; and a plurality of axial returns extending between the first flux ring and the second flux ring. Each axial return of the plurality of axial returns interfaces with a first outer surface of the first flux ring and a second outer surface of the second flux ring. The plurality of axial returns define a radial edge of the stator phase.

According to yet another additional or alternative aspect of the disclosure, an electric motor includes a rotor configured to rotate about a motor axis; and a stator comprising at least one stator phase with an air gap disposed between the rotor and the stator. The at least one stator phase includes a first plurality of spurs arrayed circumferentially around the motor axis; a second plurality of spurs arrayed circumferentially around the motor axis; a coil that is coaxial with the motor axis and located axially between the first plurality of spurs and the second plurality of spurs; and a potting compound that embeds the first plurality of spurs, the second plurality of spurs, and the coil in a continuous matrix of potting compound. The potting compound extends radially between a first radial edge and a second radial edge, and wherein the first radial edge is disposed at radial locations directly between the first spurs and the rotor.

According to yet another additional or alternative aspect of the disclosure, an electric motor includes a rotor configured to rotate about a motor axis; and a stator comprising a first stator phase formed from a laminate structure; and an air gap disposed radially between the rotor and the stator. The first stator phase is embedded in a continuous matrix of potting compound that extends radially between a first annular surface of the continuous matrix of potting compound that faces the rotor and at least partially defines the air gap and a second annular surface of the continuous matrix of potting compound disposed on an opposite radial side of the continuous matrix of potting compound from the first annular surface. The continuous matrix of potting compound includes a projection extending from the second annular surface, the projection extending radially into a housing gap formed in a stator housing of the stator.

According to yet another additional or alternative aspect of the disclosure, an electric motor includes a motor housing; a rotor configured to rotate on a motor axis; a stator disposed in a stator housing portion of the motor housing and on the motor axis, the stator spaced radially from the rotor by an air gap; a drive shaft operably connected to the rotor to be rotated on the motor axis by the rotor; a first bearing assembly supporting the drive shaft on the motor axis; and a second bearing assembly supporting the drive shaft on the motor axis. The first bearing assembly is disposed in a bearing housing portion of the motor housing. The bearing housing portion extending axially from a first axial end of the stator housing portion.

According to yet another additional or alternative aspect of the disclosure, an electric motor includes a motor housing; a rotor configured to rotate on a motor axis; a stator disposed in a stator housing portion of the motor housing and on the motor axis, the stator spaced radially from the rotor by an air gap; a drive shaft operably connected to the rotor to be rotated on the motor axis by the rotor; a first bearing assembly disposed in a bearing housing portion of the motor housing; and a lubricant system of the first bearing assembly. The lubricant system includes a supply passage through a sidewall of the bearing housing portion, a supply reservoir disposed on a first axial side of the first bearing assembly, a drain passage disposed on a second axial side of the first bearing assembly and extending through the bearing housing portion.

BRIEF DESCRIPTION OF THE DRAWINGS

FIG. 4A is an enlarged isometric view of an axial end of the motor.
FIGS. 9B and 9C are isometric cross-sectional views of a portion of a stator phase that demonstrate how flux circuits are formed through flux paired spurs of a stator phase.
FIG. 9D shows a detailed view of flux paired spurs of a stator phase interacting with concentrators and permanent magnets of a magnet phase of a rotor.
FIG. 10A is a first elevational end view of a single ring segment.

FIG. 10B is a second elevational end view of the single ring segment, taken from an opposite axial side relative to the view in FIG. 10A.
FIG. 13A is an end elevation view of a ring segment showing an inner potting compound edge.
FIG. 13B is an enlarged view of detail B in FIG. 13A.

DETAILED DESCRIPTION

Figure 1:
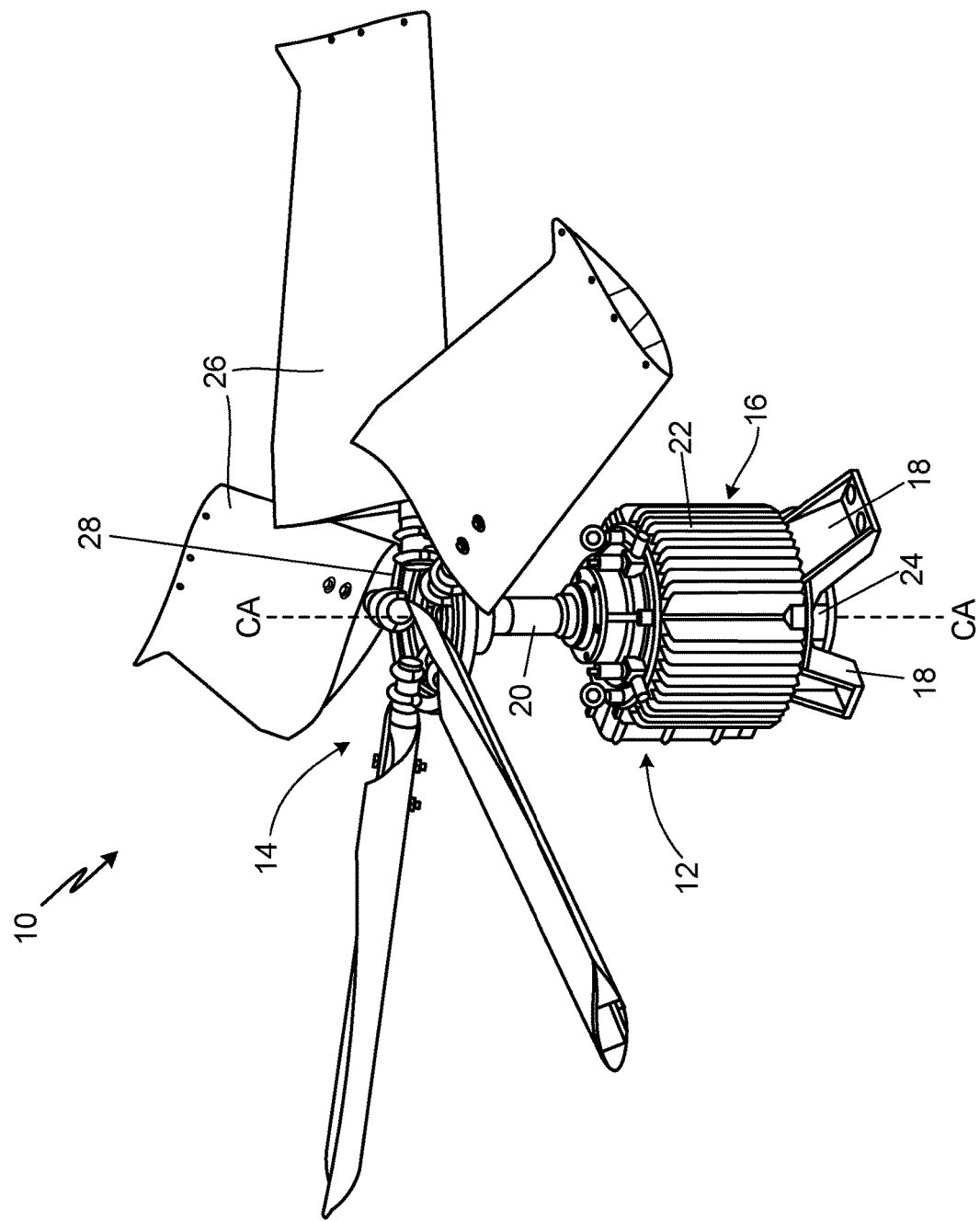
FIG. 1 is an isometric view of a fan system.

The present disclosure concerns electric motors. The main type of motor presented herein is a transverse flux motor, which is distinguished from axial or radial flux type electric motors. However, the inventive aspects discussed herein can be applied to various types of motors beyond just transverse flux motors. It is understood that, while the electric machine is generally discussed as being an electric motor, the principles discussed herein are applicable to other electric machines, such as generators.

The electric machines of this disclosure include a rotor rotatable about a motor axis and a stator configured to drive rotation of the rotor. According to aspects of the disclosure, the stator of the transverse flux electric motor includes stator phases, such as one, two, three, or more, formed from flux rings and a coil disposed axially between opposing flux rings. The flux rings include spurs that extend radially relative to the motor axis and towards the rotor. The spurs of an A-side flux ring are wholly or partially misaligned with the spurs of a B-side flux ring of the same phase assembly, along a line parallel with the motor axis. The various phase assemblies can be aligned such that the spurs of the A-side flux ring of a first phase assembly are aligned with the spurs of the other A-side flux rings of the other phase assemblies. The spurs of the B-side flux ring of the first phase assembly can be aligned with the spurs of the other B-side flux rings of the other phase assemblies. The A-side spurs are misaligned with the B-side spurs.

According to aspects of the disclosure, the flux rings can be formed by multiple ring segments that extend partially about the motor axis. The ring segments define the flux ring but are not in direct contact with each other. The ring segments are instead fixed together by potting compound. Adjacent ones of the stator segments are not connected together by laminate structure. Instead, the potting compound is the only structure that bridges the circumferential gaps between the adjacent ring segments.

The ring segments can be formed in a flip mirror configuration such that a single configuration of a ring segment can be put in a first orientation to form part of an A-side flux ring or flipped about a flip axis to a second orientation to form part of a B-side flux ring. Portions of the ring segments are misaligned between the first orientation and the second, flipped orientation.

The flux rings of a stator phase are joined by axial returns contacting each flux ring and disposed on an opposite radial side of the coil from the rotor. The axial returns can form the radial-most portion of the laminate structures of the phases. The axial returns can be fixed by the potting compound.

The potting compound can be formed by epoxy and can extend from radially beyond the spurs to the stator housing in a continuous matrix. The potting compound can coat the radial extremes of the spurs. A standoff notch that facilitates forming of the potting matrix can be recessed from the surface of the potting compound. The potting compound extend into or otherwise interface with a non-uniform portion of the stator housing that provides a mechanical interface between the stator and the stator housing.

The rotor includes permanent magnets and concentrators interspersed between the permanent magnets. The permanent magnet array formed by the interspersed permanent magnets and concentrators can be formed in axially-arrayed magnet phases. The magnet phases can be misaligned such that the permanent magnets of a first magnet phase are wholly or partially misaligned with the permanent magnets of one or more other magnet phases.

A bearing housing of the disclosure projects axially relative to the stator housing. The bearing housing projects vertically downward relative to an end of the stator housing. Supports are disposed around the bearing housing and connect with the end of the stator housing that the bearing housing extends from. A lubricant inlet and lubricant outlet are formed on the bearing housing to be easily accessible to provide lubricant to the bearing disposed within the bearing housing. The bearing is disposed wholly or partially at a location axially beyond the electromagnetic components of the motor.

Several of the figures of the disclosure show a common axis, which is sometimes referred to as a motor axis. An axis of rotation of the rotor is disposed coaxially with the common axis. The term annular is used herein, which can refer to a ring shape (continuous or broken) about the common axis, which can be coaxial with the common axis. The term radial is used herein which when referring to a direction is any direction orthogonal to the common axis, unless otherwise noted. The term axial is used herein which when referring to a direction is any direction parallel with the common axis, unless otherwise noted. The terms circumferential or circumferentially as used herein means around the common axis, unless otherwise noted.

Components can be considered to radially overlap when those components are disposed at common axial locations along common axis CA. A radial line extending from common axis CA will extend through each of the radially overlapping components. Components can be considered to axially overlap when those components are disposed at common radial and circumferential locations such that an axial line parallel to common axis CA extends through the axially overlapping components. Components can be considered to circumferentially overlap when aligned about common axis CA, such that a circle centered on common axis CA passes through the circumferentially overlapping components.

FIG. 1 is an isometric view of fan system 10. Fan system 10 includes motor 12 and blade assembly 14. Motor housing 16, supports 18, and drive shaft 20 of motor 12 are shown. Motor housing 16 includes stator housing 22 and bearing housing 24. Blades 26 and fan hub 28 of blade assembly 14 are shown.

Motor 12 is an electric motor configured to generate a rotating mechanical output. In the example shown, motor 12 is configured to generate the output coaxially with common axis CA. Motor housing 16 encloses other components of motor 12. In the example shown, motor housing 16 includes a first, larger diameter portion and a second, smaller diameter portion. The first portion is formed by stator housing 22 and the second portion is formed by bearing housing 24. Both stator housing 22 and bearing housing 24 enclose rotating components of motor 12. Electric components of motor 12 are disposed, at least partially, within stator housing 22.

Supports 18 extend axially from stator housing 22 and are configured to interface with a support surface. In some examples, supports 18 can rest on the support surface such that stator housing 22 extends vertically above supports 18. Bearing housing 24 is disposed a lower axial end of stator housing 22 opposite blade assembly 14. Bearing housing 24 can thereby be disposed vertically between stator housing 22 and the support surface. In the example shown, bearing housing 24 has a smaller diameter than stator housing 22 and is located vertically below stator housing 22.

Blade assembly 14 is connected to motor 12 to be rotated by motor 12. Drive shaft 20 extends from motor 12 to provide the rotating mechanical output from motor 12 to blade assembly 14 to rotate blades 26 on common axis CA. Fan hub 28 is disposed at an end of drive shaft 20 opposite motor 12. More specifically, fan hub 28 is disposed at a distal end of drive shaft 20 opposite a second distal end of drive shaft 20 extending into bearing housing 24. Blades 26 extend radially outward from fan hub 28. In the example shown, motor 12 and blade assembly 14 are disposed coaxially on common axis CA such that blades 26, fan hub 28, drive shaft 20, and the rotor of motor 12 rotate coaxially.

In the example shown, fan system 10 is configured such that blade assembly 14 is disposed vertically above motor 12. For example, fan system 10 can be configured for use in a cooling tower. It is understood that, while vertically oriented fans are discussed, fans according to the present disclosure can be oriented in any desired orientation and can be used to move any desired fluid, including gas and/or liquid. Further, while motor 12 is described as driving blade assembly 14, it is understood that any one or more aspects of motor 12 can be implemented in non-fan applications. Motor 12 can be configured for use in any desired electric motor assembly. It is thus understood that, while a fan is one implementation of the motor technologies presented herein, other applications, including non-fan applications, are possible and contemplated as within the scope of the disclosure.

Figure 2A:
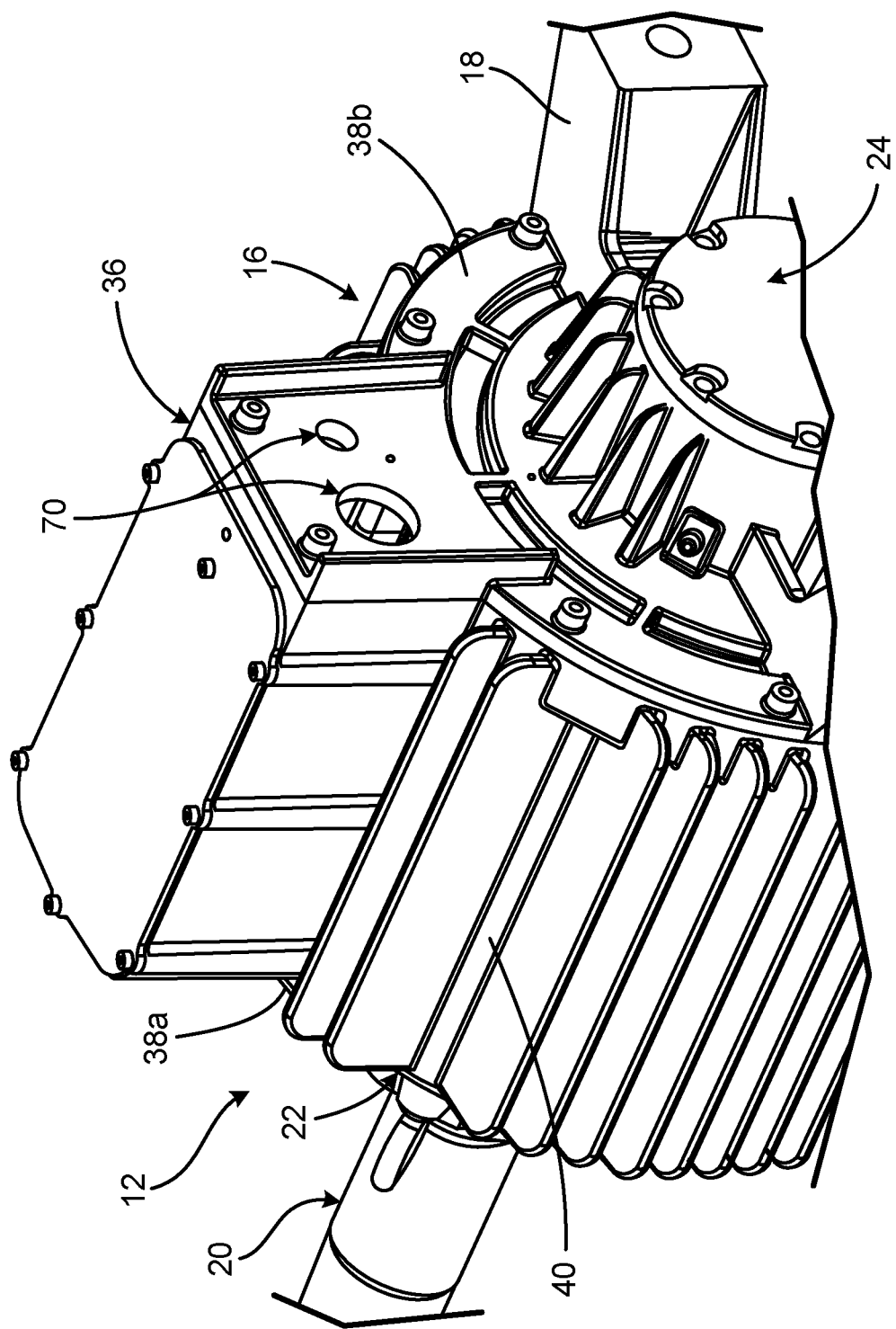
FIG. 2A is a partial isometric view of a motor.
Figure 2B:
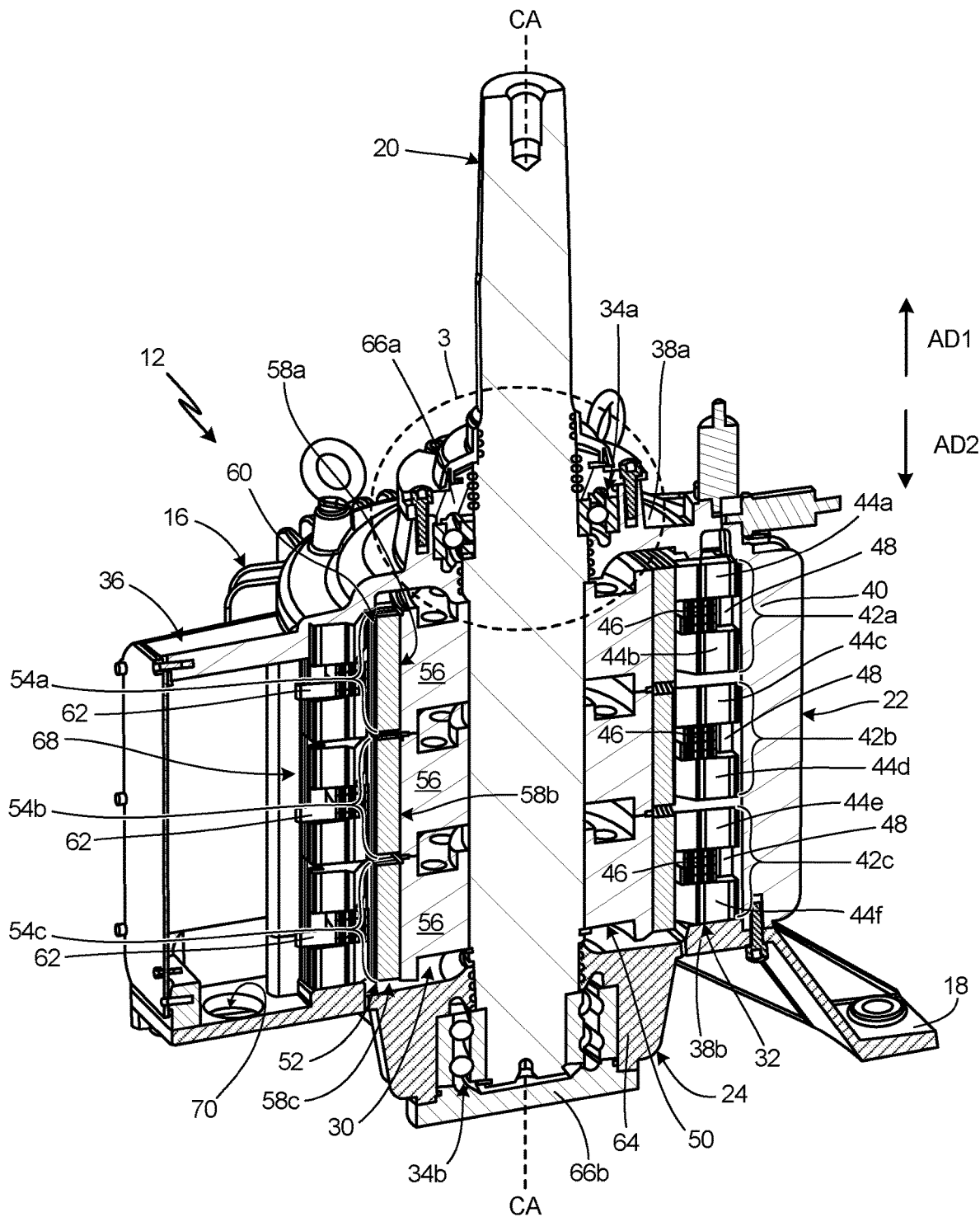
FIG. 2B is a cross-sectional view of the motor of FIG. 2A.

FIG. 2A is a partial isometric view of motor 12. FIG. 2B is a cross-sectional view of motor 12. Motor 12 includes motor housing 16; supports 18; drive shaft 20; rotor 30; stator 32; and bearing assemblies 34a, 34b. Motor housing 16 includes stator housing 22, bearing housing 24, and junction box 36. Stator housing 22 includes stator housing ends 38a, 38b and stator housing body 40. Bearing housing 24 includes bearing housing body 64 and end cap 66b. Stator 32 includes stator phases 42a-42c (collectively herein "stator phase 42" or "stator phases 42"). Stator phase 42a includes flux rings 44a, 44b, coil 46, and axial returns 48. Stator phase 42b includes flux rings 44c, 44d, coil 46, and axial returns 48. Stator phase 42c includes flux rings 44e, 44f, coil 46, and axial returns 48. Flux rings 44a-44f are referred to collectively herein as "flux ring 44" or "flux rings 44".

Rotor 30 includes rotor body 50 and permanent magnet array 52. In the example shown, rotor 30 includes rotor phases 54a-54c (collectively herein "rotor phase 54" or "rotor phases 54"). Rotor phase 54a includes rotor hub 56 and magnet phase 58a. Rotor phase 54b includes rotor hub 56 and magnet phase 58b. Rotor phase 54c includes rotor hub 56 and magnet phase 58c. Magnet phases 58a-58c are referred to collectively herein as "magnet phase 58" or "magnet phases 58".

Electric and/or magnetic components of motor 12 are disposed within stator housing 22. Stator housing 22 includes stator housing body 40 extending axially between stator housing ends 38a, 38b. Stator housing body 40 can include a cylindrical exterior surface and/or a cylindrical interior surface. Stator housing ends 38a, 38b can include and/or be formed by plates connected to stator housing body 40, such as by fasteners such as bolts, among other options. In the example shown, heat sinks are formed on stator housing body 40 to thermal cooling to motor 12.

Stator 32 is disposed coaxially with rotor 30 on the axis of rotation of rotor 30, which is coaxial with the common axis CA. Stator 32 includes stator phases 42 that are arrayed along and around the axis of rotation. Each stator phase 42 includes a coil 46 extending circumferentially about the common axis CA. The stator phases 42 include metallic components formed on each axial side of the coil 46 of that stator phase 42. The metallic components can be formed wholly or partially from stacks of laminations. Laminations can be formed from material which is readily susceptible to polarization from the fields generated by coils 46. Such material is typically ferromagnetic. The ferromagnetic materials can be metal such as iron or an alloy of iron, such as steel. More specifically, laminations can be formed from silicon steel, among other options. Ferromagnetic material can be a ceramic doped or otherwise embedded with ferromagnetic elements.

Various components of each stator phase 42 can be formed from laminations having different stack orientations. For example, flux rings 44 can be formed from laminate sheets stacked axially and oriented radially. An axial line through the laminate structure of a flux ring 44 extends through each sheet of the laminate stack. The laminate structure of axial returns 48 is oriented transverse to the laminate structure of flux rings 44. In some examples, the laminate sheets of axial returns 48 are disposed orthogonal to the laminate sheets of flux rings 44. Axial returns 48 can be formed from laminate sheets stacked circumferentially and oriented axially. A tangent line to a circle centered on common axis CA and passing through a portion of an axial return 48 can extend through each sheet of the laminate stack of that axial return 48. An arc extending circumferentially about common axis CA can pass through each sheet of the laminate stack of an axial return 48.

The coils 46 are formed as hoops of electrically conductive metal that extend circumferentially about the common axis CA. The coils 46 are thus coaxial with the common axis CA. Each of the coils 46 is discrete with respect to the other ones of the coils 46. Each coil 46 is a winding of wire, ribbon, etc., typically copper, around the common axis CA. Thus, each coil 46 could be a continuous winding of 20, 30, 40, 50, 100, or less or more loops around the common axis CA. Each coil 46 has two termination wires, only one wire end 62 of each coil 46 is shown in FIG. 2B, representing the ends of the circuit of each coil 46 for running an AC signal through the coil 46, which can electrically connect with a controller.

The coils 46 of the multiple stator phases 42 do not radially overlap or cross over each other. No part of any one of the multiple coils 46 is disposed at the same axial location along the common axis CA as any other one of the coils 46. There is an axial gap between each of the coils 46 of the motor 12. The coils 46 are thus located at separate and distinct axial positions along the common axis CA. Each coil 46 is made as a circular loop with the common axis CA extending through each loop of each coil 46. The coils 46 do not include loops wherein the common axis CA does not extend through such loop. The material of the loops formed by coils 46 does not extend axially but instead extends circumferentially about the common axis CA.

Rotor 30 includes permanent magnet array 52 oriented towards stator 32. In the example shown, rotor 30 is disposed within stator 32 and permanent magnet array 52 is disposed on a radially outer side of rotor body 50. Air gap 60 is disposed radially between stator 32 and rotor 30 such that stator 32 and rotor 30 are not in direct contact. More specifically, the air gap 60 is formed radially between a continuous matrix of potting compound of the stator 32 and permanent magnet array 52. As such, motor 12 can be considered to include an inner rotor. It is understood, however, that in various other examples the rotor 30 is disposed about stator 32 to rotate about stator 32 such that motor 12 can be considered to include an outer rotor. In such examples, permanent magnet array 52 can be disposed on an inner radial surface of rotor body 50.

Rotor 30 rotates on common axis CA and generates the rotational output. Rotor phases 54 are arrayed along and around the axis of rotation. Each rotor phase 54 is disposed coaxially with the other rotor phases 54. Rotor hubs 56 of the rotor phases 54 are disposed to rotate on the common axis CA. The magnet arrays of each magnet phase 58 of the rotor phases 54 are disposed on and supported by the respective rotor hub 56 of that rotor phase 54. The magnet array of each magnet phase 58 can be formed by interspersed permanent magnets and concentrators, as discussed in more detail below. The rotor phases 54 are connected together to rotate simultaneously on common axis CA. In the example shown, drive shaft 20 is mounted to rotor hubs 56 to rotate concurrently with rotor phases 54.

Drive shaft 20 is supported by rotor body 50 to rotate with rotor body 50. Drive shaft 20 extends through each axial stator housing end 38a, 38b of stator housing 22, in the example shown. A first portion of drive shaft 20 extends through stator housing end 38a to be exposed outside of motor housing 16. The portion of drive shaft 20 disposed outside of motor housing 16 can connect to another component of the system to directly provide the rotational output from motor 12 to the component, such as to blade assembly 14, among other options. Drive shaft 20 and rotor 30 rotate in a 1:1 relationship. Drive shaft 20 completes one revolution for every one revolution of rotor 30. In the example shown in FIG. 1, blade assembly 14 is directly mounted to drive shaft 20 to rotate in a 1:1 relationship. Motor 12 thereby drives blade assembly 14 in a 1:1 relationship. The direct drive relationship provides high responsiveness and a large speed range relative to traditional outputs having reduction gearing.

The stator phases 42a-42c respectively overlap with the rotor phases 54a-54c along the axis of rotation/common axis. The stator phases 42 are electromagnetically polarized by coils 46 out of phase with respect to each other, such as 120-degrees electrically out of phase, to electromagnetically interact with the rotor phases 54 to drive rotation of the rotor 30. While three motor phases are shown herein, other embodiments may include a single phase, only two phases, or more than three phases.

Bearing assemblies 34a, 34b are disposed to support rotation of rotor 30. Drive shaft 20 extends through and is supported by bearing assemblies 34a, 34b. Bearing assemblies 34a, 34b can be of any desired configuration for supporting rotation of rotor 30 and axial loads experienced by motor 12. For example, bearing assemblies 34a, 34b can be ball bearings, roller bearings, etc. In example shown, bearing assembly 34a is disposed axially between bearing assembly 34b and the first portion of drive shaft 20. Bearing assembly 34a is thus disposed axially between the blade assembly 14 and bearing assembly 34b. Bearing assembly 34a can be disposed vertically above bearing assembly 34b such that bearing assembly 34a can be considered to be an upper bearing while bearing assembly 34b can be considered to be a lower bearing. End cap 66a is connected to stator housing end 38a to retain bearing assembly 34a on motor housing 16.

Bearing housing 24 extends from stator housing end 38b of stator housing 22 and is disposed on common axis CA. Bearing housing 24 encloses bearing assembly 34b and supports bearing assembly 34b. Bearing housing 24 projects axially from the stator housing end 38b and positions bearing assembly 34b outside of stator housing 22. In the example shown, bearing assembly 34b is axially spaced from stator housing end 38b such that bearing assembly 34b is disposed fully outside of stator housing 22. Bearing assembly 34b is thus spaced axially from stator 32, as discussed in more detail below.

In the example shown, bearing housing 24 includes bearing housing body 64 extending from stator housing end 38b. Bearing housing body 64 forms a sidewall of bearing housing 24 that extends circumferentially about bearing assembly 34b. End cap 66b is disposed at an end of bearing housing 24 opposite stator housing end 38b. End cap 66b encloses bearing housing 24 to retain bearing assembly 34b within bearing housing 24. In the example shown, end cap 66b is connected to a distal end of bearing housing body 64.

Junction box 36 extends from motor housing 16. More specifically, junction box 36 extends from stator housing body 40 of stator housing 22. Junction box 36 projects radially from stator housing body 40. Junction box 36 can be formed integrally with stator housing 22 such that junction box 36 is permanently connected to stator housing 22. For example, one or more of the vertical walls of junction box 36 can be formed with and/or permanently connected to stator housing body 40 to extend radially from stator housing body 40. Junction box 36 encloses a space disposed radially between an inner junction box wall and an outer junction box wall. The inner junction box wall is formed by stator housing body 40, in the example shown.

Housing gap 68 is formed through stator housing body 40 within junction box 36. Housing gap 68 provides a location for wire ends 62 to extend radially outward from coils 46 and away from stator 32. The potting compound can extend into the junction box 36 through housing gap 68, as discussed in more detail below. The continuous matrix of potting compound projecting into housing gap 68 can rotationally lock stator 32 relative to stator housing 22, preventing undesired relative rotation therebetween.

Wire ends 62 can extend into junction box 36 through housing gap 68 to form electrical connections for coils 46. Wire ends 62 extend though the continuous matrix of potting compound and project radially outward from the potting compound into junction box 36. The wire ends 62 can extend through the portion of the potting compound projecting into housing gap 68 to interface with motor housing 16. Wires (not shown) extend to the components of the electric motor 12 through the apertures 70 into the interior of junction box 36. The wire ends 62 connect with the wires extending through apertures 70 and extend through housing gap 68 into the main body portion of stator housing 22 to connect to coils 46. The wires can provide power and/or control signals to coils 46 via the wire ends 62.

A controller can be operably connected to motor 12, electrically and/or communicatively, to control operation of motor 12. For example, the controller can be operably connected to electrical components of stator 32 by the wires extending into junction box 36. The controller can be of any desired configuration for controlling operation of motor 12 and the rotational output of motor 12 (e.g., speed, torque, etc.) and can include control circuitry and memory. The controller is configured to store executable code, implement functionality, and/or process instructions. The controller is configured to perform any of the functions discussed herein, including receiving an output from any sensor referenced herein, detecting any condition or event referenced herein, and controlling operation of any components referenced herein. The controller can be of any suitable configuration for controlling operation, gathering data, processing data, etc. The controller can include hardware, firmware, and/or stored software. The controller can be of any type suitable for operating in accordance with the techniques described herein. It is understood that the controller can be entirely or partially disposed across one or more circuit boards. In some examples, the controller can be implemented as a plurality of discrete circuitry subassemblies.

During operation, power is provided to coils 46. Stator phases 42 generate electromagnetic fields that interact with the permanent magnet array 52 to drive rotation of rotor 30. The embodiment of the motor 12 shown includes three phases corresponding to the three stator phases 42 and the coils 46 therein in which three sinusoidal AC signals are delivered through the coils 46 120-degrees electrically offset. If there were two stator phases 42 and two coils 46, then the two sinusoidal AC signals would be 182-degrees apart, or 92-degrees apart for sets of four stator phases 42, etc.

Figure 3:
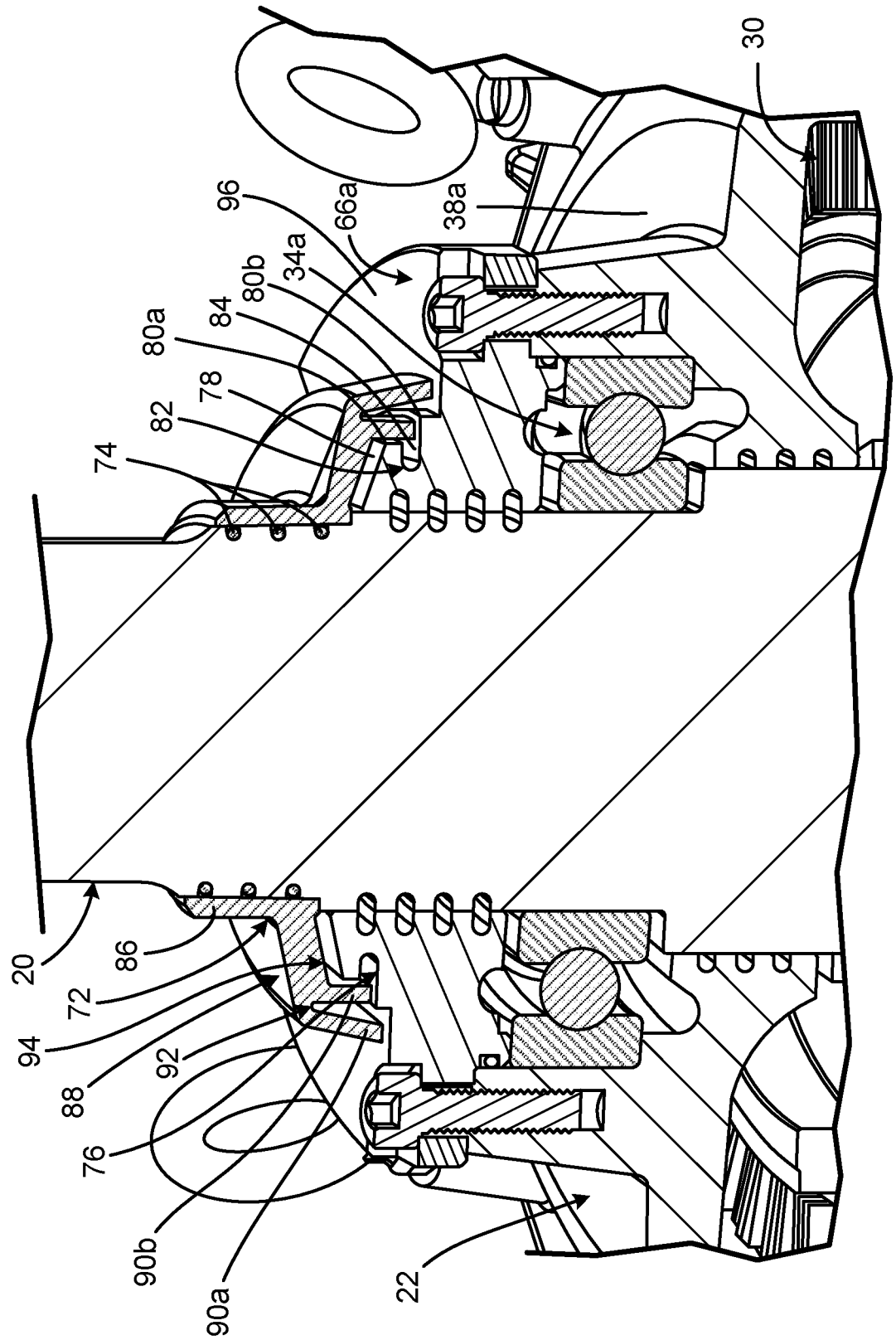
FIG. 3 is an enlarged cross-sectional view of detail 3 in FIG. 2B.

FIG. 3 is an enlarged cross-sectional view of detail 3 in FIG. 2B. An axial end of motor 12 is shown. An axial end of stator housing 22, bearing assembly 34a, end cap 66a, shroud 72, and shaft seal 74. End cap 66a includes stepped outer surface 76 having upper ledge 78, end face 80a, annular recess 82, lower ledge 84, and end face 80b. Shroud 72 includes collar 86 and radial portion 88. Radial portion 88 includes shroud leg 90a, shroud leg 90b, and pocket 92.

Bearing assembly 34a is disposed about and fixed to drive shaft 20. Bearing assembly 34a supports rotation of drive shaft 20 relative to motor housing 16 and stator 32. Bearing assembly 34a supports rotation of rotor 30 relative to stator 32.

Shroud 72 is fixed to an end of drive shaft 20 disposed outside of motor housing 16. In the example shown, shroud 72 is fixed to drive shaft 20 to rotate with drive shaft 20. Drive shaft 20 extends through collar 86 such that shroud 72 is mounted to drive shaft 20 by collar 86 interfacing with drive shaft 20. Shaft seal 74 is disposed between shroud 72 and drive shaft 20. In the example shown, shaft seal 74 includes an array of three sealing elements disposed radially between drive shaft 20 and collar 86. For example, the sealing elements can be formed by o-rings. In the example shown, shaft seal 74 can also be referred to as a triple seal. It is understood that, while shaft seal 74 is shown as including three separate sealing elements, shaft seal 74 can include any desired number of sealing elements. The use of three sealing elements spaced axially along drive shaft 20 to form shaft seal 74 provides additional protection from the ingress of environmental liquids, such as water. Shaft seal 74 is configured such that two seal elements can fail while a third can still maintain the seal to protect internal component of motor 12 (e.g., from water ingress into the motor housing 16).

Radial portion 88 of shroud 72 extends generally radially outward from collar 86 relative to common axis CA. In the example shown, radial portion 88 extends both radially and axially such that the outer axial surface of radial portion 88, which is the surface oriented axially away from stator housing 22 and in axial direction AD1, is sloped towards stator housing 22. The sloped radial portion 88 facilitates drainage of any liquids radially away from drive shaft 20.

Radial portion 88 is spaced axially from end cap 66a. The inner surface of radial portion 88, which is the surface oriented towards end cap 66a and in axial direction AD2, is non-linear between an outer radial end of end cap 66 and an inner radial end at collar 86. Shroud leg 90a projects from an outer radial end of shroud 72. Shroud leg 90a extends towards end cap 66a. Shroud leg 90a can be tapered to extend both axially and radially. Shroud leg 90b is spaced radially from shroud leg 90a. Shroud leg 90b projects from the inner surface of radial portion 88 and is spaced radially inward from shroud leg 90a such that shroud leg 90b is disposed radially between the common axis CA and shroud leg 90a. Shroud leg 90b extends towards end cap 66a. Shroud leg 90b can be tapered to extend both axially and radially. In some examples, shroud leg 90b extends axially such that shroud leg 90b forms a cylinder coaxial with common axis CA. Pocket 92 is disposed radially between shroud leg 90a and shroud leg 90b. Pocket 92 is a gap between shroud leg 90a and shroud leg 90b that narrows in the axial direction oriented away from end cap 66a, in the example shown. Shroud legs 90a, 90b can form concentric circles about common axis CA at various locations along common axis CA. The distance between the concentric circles (e.g., the width of pocket 92) can decrease in the first axial direction AD1 shroud legs 90a, 90b extend axially away from stator housing 22.

End cap 66a retains bearing assembly 34a within motor housing 16. End cap 66a includes stepped outer surface 76 to resist water or other ingress into the interior of stator housing 22. The stepped surface 76 is an outer axial surface of end cap 66a and is stepped between a first axially oriented surface portion and a second axially oriented surface portion. In the example shown, upper ledge 78 forms the first portion of the stepped outer surface 76, which is disposed axially furthest from the electromagnetic components of motor 12. In the example shown, upper ledge 78 forms the vertically uppermost portion of the stepped outer surface 76. Upper ledge 78 is an annular ring around drive shaft 20 and is sloped to guide moisture away from the aperture that drive shaft 20 extends through. End face 80a extends axially inward from a radially outer end of upper ledge 78. An axial gap is formed between upper ledge 78 and lower ledge 84. Annular recess 82 is formed beneath upper ledge 78 and is disposed directly axially between a portion of upper ledge 78 and a portion of lower ledge 84. Lower ledge 84 is a portion of stepped outer surface 76 that extends radially outward relative to upper ledge 78. Lower ledge 84 can be formed as an annular ring. End face 80b is disposed at an outer radial end of lower ledge 84. End face 80b extends axially inward towards the electromagnetic components of motor 12. An outer face 96 extends radially from the axially inner end of end face 80b (e.g., the end closest to stator 32). Outer face 96 forms the radially outermost portion of the stepped outer surface 76 and can extend to the radial edge of end cap 66a.

Shroud 72 and end cap 66 define a stepped labyrinth path 94 that can form an air seal to protect, among other components, upper bearing assembly 34a from contaminant and/or moisture ingress. The labyrinth path 94 is formed on a first axial side by the stepped outer surface 76 of end cap 66a and on a second axial side by an inner axial surface of shroud 72. In the example shown, the labyrinth path 94 is formed on a lower vertical side by end cap 66a and on an upper vertical side by shroud 72.

Water pooling on the upper end cap 66a encounters a step up to lower ledge 84, an annular curve in annular recess 82, and an angled upper ledge 78 before reaching the interface between the drive shaft 20 and the upper end cap 66a. The shroud 72 includes two concentric annular rings (e.g., formed by shroud legs 90a, 90b) that project inward towards the stator 32 with the steps of the stepped outer surface 76 of end cap 66a. As such, shroud leg 90a can be longer than shroud leg 90b to accommodate the different axial locations along the steps of end cap 66a. The projecting annular rings and the correspondingly stepped surface of end cap 66a block falling and splashing liquids. While the labyrinth path 94 is shown as including two steps and two associated annular ring projections, it is understood that the labyrinth path 94 can include any desired number of steps and ring projections. It is further understood that some examples of labyrinth path 94 include differing numbers of steps and ring projections. The stepped labyrinth path 94 inhibits the ingress of water into the motor housing 16. The shroud 72 is fixed to the drive shaft 20 and rotates with the drive shaft 20 to fling liquids off of the shroud 72, away from the stepped labyrinth path 94.

Figure 4B:
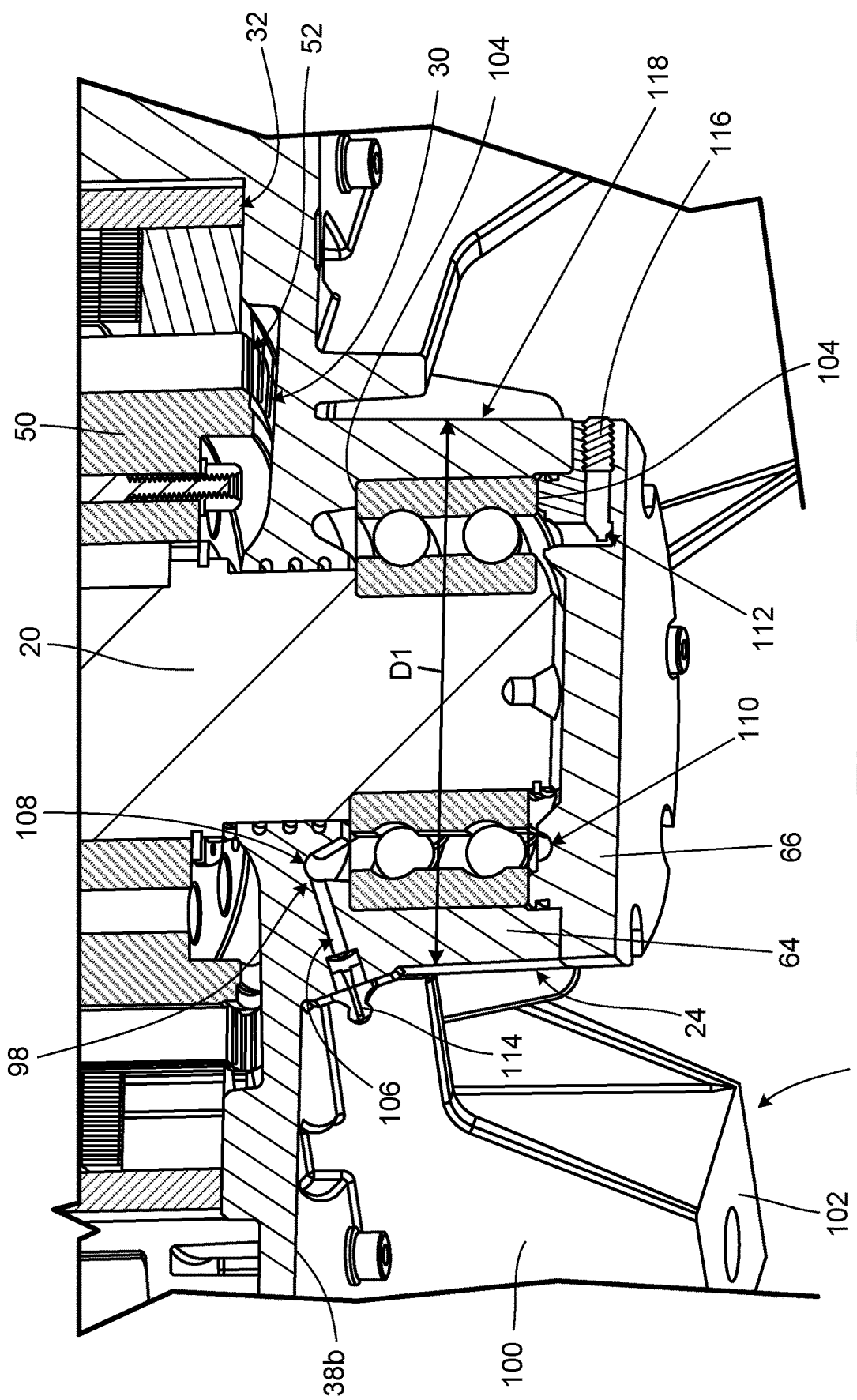
FIG. 4B is an enlarged, isometric cross-sectional view of the axial end of the motor shown in FIG. 4A.

FIG. 4A is an enlarged isometric view of an axial end of the motor 12. FIG. 4B is an enlarged, isometric cross-sectional view of the axial end of the motor 12 shown in FIG. 4A. FIGS. 4A and 4B will be discussed together. Motor housing 16, supports 18, drive shaft 20, rotor 30, stator 32, bearing assembly 34b, and lubricant system 98 of motor 12 are shown. Stator housing 22, bearing housing 24, and junction box 36 of motor housing 16 are shown. Stator housing end 38b and stator housing body 40 of stator housing 22 are shown. Bearing housing body 64 and end cap 66b of bearing housing 24 are shown. Each support 18 includes leg 100 and foot 102. Covers 104 of bearing assembly 34b are shown. Supply passage 106, annular recess 108, drainage recess 110, drain passage 112, lubricant fitting 114, and plug 116 of lubricant system 98 are shown.

Bearing housing 24 is formed as an axial extension from stator housing end 38b of stator housing 22. Bearing housing body 64 extends axially from stator housing end 38b. Bearing housing body 64 at least partially defines a bearing chamber 118 within which the bearing assembly 34b is disposed. The bearing chamber 118 can be cylindrical and extend axially. The bearing chamber 118 extends axially between a first axial end wall (e.g., stator housing end 38b) and a second axial end wall (e.g., end cap 66b) disposed on an opposite axial side of the bearing assembly 34b from the first axial end wall that is disposed axially between the stator 32 and the bearing assembly 34b.

End cap 66b is connected to the bearing housing body 64. End cap 66b interfaces with bearing assembly 34b to secure bearing assembly 34b within bearing housing 24. In some examples, end cap 66b can preload bearing assembly 34b. An annular seal can be disposed radially between end cap 66b and bearing housing body 64 to seal lubricant system 98 of bearing assembly 34b. For example, the seal, such as an o-ring or other elastomer seal, can be disposed in a seal groove formed on an annular, radially-oriented surface of end cap 66b.

Bearing housing 24 can be formed as a projection or protrusion extending from stator housing 22. In some examples, bearing housing body 64 is integrally formed as a portion of stator housing 22. For example, bearing housing body 64 can be cast, formed, machined, printed, or otherwise integrally formed from and/or with stator housing end 38*b* as a single component. In some examples, bearing housing body 64 is permanently connected to stator housing 22 to be integral with stator housing 22, such as by welding, among other options.

Bearing housing body 64 defines an inner cylindrical surface that interfaces with the outer race of bearing assembly 34*b*. Bearing housing body 64 can, in some examples, include an outer cylindrical surface. The bearing housing body 64 can have a smaller outer diameter than the main body portion (e.g., stator housing 22) of the motor housing 16 located vertically above the lower bearing housing body 64. An outer diameter D1 (FIG. 4B) of bearing housing 24 is smaller than an outer diameter D2 (FIG. 5A) of stator housing 22. The outer diameters D1, D2 can be taken at locations circumferentially between the heat sinks of stator housing 22 and bearing housing 24. In the example shown, an outer width of the bearing housing 24 between the radially outermost edges of the heat sinks of bearing housing 24 is less than the diameter D2 of stator housing 22. In some examples, stator housing body 40 is cylindrical and bearing housing body 64 is cylindrical. For example, both stator housing body 40 and bearing housing body 64 can have cylindrical inner surfaces, either continuous or broken, about and along the common axis CA. The larger inner cylinder of the stator housing 22 can house the electronic and/or magnetic components of motor 12 and the smaller inner cylinder of the bearing housing 24 can house the bearing assembly 34*b*.

Supports 18 surround the protruding bearing housing 24. Supports 18 are disposed circumferentially about bearing housing 24 and project axially beyond a distal end of bearing housing 24. More specifically, both bearing housing 24 and supports 18 extend in second axial direction AD2 from stator housing end 38*b*. In the example shown, supports 18 include legs 100 that are connected to stator housing 22 and extend to feet 102. Legs 100 are connected to stator housing end 38*b* and can, in some examples, be projections integrally formed with stator housing end 38*b*. In some examples, a brace portion of a leg 100, which is the portion connected to stator housing 22, can also connect to the cylinder of bearing housing 24. In the example shown, portions of each leg 100 interface with bearing housing body 64.

Supports 18 are disposed circumferentially about the protruding bearing housing 24. The supports 18 are connected directly to the stator housing 22. The axially extending portion of each leg 100 is spaced radially from bearing housing 24 such that bearing housing 24 is disposed in a region defined between the legs 100. Radial gaps are formed between bearing housing 24 and the portion of each leg 100 extending away from stator housing 22. Supports 18 extending circumferentially about bearing housing 24 protects bearing housing 24, and thus bearing assembly 34*b*, from undesirable impacts. Junction box 36 can further provide impact protection to bearing housing 24 as junction box 36 projects radially outward relative to bearing housing 24 on a side of bearing housing 24 that does not include a support 18. Supports 18 extend from above or parallel with the inner axial end of bearing housing 24 (e.g., at an interface between bearing housing 24 and stator housing end 38*b*) to beyond a distal axial end of bearing housing 24 (e.g., the face of end cap 66*b* oriented away from drive shaft 20). The weight of motor 12, and other components supported and/or powered by motor 12 (e.g., blade assembly 14)) is transferred from vertically above bearing assembly 34*b* to vertically below bearing assembly 34*b* by supports 18.

Each leg 100 extends from stator housing 22 to a respective foot 102. Feet 102 are configured to interface with the support surface, such as a floor, concrete pad, metal plate, etc., to support motor 12 and blade assembly 14 in a vertical orientation above the support surface. Apertures can be formed through one or more of the feet 102 and fasteners (e.g., bolts, threaded shafts, etc.) can extend through the apertures to secure motor 12 in a desired location. As shown, some feet 102 can include more than one aperture. In some examples, one or more feet 102 can include no apertures. Feet 102 are spaced radially away from bearing housing 24. Feet 102 are also spaced axially relative to the distal axial end of bearing housing 24. In the example shown, the inner radial side of each foot 102 is disposed further from common axis CA than an outer radial surface of bearing housing 24 and the support interface surface of each foot 102 (e.g., the surface contacting the support surface) is disposed further from stator housing end 38*b* than the distal axial end of bearing housing 24 along common axis CA. Feet 102 are spaced radially from the outer surface of bearing housing body 64. In the example shown, feet 102 are spaced radially relative to the outer radial edge of the heat sinks of bearing housing 24. The relative positioning of feet 102 elevates bearing housing 24 above the ground surface and provides a barrier circumferentially around bearing housing 24 (e.g., as formed by legs 100) that protects the bearing housing 24 from impacts.

Bearing housing 24 is disposed vertically between motor 12 and the support surface. Supports 18 position bearing housing 24 to be spaced from the support surface, preventing any pooling liquids on the support surface from migrating to bearing assembly 34*b*. Bearing housing 24 is disposed fully beneath stator housing 22 to further protect bearing housing 24, and thus bearing assembly 34*b*, from debris and contaminants and from undesirable impacts.

Positioning bearing housing 24 outside of stator housing 22 along common axis CA and with a smaller cross-sectional area orthogonal to common axis CA relative to stator housing end 38*b* positions the electromagnetic components of motor 12 closer to exterior surfaces of stator housing 22, enhancing heat transfer. As shown, stator housing end 38*b* is disposed adjacent to stator 32 and rotor 30 and directly interfaces with the environment of motor 12 on an outer side of the stator housing end 38*b*. The stator housing end 38*b* being bracketed by the stator and the environment provides a short heat path between the electromagnetic components and the environment, enhancing cooling efficiency. In some examples, heat sinks can be formed on stator housing end 38*b*. In the example shown, legs 100 can be formed from thermally conductive material to function as heat sinks for motor 12. An axial line parallel to common axis CA can pass from components of the stator 32 or rotor 30, directly to the stator housing 22 (or potentially through potting compound, which passage therethrough between components can still be considered direct), and directly from stator housing 22 to the environment, providing a direct thermal transfer pathway.

Bearing assembly 34*b* is located within the bearing housing 24. Bearing assembly 34*b* is disposed within bearing chamber 118. As shown, bearing assembly 34*b* is located axially outside of and/or below the stator housing 22. In the example shown, bearing assembly 34*b* is disposed on an opposite axial side of the stator housing end 38*b* from the electronic and magnetic components of motor 12. The outer race of bearing assembly 34*b* interfaces with the inner cylindrical surface of bearing housing body 64. The inner race of bearing assembly 34*b* interfaces with drive shaft 20. Rolling elements are disposed radially between the inner race and the outer race. In the example shown, bearing assembly 34b is a double roller bearing that includes two rows of rolling elements. It is understood, however, that bearing assembly 34b can be of any desired configuration suitable for supporting rotation of drive shaft 20 and components mounted to drive shaft 20 to be driven by motor 12. The rolling elements can be balls, rollers, or of any other configuration suitable for supporting rotation and, in some examples, counteracting axial loads.

The bearing housing body 64 directly interfaces with bearing assembly 34b and the environment surrounding motor 12. The material forming bearing housing 24 can be thermally conductive to wick heat away from bearing assembly 34b and provide cooling to bearing assembly 34b. The protruding bearing housing 24 provides a greater amount of surface area outside of the stator housing 22 to facilitate greater heat transfer from bearing assembly 34b as well as from the motor 12. As shown, heat sinks, such as fins, protrusions, ribs, etc., can be formed directly on the exterior of bearing housing body 64, further enhancing cooling. A radial line from common axis CA can pass directly from bearing assembly 34 to the bearing housing 24 and then directly from axial bearing housing 24 to the environment, providing a direct thermal transfer pathway.

Lubricant system 98 is configured to supply lubricant to bearing assembly 34b during operation. Lubricant system 98 can store and provide lubricant to bearing assembly 34b. Supply passage 106 extends through bearing housing body 64 to an interior of bearing housing 24. As such, supply passage 106 extends through the sidewall of bearing housing 24 to the interior of bearing housing 24. Supply passage 106 extends from an inlet port on the exterior of bearing housing body 64 to a supply reservoir formed within bearing housing 24. Supply passage 106 is angled to extend axially towards stator housing 22 between the inlet port and the supply reservoir. Supply passage 106 is angled to facilitate flow of lubricant into bearing housing 24 as lubricant enters the interior of bearing housing 24 at a vertically upper location to facilitate gravitational feed.

Lubricant fitting 114 is connected to supply passage 106 at the inlet port. Lubricant fitting 114 is configured to provide a fitting for a lubricant supply, such as a grease gun, to connect to lubricant system 98 to provide lubricant to bearing assembly 34b. The inlet port is formed in bearing housing body 64 at a location circumferentially between a pair of adjacent supports 18. In the example shown, lubricant fitting 114 is disposed at a location directly between the brace portions of legs 100 of the supports 18. The brace portions project from stator housing end 38b such that an axial end of the brace portion opposite the stator housing end 38b is axially further from the stator housing end 38b than lubricant fitting 114. Positioning the inlet port, and thus lubricant fitting 114, at a location directly circumferentially between portions of supports 18 protects the inlet of lubricant system 98 from undesired contact damage. Supply passage 106 is configured such that lubricant fitting 114 is angled downwards, away from stator housing end 38b. Angling lubricant fitting 114 away from stator housing end 38b orients lubricant fitting 114 for easier access by the user to fit a lubricant supply (e.g., grease gun) to lubricant fitting. In addition, angling lubricant fitting 114 vertically downwards orients lubricant fitting 114 to avoid falling debris falling on, impacting, or otherwise interfacing with the inlet of the lubricant fitting 114. Lubricant fitting 114 is also positioned directly axially between stator housing end 38b, such that stator housing 22 is disposed over and shields lubricant fitting 114 from falling debris.

Supply passage 106 extends through the wall of bearing housing body 64 to the lubricant supply reservoir within bearing housing 24. In the example shown, supply passage 106 extends to annular recess 108 that at least partially defines the reservoir. Annular recess 108 is formed within the protruding bearing housing 24 and can be filled with lubricant (e.g., grease) to provide a lubricant reservoir for bearing assembly 34b. Annular recess 108, in the example shown, is spaced axially from an outer end face of stator housing end 38b and does not radially overlap with any electromagnetic components of motor 12. In the example shown, annular recess 108 is disposed radially inward of the electromagnetic elements of motor 12 and axially overlaps with the rotor body 50.

Bearing assembly 34b is sealed, having covers 104 on both axial sides of bearing assembly 34b. In the example shown, the covers 104 are disposed vertically above and below the races of bearing assembly 34. A first one of covers 104 is disposed at a first axial end of bearing assembly 34. A second one of covers 104 is disposed at a second axial end of the bearing assembly 34. The covers 104 can be configured to regulate lubricant flow through bearing assembly 34. For example, the covers 104 can be configured to restrict lubricant flow into and out of the area of the rolling elements of bearing assembly 34b. The covers 104 of the bearing assembly 34b help prevent the escape of lubricant from the bearing assembly 34b and can permit limited seepage of lubricant into the bearing assembly 34b from annular recess 108. Covers 104 can thereby regulate lubricant flow through lubricant system 98 and bearing assembly 34b.

Drainage recess 110 is disposed at a lower axial end of bearing assembly 34b. Drainage recess 110 can, in some examples, be configured to guide lubricant exiting bearing assembly 34b to drain passage 112. Drainage recess 110 can be an annular groove configured to capture draining lubricant. In some examples, drainage recess 110 can be configured to have a variable depth to guide draining lubricant to drain passage 112 by a gravity feed. For example, a portion of drainage recess 110 at drain passage 112 can have a first axial depth greater than a second axial depth of a portion of drainage recess 110 on an opposite radial side of common axis CA. Drainage recess 110 can be smoothly contoured about common axis CA to change depths and guide the lubricant to drain passage 112.

Drain passage 112 extends from bearing chamber 118 within which bearing assembly 34b is disposed to the exterior of bearing housing 24. In the example shown, drain passage 112 includes an inlet aperture that extends into drainage recess 110. In the example shown, drain passage 112 is formed through a portion of bearing housing 24 formed by end cap 66b. Drain passage 112 extend through end cap 66 from the inlet aperture to an outlet aperture formed through a radial sidewall of the end cap 66. In the example shown, drain passage 112 includes a plurality of transversely oriented passages. In the example shown, drain passage 112 includes a 90-degree bend between the inlet aperture and the outlet aperture. The bent drain passage 112 is positioned to vertically drain lubricant from bearing assembly 34b while allowing the user to connect radially, at a convenient location for the user. The configuration of drain passage 112 facilitates ease of servicing lubricant system 98. Plug 116 is insertable into the outlet aperture of drain passage 112 to close the lubricant system 98. Plug 116 can be removed from the outlet aperture to drain lubricant from lubricant system 98. For example, plug 116 can be threadedly connected to the outlet aperture.

Lubricant system 98 is disposed such that the supply passage 106 is disposed vertically above bearing assembly 34b and drain passage 112 is disposed vertically below bearing assembly 34b. More specifically, supply passage 106 outputs lubricant to the supply reservoir at a location axially between bearing assembly 34b and stator 32 while drain passage 112 receives lubricant from bearing assembly 34b at a location with bearing assembly 34b disposed axially between drain passage 112 and stator 32. The supply passage 106 outputs lubricant to the bearing assembly 34a at a first location and the drain passage 112 receives lubricant from the bearing assembly 34b at a second location disposed on an opposite axial side of the first bearing assembly from the first location. The configuration of lubricant system 98 provides gravity-assisted lubricant flow through bearing assembly 34b. The configuration of bearing housing 24 facilitates access to bearing assembly 34 from outside of motor 12 to lubricate bearing assembly 34b, reducing labor needed to maintain motor 12, decreasing material and labor costs, and decreasing downtime. Lubricant system 98 defines an internal reservoir that can hold a supply of lubricant to increase the time period between applications of lubricant.

Bearing assembly 34b supports rotation of the drive shaft 20 relative to the protruding bearing housing 24 and the rest of the motor housing 16. Locating the lower bearing assembly 34b in this low, protruding position has several advantages. For example, such a position removes the bearing assembly 34b from the electromagnetics of the electric motor 12, as the bearing assembly 34b does not radially overlap with elements of either the stator 32 or the rotor 30 such that a radial line extending from common axis CA does not pass through both an electromagnetic component and a component of bearing assembly 34b. As such, bearing assembly 34b is not disposed at the same axial location along axis CA as elements of stator 32 or rotor 30. Bearing assembly 34b is not immediately within the stator 32 or the rotor 30 as the drive shaft 20 extends axially beyond the stator 32 and the rotor 30 before radially overlapping with bearing assembly 34b. Disposing bearing assembly 34b axially beyond the electromagnetic components facilitates ease of access to bearing assembly 34b and avoids any potential interference due to metallic elements of bearing assembly 34b being disposed within the electromagnetic components of motor 12. The protruding lower bearing assembly 34b allows for easier access to bearing assembly 34b for maintenance, such is by providing access to lubricant system 98 without requiring repositioning of or any disassembly of motor 12. Lubricant fitting 114 can be accessed from outside of motor 12 to provide lubricant to lubricant system 98. Plug 116 can be accessed from outside of motor 12 to drain lubricant from lubricant system 98.

Figure 5A:
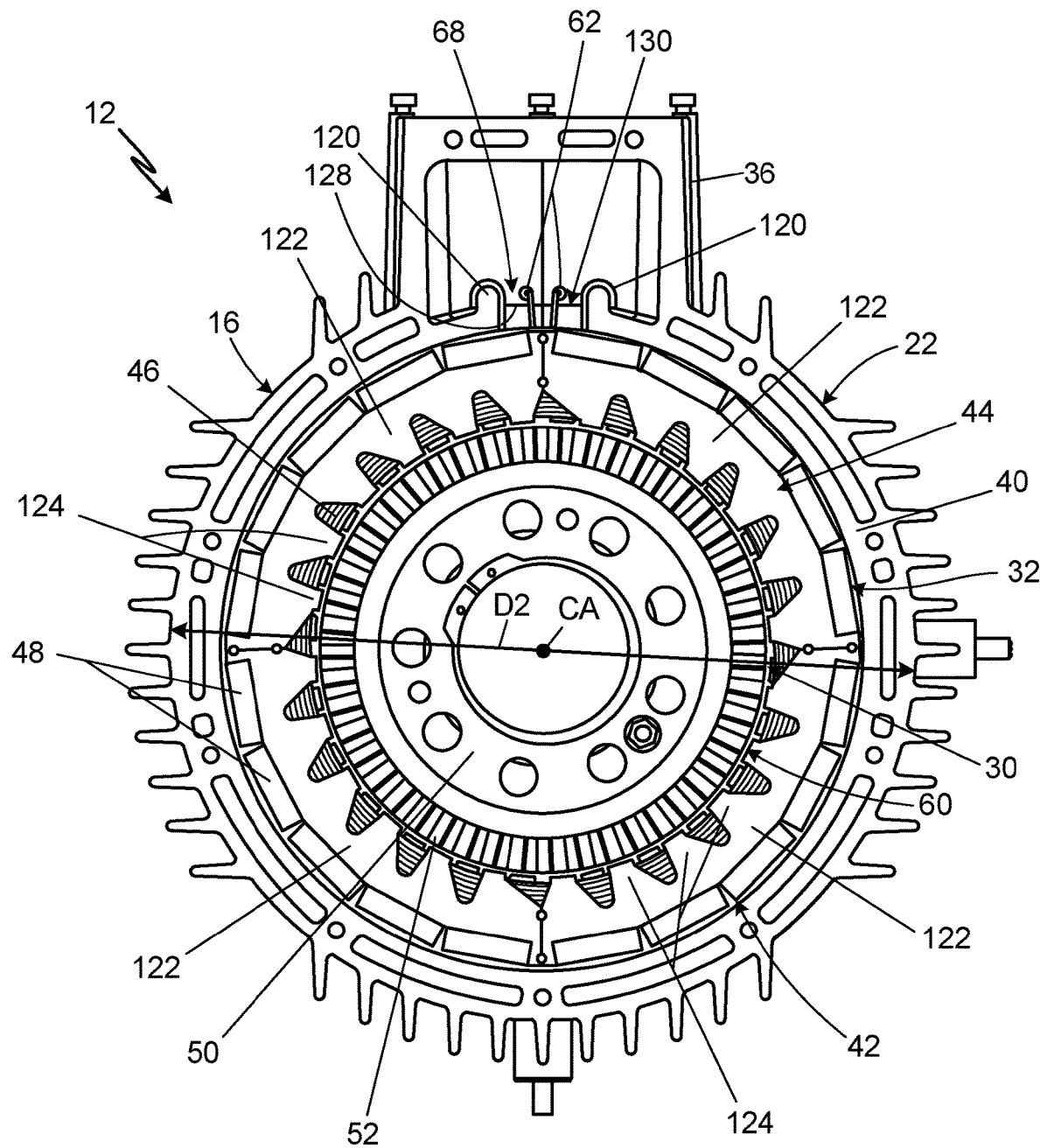
FIG. 5A is a cross-sectional end view of the motor.
Figure 5B:
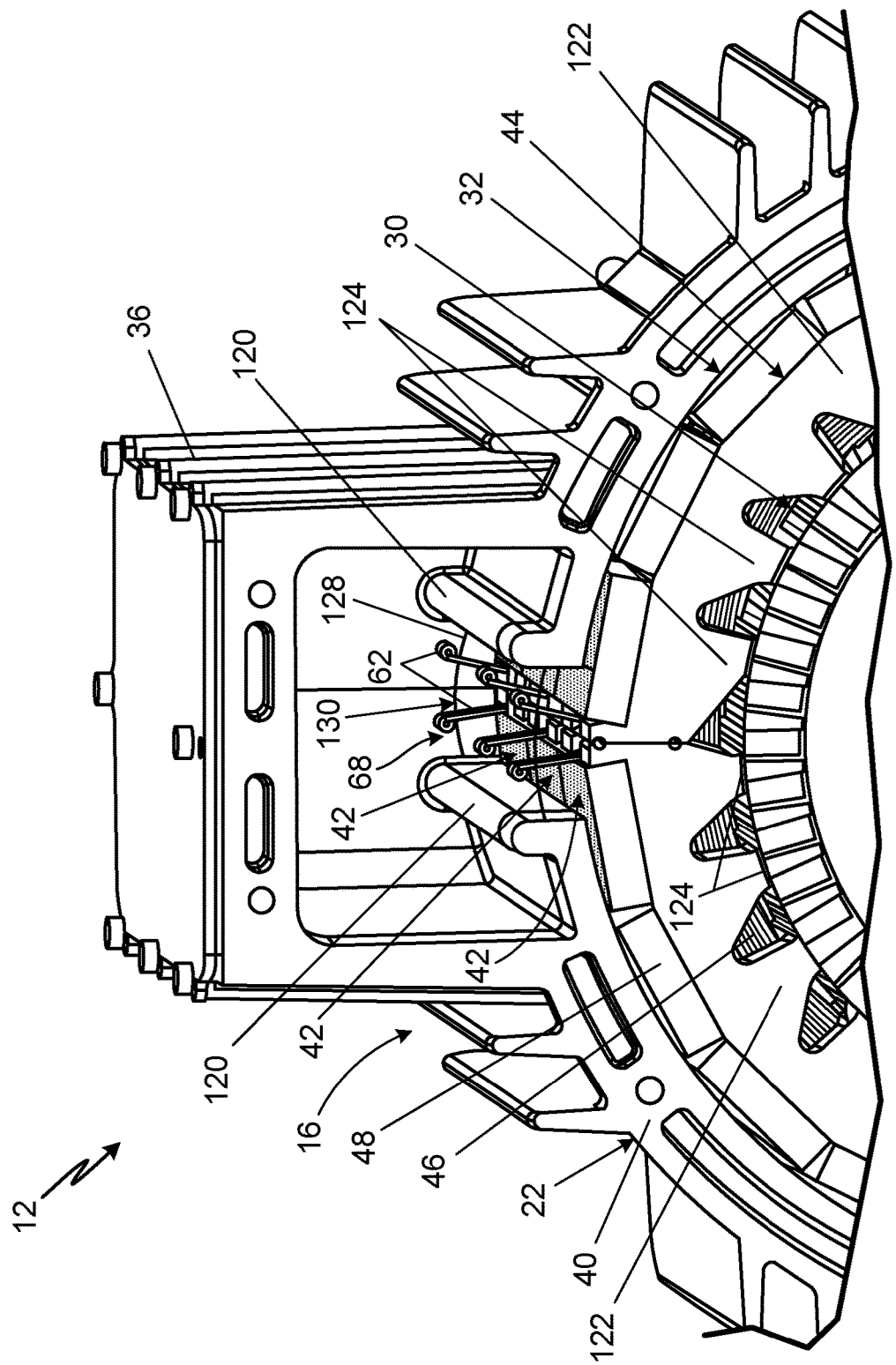
FIG. 5B is an isometric cross-sectional view of a portion of the motor.

FIG. 5A is a cross-sectional end view of motor 12. FIG. 5B is an isometric cross-sectional view of a portion of motor 12. FIGS. 5A and 5B will be discussed together. Motor housing 16, rotor 30, and stator 32 of motor 12 are shown. Stator housing 22 and junction box 36 of motor housing 16 are shown. Stator housing body 40, housing gap 68, and ridges 120 of stator housing 22 are shown. Stator phases 42 of stator 32 are shown. Stator phases 42 include flux rings 44, coils 46, and axial returns 48. Each flux ring 44 is formed by ring segments 122 assembled together to form the flux ring 44. Each ring segment 122 includes spurs 124. Coils 46 include wire ends 62. Rotor body 50 and permanent magnet array 52 of rotor 30 are shown.

Rotor 30 is disposed radially within stator 32 in the example shown. As such, motor 12 is shown as an inner rotator. While the rotor 30 rotates inside of the stator 32 in this embodiment, the rotor 30 can rotate outside of the stator 32 in various other embodiments and it is understood that the same aspects presented herein can still apply. As such, it is understood that the principles discussed herein can be applied to outer rotating motors in which the rotor is disposed around and rotates about the stator.

Junction box 36 extends radially relative to other portions of stator housing 22. Junction box 36 encloses a space within which wires (not shown) form electrical connections with coils 46 of stator phases 42. The space extends radially between a base formed by stator housing body 40 and an upper edge formed by a cap of junction box 36. Ridges 120 are disposed within junction box 36. Ridges 120 are formed as projections that extend away from common axis CA and into the space enclosed by junction box 36. Ridges 120 extend radially relative to the outer surface of stator housing body 40. Ridges 120 are disposed on opposite circumferential sides of housing gap 68. Ridges 120 define the circumferential edges of housing gap 68 through which the control and/or power wires can pass to connect with motor 12. The circumferential housing gap 68 can be, as shown, axially elongate. The housing gap 68 can thus be configured to have a larger axial extent than circumferential extent. The housing gap 68 can have a larger axial dimension than circumferential or radial. For example, a height of a ridge 120 from an inner radial edge of stator housing body 40 to the outer radial tip of ridge 120 can be less than the axial length of housing gap 68.

Stator phases 42 are arrayed axially along common axis CA. Rotor 30 is configured to rotate within stator 32 on a rotational axis coaxial with common axis CA. Each stator phase 42 includes a pair of flux rings 44 disposed on opposite axial sides of a coil 46 of that stator phase 42. Each stator phase 42 includes axial returns 48 that span axially between the flux rings 44 of the stator phase 42. The axial returns 48 electrically connect the flux rings 44 of a stator phase 42, as discussed in more detail below. The axial returns 48 of each stator phase 42 extend circumferentially about the common axis CA to form an annular array of axial returns 48. The annular arrays of axial returns 48 of the multiple stator phases 42 are disposed coaxially about common axis CA.

Each flux ring 44 extends annularly about common axis CA. Each flux ring 44 includes spurs 124 that are arrayed annularly about common axis CA. In the inner rotator example shown, the spurs 124, extend annularly about the rotor 30. Spurs 124 can also be referred to as flux projections as each spur 124 projects radially relative to a body of an associated flux ring 44 and narrows circumferentially to concentrate flux towards rotor 30. The annular arrays of spurs 124 are disposed coaxially with the axis of rotation of rotor 30. In the example shown, each flux ring 44 is formed by an annular array of ring segments 122 that are fixed relative to each other to form that flux ring 44. Each ring segment 122 is an arcuate band forming a portion of the flux ring 44, as discussed in more detail below. Each ring segment 122 extends arcuately, partially about the common axis CA. The ring segments 122 each support a subset of the axial returns 48 of a ring segment 122. The ring segments 122 further form a subset of the spurs of a flux ring 44. As such, ring segments 122 can be considered to form arcuate arrays of spurs 124, with the multiple arcuate arrays of a single flux ring 44 together forming the annular array of spurs 124. The multiple ring segments 122 are disposed at a common location along common axis CA and aligned circumferentially about common axis CA to form the flux ring 44.

The spurs 124 are polarized by current running through the coil 46 of the stator phase 42 of the flux ring 44. A plurality of coils 46 are arrayed along the motor axis. Each coil 46 is formed as a ring or hoop coaxial with the axis of revolution of rotor 30. Energizing the coil 46 with an AC signal polarizes the spurs 124 to electromagnetically interact with the rotor 30, as discussed in more detail below.

Stator 32 is embedded within potting compound (e.g., epoxy or other binding agent) within stator housing 22. The potting compound fixes elements of stator 32 relative to each other. As discussed in more detail below, the potting compound fixes the ring segments 122 of each flux ring 44 together to form the annular flux ring 44.

The potting compound can be applied as a liquid flow that then cures in place to fix the components of stator 32 relative to stator housing 22 and rotor 30. The potting compound extends between a first edge 126 (shown in FIGS. 13A and 13B) disposed at a first radial distance from common axis CA and a second edge 128 disposed at a second radial distance from common axis CA. The first radial distance is smaller than the second radial distance such that the first edge 126 is a radially inner edge of the potting compound and the second edge 128 is a radially outer edge of the potting compound. In the example shown, the first edge 126 defines a cylinder within which rotor 30 rotates. As such, the first edge 126 can at least partially define the air gap 60 between rotor 30 and stator 32. The potting compound can be formed as a continuous matrix between the first edge 126 and the second edge 128.

A contiguous matrix of potting compound fills the stator 32 from the inner potting compound first edge 126 to the outer potting compound second edge 128. Spurs 124 of the stator 32 can likewise be covered in potting compound, although an air gap 60 exists between the stator 32 and the rotor 30 (e.g., between the potting compound on the distal radial ends of the spurs 124 and permanent magnet array 52). As such, a continuous matrix of potting compound can extend from a location radially beyond the radial ends of the spurs 124 (radially inward in the example shown), beyond the coils 46 and axial returns 48, beyond the stator 32 itself, to the inner cylindrical edge of the stator housing body 40, which inner cylindrical edge is co-located with the outer potting compound edge 128 except for at the junction box 36, as discussed in more detail below.

Stator 32 can be considered to define a first cylinder on an inner radial side of the electrically conducting structure of stator 32 and a second cylinder on an outer radial side of the electrically conducting structure of stator 32. In the example shown, the first cylinder is on an inner radial side of the laminate structure of stator 32 and the second cylinder is on an outer radial side of the laminate structure of stator 32. The first cylinder can be formed tangentially to the radial faces of the spurs 124 while the second cylinder can be formed tangentially to the outer radial portions of axial returns 48.

A diameter of the first cylinder is greater than a diameter of the cylinder defined by the first edge 126. As such, the spurs 124 are embedded within the potting compound. The potting compound extends radially towards rotor 30 beyond the radial edge of each spur 124 to embed the spurs 124. The portion of air gap 60 defined by stator 32 is formed by the potting compound. The first edge 126 of the potting compound can be spaced radially inward from the radial face of each spur 124. The first edge 126 can thereby define a cylindrical void that includes an annular air gap 60 and further inside of which the rotor 30 rotates.

A diameter of the second cylinder can be less than a diameter of the cylinder defined by the second edge 128. As such, the continuous matrix of potting compound can extend to be disposed radially between the electrically conductive (e.g., laminate, in the example shown) structure of stator 32 and stator housing 22.

In some examples, potting compound can be applied to stator 32 through the housing gap 68 defined between ridges 120. Projection 130 is formed within the junction box 36 and is a most radially extreme part of the second edge 128. Projection 130 is schematically shown in FIG. 5A. The portion of second edge 128 forming projection 130 is disposed in the housing gap 68 between ridges 120. The remainder of the second edge 128 of the potting compound can be at the inner radial surface of stator housing body 40. The inner radial edge of the potting compound is cylindrical and only slightly larger than the rotor 30 to provide an air gap 60 between stator 32 and rotor 30. The outer radial edge of the potting compound is generally cylindrical and includes projection 130.

Projection 130 is disposed circumferentially between the ridges 120. Ridges 120 define an area within the junction box 36 during the potting process to allow liquid potting compound to fill into the junction box 36 within overflowing into other portions of the junction box 36. In the example shown, projection is axially elongate. Projection 130 is formed by the continuous matrix of the potting compound and extends into the junction box 36 through housing gap 68, thereby forming a portion of the second edge 128 further from common axis CA than other portions of the potting compound within stator housing 22. The continuous matrix of potting compound can thereby define air gap 60 and form projection 130.

Wire ends 62 electrically connect with the coils 46 to provide power and/or control signals to coils 46. In the example shown, each coil 46 includes first and second wire ends 62 that represent the ends of the circuit through that coil 46. Wire ends 62 extend from the coils 46 and can extend through the potting compound to within junction box 36. As such, the wire ends 62 extend radially beyond the second edge 128 to be exposed within junction box 36. In the example shown, wire ends 62 extend through projection 130 and into junction box 36. Wire ends 62 are exposed to facilitate connection with power and/or control wires (not shown) for supplying control and/or power signals to the coils 46. In this way, individual electrical connections can be made with the wire ends 62 protected within the junction box 36 and by, at least in part, the wire ends 62 being embedded within the potting compound.

The potting compound that extends into the junction box 36 forms a molding gate from the continuous matrix of potting compound that prevent ingress of contaminants into motor 12. It is through the housing gap 68 that projection 130 is formed and that the wire ends 62 extend from inside the motor housing 16 to outside the motor housing 16. Connections to wire ends 62 are not shown but any variety of wired connection techniques can be used.

Projection 130 interfaces with stator housing 22 within housing gap 68. The projection of potting compound within the junction box 36 is integrally formed with and by the continuous matrix of potting compound. The projection 130 interfaces with stator housing 22 in the area between ridges 120 such that a notch and groove detent is formed that can arrest relative rotational motion between stator 32 and stator housing 22, facilitating the rotational output of motor 12.

The keyed interface provides a failsafe that facilitates continued operation of motor 12, e.g., in the event of delamination between stator 32 and stator housing 22. While projection 130 is shown as extending into junction box 36 in the example shown, it is understood that projection 130 can interface with any desired portion of a stator housing 22 and form a circumferential lock.

Figure 6A:
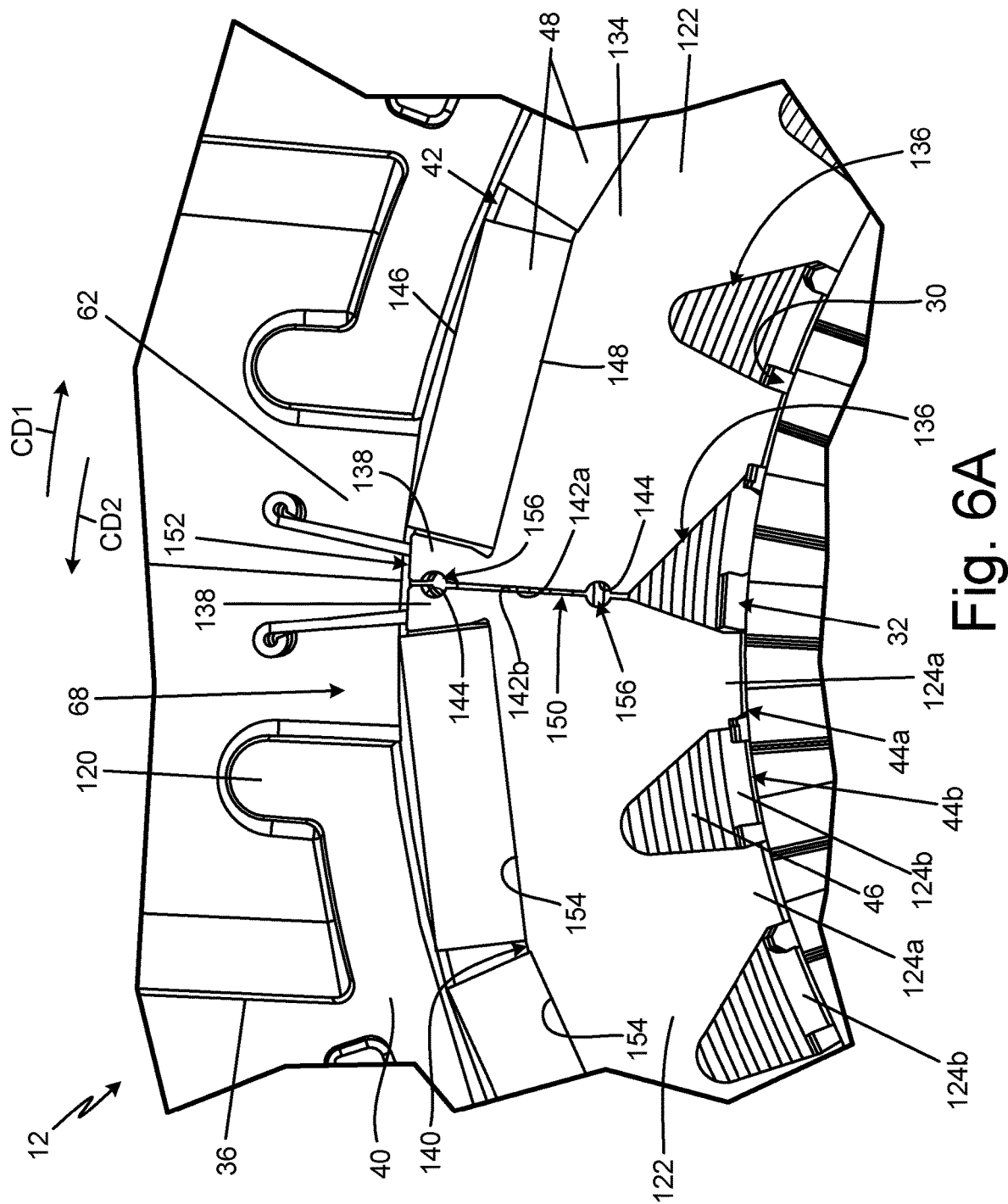
FIG. 6A is an enlarged cross-sectional end view of a portion of the motor.
Figure 6B:
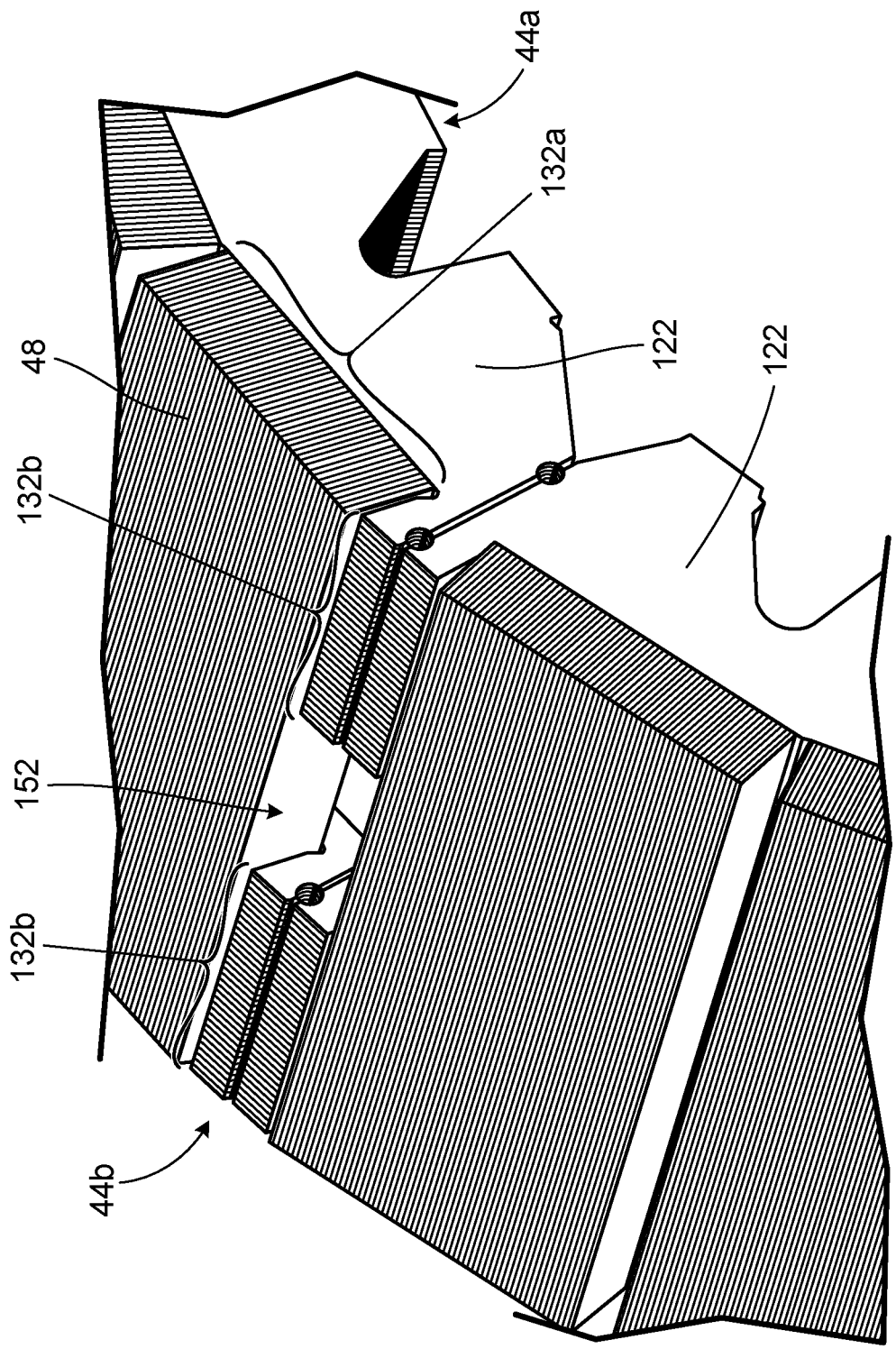
FIG. 6B is an enlarged isometric view of a portion of a stator phase showing the orientations of the laminate forming axial returns and flux rings.

FIG. 6A is an enlarged cross-sectional end view of a portion of motor 12. FIG. 6B is an enlarged isometric view of a portion of a stator phase 42 showing the orientations of the laminate stack 132a forming axial returns 48 and of the laminate stack 132b forming flux rings 44. Portions of stator housing 22 and junction box 36 are shown. A portion of stator phase 42a is shown. Flux rings 44a, 44b; coil 46; and axial returns 48 of stator phase 42a are shown. Spurs 124a of flux ring 44a and spurs 124b of flux ring 44b are shown. Adjacent end portions of two ring segments 122 of flux ring 44a are shown. Each ring segment 122 of flux ring 44a includes spurs 124a; segment body 134; troughs 136; return projections 138; return interface surface 140; circumferential ends 142a, 142b; and depressions 144. Wire ends 62 of coil 46 are shown. Each axial return 48 includes distal face 146 and proximal face 148.

Stator phases 42 are formed by a pair of flux rings 44, a coil 46, and an array of axial returns 48. Coil 46 is disposed axially between the laminate stacks 132b forming the opposing flux rings 44. Axial returns 48 span between the flux rings 44 of the stator phase 42 and are in direct contact with laminate of both flux rings 44 of the stator phase 42. Coil 46 is disposed radially between the laminate stacks 132a forming the axial returns 48 and rotor 30.

Each flux ring 44 is formed by laminate structure. In the example shown, flux rings 44 are formed by laminate sheets stacked together to form the laminate stack 132b of that flux ring 44. More specifically, each ring segment 122 is formed by a laminate stack 132b extending partially about the common axis CA. The multiple laminate stacks 132b of the multiple ring segments 122b together form the laminate structure of the flux ring 44. Laminate stacks 132b are oriented radially such that laminate stacks 132b have a radially oriented lamination grain. A line parallel to the common axis CA can pass through each layer of the laminate stack 132b of a flux ring 44. Each axial return 48 is formed by laminate structure. In the example shown, axial returns 48 are formed by laminate sheets stacked together to form the laminate stack 132a of that axial return 48. Laminate stacks 132a are oriented axially such that laminate stacks 132a have an axially oriented lamination grain (e.g., parallel with common axis CA). An arc centered on common axis CA can extend through each layer of each laminate stack 132a of a single array of axial returns 48. A line tangential to a circle centered on common axis CA can extend through each layer of a laminate stack 132a. As such, each stator phase 42 can be formed by two sets of radially oriented lamination stacks 132b (e.g., of the two flux rings 44) and third axially oriented laminate stack 132a (e.g., of the axial returns 48).

Each flux ring 44 is formed by multiple ones of ring segments 122 arranged about common axis CA to form flux ring 44. Ring segments 122 are positioned close to but out of contact with one another. Ring segments 122 are formed as arcuate segments that each extend partially about common axis CA. Ring segments 122 are disposed to form the arcuate flux ring 44, the flux ring 44 being a broken ring having circumferential gaps 150 formed therethrough, as discussed further herein.

Each ring segment 122 is an arcuate segment extending between opposing circumferential ends 142a, 142b. Circumferential end 142a of a first ring segment 122 and circumferential end 142b of a second, adjacent ring segment 122 are shown in FIG. 6A. As shown, circumferential end 142a of the first ring segment faces towards and is spaced from circumferential end 142b of an adjacent ring segment 122 with ring segments 122 formed into flux ring 44. Circumferential gap 150 is disposed between adjacent ones of the ring segments 122. Circumferential gap 150 is formed in the void between the opposed circumferential ends 142a, 142b of the two adjacent ring segments 122. The void of circumferential gap 150 can be filled with potting compound, as discussed in more detail below.

An arcuate array of spurs 124 extends from each ring segment 122. The multiple arcuate arrays together form the annular array of spurs 124 of the flux ring 44. For each ring segment 122, spurs 124 are disposed on a first radial side of the segment body 134. Each ring segment 122 can support a plurality of spurs 124, such as six or more or less spurs 124. In the example shown, spurs 124 extend radially inward towards common axis CA from segment body 134. Troughs 136 are disposed circumferentially between adjacent ones of the spurs 124. As shown, troughs 136 are formed between each spur 124 of a flux ring 44, including between spurs 124 of the same ring segment 122 and the spurs 124 of adjacent spurs 124. Spurs 124 are angled about common axis CA. In the example shown, spurs 124a of flux ring 44a are canted in circumferential direction CD1 (clockwise in the example shown in FIG. 6A) about common axis CA. As such, one circumferential side of each spur 124 has a greater length than the other circumferential side of the spur 124. As discussed in more detail below, the spurs 124b of flux ring 44b are angled in an opposite circumferential direction (e.g., in circumferential direction CD2 (counterclockwise in the example shown in FIG. 6A)) from spurs 124a.

Return interface surface 140 is formed on an opposite radial side of segment body 134 from spurs 124. Return interface surface 140 is configured to interface with and support one or more axial returns 48. In the example shown, return interface surface 140 is a multi-faceted surface having multiple return faces 154 each configured to interface with an axial return 48. As such, each ring segment 122 can support an arcuate array of axial returns 48 formed from a plurality of the axial returns 48.

The multi-faceted return interface surface 140 can be configured to orient axial returns 48 relative to common axis CA. In the example shown, the return faces 154 of the multi-faceted return interface surface 140 are configured to position axial returns 48 to be oriented orthogonal to radial lines extending from common axis CA. Axial returns 48 can be oriented such that for each axial return 48 a radial line extending from common axis CA is orthogonal to proximal face 148 and/or distal face 146. In some examples, axial returns 48 are positioned such that the orthogonal interface location is disposed at a circumferential centerpoint of the axial return 48. As such, axial returns 48 can be positioned such that a midpoint between the two circumferential sides of the axial return 48 is oriented orthogonal to a radial line extending from common axis CA. Return interface surface 140 is multi-faceted to interface with the full circumferential width of each proximal face 148, thereby providing a largest area for electrical conduction, providing efficient motor 12 operation.

Return projections 138 are formed on the same radial side of ring segment 122 as return interface surface 140. Return projections 138 extend radially from segment body 134 and can form a radially extreme portion of the laminate stack 132b flux ring 44. In the example shown, return projections 138 form the radially outermost portion of each ring segment 122, and thus form the radially outermost laminate portion of flux ring 44. In the example shown, ring segments 122 include a pair of return projections 138 disposed at circumferential ends 142a, 142b, respectively. The return interface surface 140 extends circumferentially between the pair of return projections 138. The axial returns 48 interfacing with a ring segment 122 are disposed circumferentially between the return projections 138. The return projections 138 of adjacent ring segments 122 together form flux ring tabs that extend radially from a main ring body of the flux ring 44.

Return projections 138 define an axially elongate wire gap 152 disposed circumferentially between adjacent axial returns 48. Wire gap 152 is formed in the space circumferentially between the end ones of axial returns 48 on adjacent ring segments 122. Wire gap 152 radially overlaps with coil 46 and, in the example shown, is aligned radially with projection 130. Wire gap 152 provides a location for wire ends 62 to extend from inside of stator 32 to outside of stator 32 through the annular array of axial returns 48. In the example shown, wire gap 152 provides a passageway for wire ends 62 to extend radially outward from within stator 32 to outside of stator 32. At least a portion of the laminate stack 132b forming flux rings 44 is disposed in the wire gap 152 circumferentially between the laminate stacks 132a of axial returns 48 to define the wire gap 152.

Axial returns 48 are disposed in an annular array extending circumferentially about the common axis CA. Axial returns 48 are formed in arcuate arrays that are symmetrically spaced around common axis CA. The axial returns 48 are asymmetrically spaced around common axis CA. The spacing of axial returns 48 facilitates flux flow to the oppositely angled spurs 124 of opposing flux rings 44 of a common stator phase 42. The spacing further facilitates the formation of wire gaps 152 that are radially aligned with coils 46 to facilitate a compact arrangement for wire ends 62 extending out of stator 32 from coil 46. As shown, multiple wire gaps 152 can be formed for a stator phase 42, even at locations where wire ends 62 are not extending out. The multiple wire gaps 152 facilitate assembling stator 32 with stator phases 42 oriented in any one of multiple circumferential orientations about common axis CA. In the example shown, any stator phase 42 can be mounted in any one of four rotational positions about common axis CA and will align with the other stator phases 42.

Axial returns 48 form the radial extreme of the stator 32. The laminate stacks 132a of the axial returns 48 forms the laminate portion of stator 32 disposed furthest from rotor 30. The laminate structure of the axial returns 48 is the radially-outermost laminate structure of stator 32. The stator can be considered to have a first radial side facing the rotor 30 and a second radial side facing away from the rotor 30. At least a portion of the radial-most laminate at the second radial side is formed by axial returns 48. At least a portion of the radial-most laminate at the first radial side is formed by spurs 124.

Stator 32 can be considered to have a first laminate boundary proximate the first radial side and a second laminate boundary proximate the second radial side. The laminate boundaries extend about the common axis CA and are defined by the laminate structure of stator 32. For example, the second laminate boundary of stator 32 can be defined by the laminate structure of axial returns 48. The laminate boundaries can be regular or irregular. For example, the second laminate boundary can be defined by a circle disposed tangential to axial returns 48 (e.g., to at least one distal face 146) and centered on common axis CA. The regular boundary can be considered to be formed by the portions of laminate structure through which the regular boundary passes. For example, the regular boundary is formed by only the laminate of axial returns 48 in the example shown, not by the laminate of flux rings 44 (e.g., at return projections 138) as that laminate of the flux ring 44 is spaced radially inward from distal faces 146. The irregular boundary can be considered to be formed by portions of laminate structure forming the radially outermost part of the laminate of stator 32 at that location, regardless of radial distance from center axis CA. In such an irregular boundary example, the arcuate arrays of axial returns 48 can be considered to form a single structure (e.g., in some examples the gaps between adjacent axial returns 48 of a single ring segment 122 are disregarded). The irregular boundary can be formed by alternating circumferential regions of laminate structure having an axial grain and laminate structure having a radial grain. The regions having the axial grain are radially aligned with axial returns 48 while the regions having the radial grain are radially aligned with return projections 138, and with wire gap 152 in the example shown. The regions formed by the laminate structure of one or more axial returns 48 have a larger circumferential width than the regions formed by the laminate structure of flux ring 44. The regions formed by the flux ring can be formed by physically separated laminate stacks 132b of adjacent ones of the ring segments 122.

A radial edge of the potting compound opposite the air gap 60 can be disposed directly between the axial returns 48 and the stator housing body 40. The radial edge of the potting compound can be disposed directly between the axial returns 48 and the stator housing body 40 at locations along common axis CA radially aligned with a flux ring 44 (e.g., such that a radial line would extend through laminate of the flux ring 44 and laminate of the axial return 48). The radial line extending through both the flux ring 44 and axial return 48 does not encounter any laminate structure on an opposite side of axial return 48 from the flux ring 44. The radial line can pass through only potting compound between the axial return 48 and the stator housing 22. The potting compound radial edge can thus be disposed directly between the stator housing body 40 and axial returns 48. The axial returns 48 can thus form the laminate structure of stator 32 radially closest to the radial edge of the potting compound opposite the radial edge adjacent the air gap 60. In some examples, for a stator phase 42, the radial line does not pass through any metallic component that is in electrical connection with the spur 124 of that stator phase 42 on an opposite side of axial return 48 from flux ring 44. In some examples, no laminate structure of a flux ring 44 is radially aligned with any axial return 48 on an opposite side of axial return 48 from the spur 124 of that flux ring 44.

In the example shown, axial returns 48 are disposed on the outer radial side of flux rings 44 to form the radially outermost laminate structure of stator 32. In such an example, the radial line from common axis CA passes through laminate stack of flux ring 44 then laminate structure of axial return. In such examples, the radial line does not pass through any metallic component that is in electrical connection with the spurs 124 of either flux ring 44 of the stator phase 42 after passing through the axial return 48. The radially distal side 146 of each axial return 48 (e.g., the side oriented away from flux ring 44) is radially further from common axis CA than any laminate stack 132b of flux ring 44, including return projections 138. In the example shown, at least a portion of the laminate array formed by laminate stacks 132*a* of axial returns 48 is disposed radially outward of all other metal laminate components of the stator phase 42 of the array of axial returns 48.

It is understood that, in examples having an outer rotator, the distal face 146 of each axial return 48 can be oriented radially inward towards the common axis CA. In either of the inner or outer rotator examples, the distal face 146 is oriented away from rotor 30 and the proximal face 148 is oriented towards rotor 30. It is understood that, in some examples, distal faces 146 of axial returns 48 can be at a same radial distance (e.g., level with) the outer radial faces of return projections 138, such that the radial extreme of the laminate structure of stator 32 is partially formed by axial returns 48 and partially formed by flux ring 44.

Axial returns 48 project radially to and, in some examples, beyond the laminate structure of the flux ring 44. Axial returns 48 thereby form or are level with the laminate structure of stator phase 42 positioned radially closest to inner surface of stator housing body 40. Positioning axial returns 48 as the closest laminate structure to the inner surface reduces the size of a radial gap present between the radial extreme of stator 32 and stator housing 22. For example, if a ring of laminate extended about the radially outer side of axial returns 48 link axial returns 48, then a larger radial gap will exist between the inner surface and the outer laminate of stator 32. That gap is filled by additional potting compound. The axial returns 48 forming the radial extreme of the laminate of stator 32 facilitates a smaller gap size, reducing the volume of potting compound, making for a smaller stator 32 and thus a smaller motor 12 size. The smaller gap size positions stator 32 as close to the wall of stator housing 22 as possible, enhancing heat transfer to and through stator housing 22, thereby providing improved cooling to motor 12.

Adjacent ones of the ring segments 122 are supported relative to each other to form flux ring 44. Adjacent ones of ring segments 122 are closely positioned but are separated from each other by circumferential gap 150. In various embodiments, including the illustrated embodiment, the ring segments 122 do not directly contact each other. Moreover, there is no metal ring (inside or outside the ring formed by ring segments 122) or other metal or electrically conductive superstructure that directly connects to, or otherwise contacts, the discrete ring segments 122 forming a flux ring 44. Instead, the ring segments 122 are suspended (and insulated) in the continuous matrix of potting compound. In some examples, the only metal or electrically conductive parts that the ring segments 122 directly contact are the axial returns 48. The ring segments 122 are not directly connected to wires or pre-molded polymer pieces. Eliminating a support superstructure such as an inner or outer ring allows the ring segments 122, which can be formed from stampings, to be smaller whereas the cost of stampings can be particularly high for larger pieces. Each ring segment 122 can be considered to float within the potting compound, with direct contact with other laminate structure limited to the axial returns 48 abutting that ring segment 122.

The potting compound embeds the ring segments 122. For example, the continuous matrix of the potting compound can extend from radially inward of the ring segments 122 from the inner potting compound edge (covering the faces of spurs 124), to radially outward of the ring segments 122, such as to the inner cylindrical surface of the stator housing 22 and, in some areas, beyond the inner surface (e.g., by projection 130 extending into junction box 36). Each ring segment 122 of a flux ring 44 is suspended in the potting compound such that the plurality ring segments 122 are not directly connected by metallic structure. As such, all, or substantially all, of the external surfaces of each ring segment 122 can be covered by potting compound. The coverage of the potting compound on the radially inwardly facing faces of spurs 124 can be thin, such as less than about 0.127 millimeters (mm) (less than about 0.005 inches (in.)), however, other thicknesses are possible. In this way, the spurs 124 are covered by potting compound. The potting compound can thus serve as a void filler and connector, similar to grout, filling in the spaces between the ring segments 122. The potting compound can structurally support and insulate between the ring segments 122 so that the ring segments 122 do not touch each other or electrically short to one another. The potting compound can also brace the stator 32 to the inside of the stator housing 22 to prevent movement of the stator 32 relative to the stator housing 22.

The potting compound fills the circumferential gaps 150 between adjacent ring segments 122. The adjacent ring segments 122 are not connected by structure other than the potting compound. The circumferential gap 150 is filled with the potting compound and, in some examples, is bridged only by the potting compound. In some examples, a bisect line through the at least one circumferential gap 150 from an inner radial end of the at least one circumferential gap 150 to the outer radial end of the at least one circumferential gap 150 extends through only potting compound within the at least one circumferential gap 150. The bisect line can, in some examples, be a radial line such that circumferential gaps 150 are radially oriented.

The potting compound extends to the inner housing surface of the stator housing 22 and fixes stator 32 to stator housing 22 at that interface. The ring segments 122 are fixed to the other ring segments 122 of that flux ring 44 and fixed to the stator housing 22 by the same component (e.g., the continuous matrix of potting compound). While the adjacent ring segments 122 are not in direct contact, the adjacent ring segments 122 can support or push on each other through the potting compound that fills in the circumferential gap 150, in the manner of a keystone. The keystone configuration of ring segments 122 reduces the material required to form motor 12, thereby decreasing costs and providing a more compact configuration of motor 12. Circumferential gaps 150 provide breaks between adjacent ring segments 122 that provide electrical separation between the ring segments 122. The electrical separation inhibits resistive heating and prevents the formation of eddy currents.

The potting compound fixes ring segments 122 relative to each other and fixes the stator 32 to the stator housing 22. The ring segments 122 being fixed relative to each other and the stator housing 22 by the continuous potting compound matrix. Having the same component fix ring segments 122 together and to stator housing 22 reduces the materials required to assemble motor 12 and provides a simpler configuration that provides a more compact configuration for motor 12. Flux rings 44 are formed by discrete ring segments 122 that are supported relative to each other and not in direct contact.

Depressions 144 are formed on each circumferential end 142*a*, 142*b* of each ring segment 122. In the example show, each circumferential end 142*a*, 142*b* includes a pair of depressions disposed at different radial distances from common axis CA. The depressions 144 extend into the material of the ring segment 122. In the example shown, the depressions 144 are formed as axially extending grooves on the circumferential ends 142*a*, 142*b*. The grooves can extend fully along the axial length of the ring segment 122 between the opposite axial faces of the ring segment 122. Adjacent ring segments 122 are oriented such that opposing ones of the depressions 144 on the two adjacent ring segments 122 are circumferentially aligned. While depressions 144 are shown as axially elongate grooves, it is understood that depressions 144 can be of any desired form for providing a non-uniform circumferential end face. For example, depressions 144 can be formed as one or more dimples on the end face of ring segment 122, among other options.

The opposing and aligned depressions 144 cooperate to form bulbs 156. In the example shown, bulbs 156 are axially elongate and generally cylindrical. In some examples, a cross-section of bulb 156 taken orthogonal to common axis CA can be a circle or an oval. The bulbs 156 allow for a greater mass of potting compound to fill circumferential gaps 150 between adjacent ring segments 122 to cause a non-linear circumferential gap 150. An enlargement of the potting compound can form within bulbs 156 relative to other portions of circumferential gap 150. The enlargement can be circumferentially wider between the circumferential ends 142a, 142b than other portions of circumferential gap 150. For example, a width between circumferential ends 142a, 142b (e.g., taken tangential to a circle centered on axis CA) at the enlargement (e.g., within depressions 144) is larger than a mean width of the circumferential gap 150 (e.g., larger than an average width of the circumferential gap 150 between the inner and outer radial ends of the circumferential gap 150. The circumferential gap 150 is thus prevented from being straight along the entirety of the interface between adjacent ring segments 122, which straight configuration could otherwise create a slip plane. In some examples, the multiple circumferential gaps 150 have varying widths among themselves. For example, a mean width of a first circumferential gap 150 can vary from a mean width of one or more other circumferential gaps 150.

The irregular bulbs 156 inhibit relative movement between the adjacent ring segments 122, particularly along circumferential gap 150. Bulbs 156 vary the separation distance between adjacent ring segments 122 and prevent formation of a uniform slip plane between adjacent ring segments 122. The variations in the potting compound between adjacent ring segments 122 caused by bulbs 156 fix the adjacent ring segments 122 relative to each other and resist deformation.

While ring segments 122 are shown as including non-uniform circumferential ends 142a, 142b that define circumferential gap 150, the non-uniform circumferential ends 142a, 142b are smoothly contoured. The smoothly-contoured circumferentially-oriented surfaces of circumferential ends 142a, 142b do not include abrupt changes in orientation, such as greater than 90-degree transitions between surfaces. The smooth contours of circumferential ends 142a, 142b simplify manufacturing of ring segments 122 and facilitate the potting compound lock between adjacent ring segments 122.

Figure 7A:
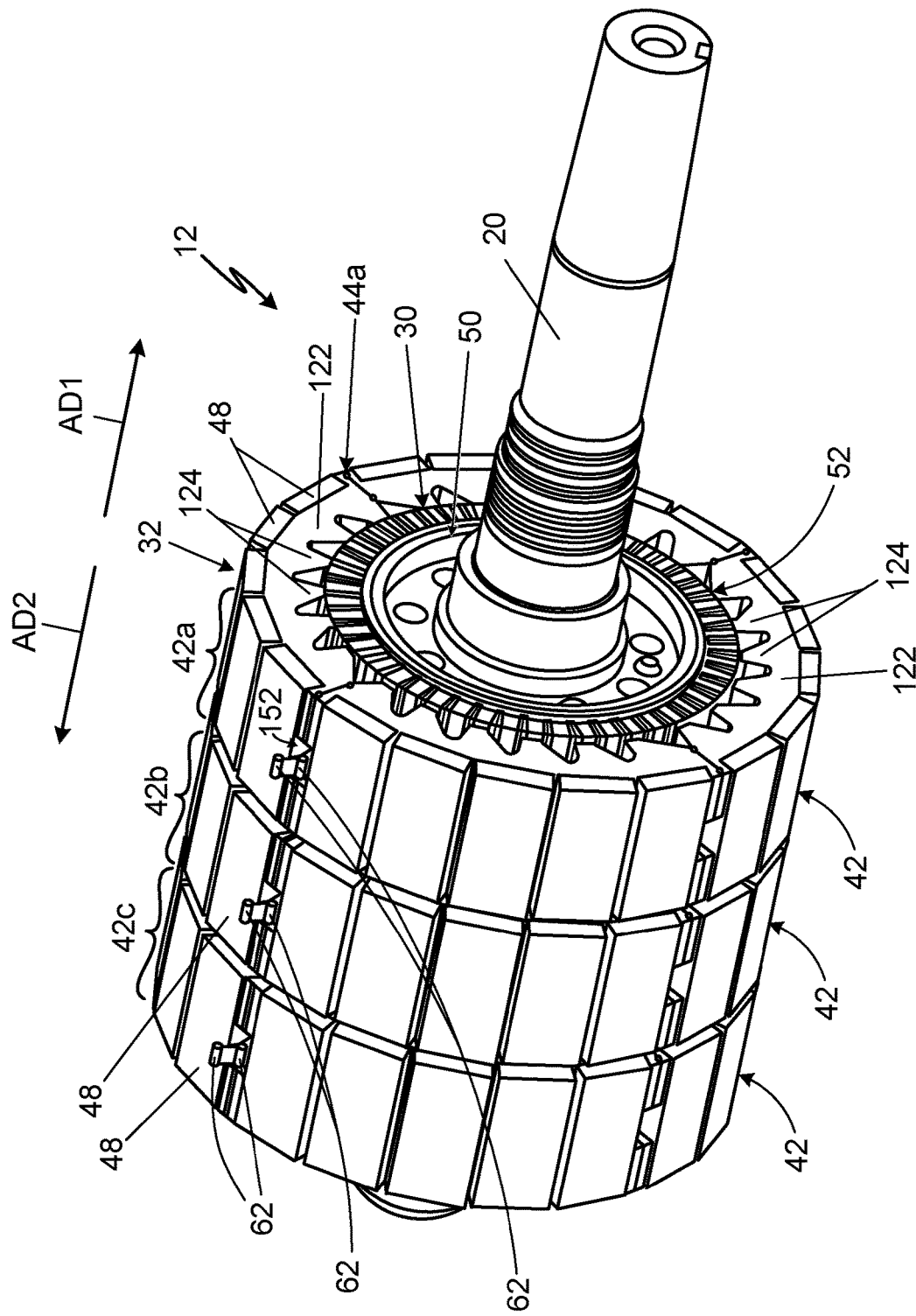
FIG. 7A is an isometric view of the motor with the housing removed.
Figure 7B:
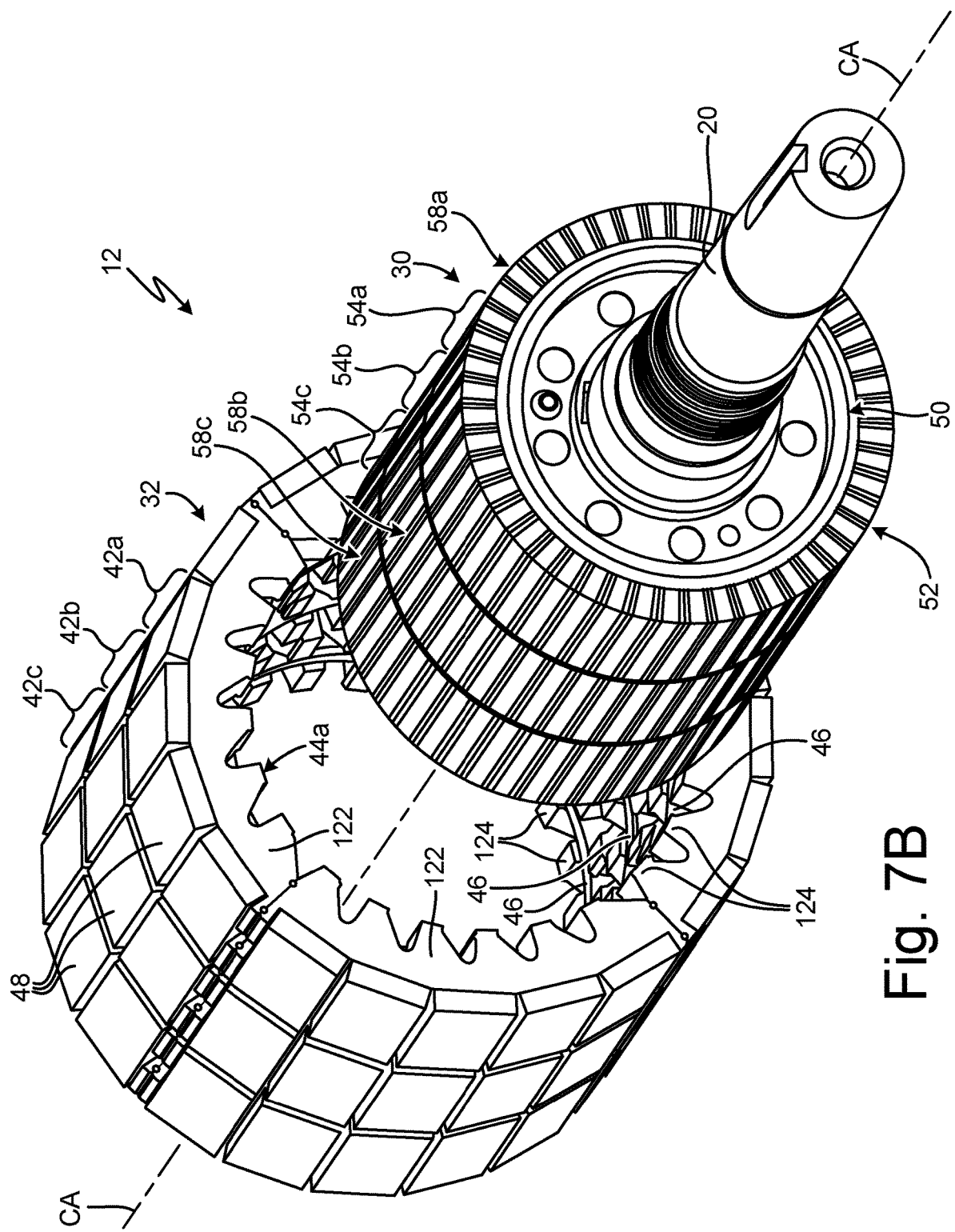
FIG. 7B is a partially exploded isometric view of the motor shown in FIG. 7A.
Figure 7C:
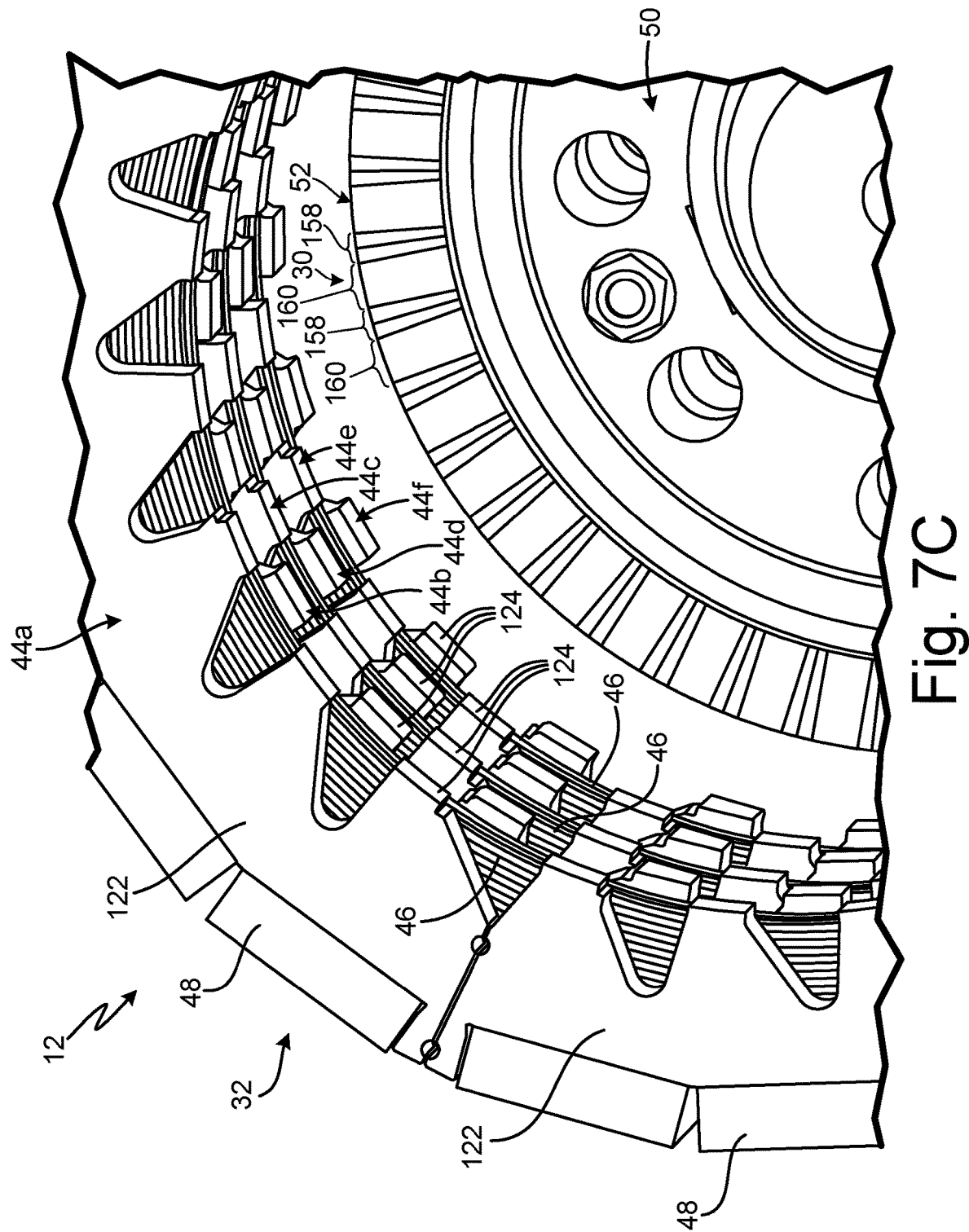
FIG. 7C is an enlarged, exploded, isometric view of a portion of the motor shown in FIG. 7A.

FIG. 7A is an isometric view of motor 12 with the housing removed. FIG. 7B is a partially exploded isometric view of the motor 12 shown in FIG. 7A. FIG. 7C is an enlarged, exploded, isometric view of a portion of motor 12. FIGS. 7A-7C will be discussed together. Drive shaft 20 rotor 30, and stator 32, of electric motor 12 are shown. Stator 32 is formed in stator phases 42a-42c. Stator phase 42a includes flux rings 44a, 44b, coil 46, and axial returns 48. Stator phase 42b includes flux rings 44c, 44d, coil 46, and axial returns 48. Stator phase 42c includes flux rings 44e, 44f, coil 46, and axial returns 48. Rotor 30 includes rotor body 50 and permanent magnet array 52. Rotor 30 is formed in rotor phases 54a-54c. Rotor phase 54a includes rotor hub 56 and magnet phase 58a. Rotor phase 54b includes rotor hub 56 and magnet phase 58b. Rotor phase 54c includes rotor hub 56 and magnet phase 58c.

Stator 32 and rotor 30 are disposed coaxially to generate a rotational mechanical output based on electrical inputs. In the example shown, rotor 30 is disposed within stator 32 such that motor 12 is an inner rotator, though it is understood that other examples of motor 12 are configured as outer rotators having a rotor disposed about the stator. Stator 32 defines a cylindrical interior that rotor 30 is disposed within. Stator 32 is formed by stator phases 42 arrayed along common axis CA. Each stator phase 42 is an annular ring disposed about common axis CA.

The stator phases 42a-42c do not overlap each other along common axis CA. Stator phases 42a-42c do not radially overlap along axis CA, such that a radial line extending from common axis CA passes through at most only one of the stator phases 42 and does not pass through multiple ones of the stator phases 42 at any given location along common axis CA. The electromagnetic components of each stator phase 42 (e.g., flux rings 44, axial returns 48, coils 46) only radially overlap with components of that same stator phase 42 and do not radially overlap with electromagnetic components of another of the stator phases 42. For example, axial returns 48 of stator phase 42a only support the function of stator phase 42a and not, for example, stator phase 42b or stator phase 42c. The flux rings 44a, 44b of stator phase 42a only support the function of stator phase 42a and not, for example, stator phases 42b, 42c. Each of the stator phases 42a-42c may only contain one coil 46 and two annular flux rings 44 and, in some cases, only two annular laminate pieces forming the flux rings 44.

Each stator phase 42 includes first and second flux rings 44 (e.g., flux rings 44a, 44b of stator phase 42a) disposed on opposite lateral sides of a coil 46 of that stator phase 42. Each flux ring 44 is formed by multiple ring segments 122 fixed relative to each other and extending about the common axis CA. Ring segments 122 are each arcuate portions of laminate structure that together form the annular laminate structure of flux ring 44. Spurs 124 are formed on a radial side of each ring segment 122 facing rotor 30.

An annular array of axial returns 48 extends between and electrically connects the opposing flux rings 44. The axial returns 48 are disposed on an opposite radial side of the flux rings 44 from rotor 30 and spurs 124. As shown, the axial returns 48 form the outermost electrically conducting portion of stator 32. In the example shown, axial returns 48 form the outermost laminate structure of the electric motor 12. The axial returns 48 extend radially outward from the common axis CA further than the flux rings 44 or other laminate or metal superstructure. In the example shown, stator 32 does not include any laminate or metallic superstructure. Stator 32 does not include a support structure on the side of the axial returns 48 opposite rotor 30. In the example shown, stator 32 does not include a support structure on the outer radial side of axial returns 48. Axial returns 48 can be connected directly to stator housing 22, such as by potting compound, and interface with other laminate portions of stator 32 on only the inner radial side of the axial return 48 and, in some cases, interface with the other laminate portions on one or both circumferential sides of the axial return 48. Axial returns 48 are not disposed radially between laminate structures of stator 32. Axial returns 48 are not disposed radially between laminate structure that is itself directly connected to spurs 124 by laminate or other electrically conductive structure.

For each stator phase 42, coils 46 are disposed axially between the first and second flux rings 44 of the stator phase 42. Wire ends 62 extend from coil 46 at a location radially between the axial returns 48 and rotor 30 to a location radially outside of the axial returns 48 through wire gaps 152. Wire ends 62 are thereby exposed outside of motor 12 and provide locations for electrical connections to be formed with motor 12. The wires ends 62 of the multiple coils 46 of the stator phases 42a-42c are shown as arrayed along the common axis CA and aligned axially along the common axis CA.

Rotor 30 is configured similar to stator 32, in the example shown, in that rotor 30 is formed from multiple rotor phases 54 configured to operate together. Rotor 30 includes multiple rotor phases 54 disposed along common axis CA. Rotor body 50 supports permanent magnet array 52. As best seen in FIG. 7B, the rotor 30 includes three rotor phases 54a-54c. Each rotor phase 54 corresponds with a single stator phase 42 of stator 32. It is understood that motor 12 can include more or fewer than three rotor phases 54. In the example shown, the rotor phases 54a-54c respectively radially overlap only with the stator phases 42a-42c along the common axis CA. For example, the rotor phase 54a does not radially overlap with the stator phase 42b or stator phase 42c but instead only radially overlaps with and corresponds with stator phase 42a.

Permanent magnet array 52 is formed by interposed permanent magnets 158 and concentrators 160. In the example shown, permanent magnet array 52 is formed by magnet phases 58a-58c respectively associated with rotor phases 54a-54c. The electromagnetic components of each magnet phase 58 (e.g., concentrators 160, and permanent magnets 158) only radially overlap with the particular rotor phase 54 of that magnet phase 58 and do not radially overlap with another of the rotor phases 54. For example, permanent magnets 158 of magnet phase 58a only support the function of rotor phase 54a and not, for example, rotor phase 54b, and the permanent magnets 158 of magnet phase 58a do not radially overlap with the rotor phase 54b.

Each rotor phase 54 includes a rotor hub 56 connected to the drive shaft 20 and forming a portion of the rotor body 50. In the example shown, each magnet phase 58 is disposed on the outer radial side of an associated rotor hubs 56. The example shown includes three rotor hubs 56 for the three rotor phases 54a-54c. Rotor hubs 56 are disposed such that the rotor hubs 56 respectively do not radially overlap each other along common axis CA and each rotor hub 56 only radially overlaps with one of the magnet phases 58, which is the magnet phase 58 disposed on that rotor hub 56.

Each of the rotor phases 54 may contain only one annular array of interspersed permanent magnets 158 and concentrators 160. For example, the three phase motor shown contains three annular arrays of interspersed permanent magnets 158 and concentrators 160 (e.g., of the three magnet phases 58a-58c), the three annular arrays themselves disposed along the common axis CA and not radially overlapping each other. Each annular array of interspersed permanent magnets 158 and concentrators 160 only radially overlaps with one coil 46 and two annular flux rings 44, and, in some cases, only two annular laminate pieces forming the flux rings 44. Each annular magnet phase 58 radially overlaps with only one annular array of axial returns 48. While rotor 30 is shown as including multiple rotor phases 54 each having a rotor hub 56, it is understood that some examples of rotor 30 can include rotor phases 54 sharing a common hub and with circumferentially offset magnet phases 58 each fixed to the common hub.

The magnet phases 58a-58c are circumferentially offset from each other about common axis CA. As shown, magnet phase 58a is misaligned with magnet phase 58b and magnet phase 58c, and magnet phase 58b is misaligned with magnet phase 58c. As shown, the permanent magnets 158 of the multiple rotor phases 54 are misaligned, or circumferentially offset, about the common axis CA with respect to each other. As such, a projection of the cross-section of any permanent magnet 158 of any magnet phase 58 taken orthogonal to common axis CA is misaligned with similar cross-sectional projections of the permanent magnets 158 of the other magnet phases 58. Likewise, the concentrators 160 of the respective magnet phases 58 are misaligned, or circumferentially offset, about the common axis CA with respect to each other. As such, a projection of the cross-section of a concentrator 160 of any magnet phase 58 taken orthogonal to common axis CA is misaligned with similar cross-sectional projections of the concentrator 160 of the other magnet phases 58. The magnet phases 58a-58c can thus be considered to be axially misaligned. The offset facilitates the phase offsets of the driving signals of the respective stator phases 42a-42c (e.g., the signals delivered 120-degrees electrically offset) to operate motor 12 at high efficiency and with improved torque output and speed control.

Each stator phase 42 includes two annular arrays of spurs 124 disposed on opposite axial sides of the coil 46 of that stator phase 42. Each stator phase 42 includes a first flux ring 44 and a second flux ring 44. The first flux ring 44 (e.g., flux ring 44a of stator phase 42a; flux ring 44c of stator phase 42b; and flux ring 44e of stator phase 42c) and its associated components and aspects can be referred to as forming an A-side of the stator phase 42. The second flux ring 44 (e.g., flux ring 44b of stator phase 42a; flux ring 44d of stator phase 42b; and flux ring 44f of stator phase 42c) and its associated components and aspects can be referred to as forming a B-side of the stator phase 42. The first flux ring 44 has a first annular array of spurs 124 and the second flux ring 44 has a second annular array of spurs 124. While rotor phases 54a-54c are axially offset, stator phases 42a-42c are axially aligned about common axis CA. Stator phases 42a-42c are axially aligned with each other along common axis CA. Stator phases 42a-42c, in particular the spurs 124 of the respective first ones of flux rings 44 of each stator phase 42 and the spurs 124 of the respective second ones of flux rings 44 of each stator phase 42, are aligned.

Within each stator phase 42, the first annular array of spurs 124 is disposed on a first axial side of coil 46 (e.g., spaced in first axial direction AD1 from its coil 46) while the second annular array of spurs 124 is disposed on the second, opposite axial side of the coil 46 (e.g., spaced in second axial direction AD2 from its coil 46). Within each stator phase 42, the spurs 124 of the first spur 124 are misaligned or offset (circumferentially and axially) relative to the spurs 124 of the second annular array of spurs 124 (e.g., spurs 124 of flux ring 44a are axially misaligned with spurs 124 of flux ring 44b). This misalignment of the A-side spurs 124 relative to the B-side spurs 124 allows flux coupling across the magnet phase 58 from oppositely polled spurs 124 of the respective A-side and B-side annular arrays of spurs 124, as discussed in more detail below.

While the spurs 124 within each stator phase 42 are offset and misaligned (circumferentially and axially), the respective A-side spurs 124 of the multiple stator phases 42 are axially aligned and the respective B-side spurs 124 of the multiple stator phases 42 are axially aligned. The respective A-side spurs 124 are axially aligned with each other across the multiple stator phases 42. The A-side spurs 124 can be considered to be directly axially aligned. As such, a projection of the cross-section of an A-side spur 124 of any stator phase 42 taken orthogonal to common axis CA is aligned with similar cross-sectional projections of the A-side spurs 124 of the other stator phases 42. In the example shown, spurs 124 of flux ring 44*a*, spurs 124 of flux ring 44*c*, and spurs 124 of flux ring 44*e* are axially aligned. Similarly, the respective B-side spurs 124 are axially aligned with each other across the multiple stator phases 42. A projection of the cross-section of a B-side spur 124 of any stator phase 42 taken orthogonal to common axis CA is aligned with similar cross-sectional projections of the B-side spurs 124 of the other stator phases 42. In the example shown, spurs 124 of flux ring 44*b*, spurs 124 of flux ring 44*d*, and spurs 124 of flux ring 44*f* are axially aligned. The spurs 124 of the flux rings 44*a*, 44*c*, 44*e* are aligned with each other but offset with respect to the spurs 124 of the flux rings 44*b*, 44*d*, 44*f*. Likewise, the spurs 124 of the flux rings 44*b*, 44*d*, 44*f* are aligned with each other but offset with respect to the spurs 124 of the flux rings 44*a*, 44*c*, 44*e*.

The AC signals routed through the coils 46 are synchronized to develop magnetic fields through the flux rings 44 in time with the rotational position of permanent magnet array 52 to drive rotation of rotor 30. The respective AC signals (e.g., sinusoidal or trapezoidal) delivered through the coils 46 in each stator phase 42*a*-42*c* are out of phase with respect to each other. In this way, the permanent magnets 158 forming the permanent magnet array 52 more frequently have flux peaks acting on them, as compared to synchronizing the sinusoidal AC signals, thereby providing a smoother torque profile acting on the rotor 30 along the axis of rotation of rotor 30. Moreover, the offset permanent magnets 158 of the multiple magnet phases 58 are positioned relative to each other to interact with the flux generated by the aligned stator phases 42*a*-42*c*. The embodiment of the electric machine 12 discussed has three phases corresponding to the three stator phases 42*a*, 42*b*, 42*c* and respective coils 46 therein. As such, three sinusoidal AC signals are delivered through the coils 46 120-degrees electrically offset. If there were two stator phases 42 and two coils 46, then the two sinusoidal AC signals would be 180-degrees electrically offset, or 90-degrees electrically offset for sets of four stator phases 42 and four coils 46. The magnet phases 58 are offset relative to each other about common axis CA to position magnet phases 58 at desired circumferential positions relative to the associated spurs 124 based on the offset between the driving signals.

Stator phases 42*a*-42*c* can each be of the same configuration such that a common base stator phase 42 can be used to form any one of the multiple stator phases 42 of the motor 12. Stator phases 42*a*-42*c* being aligned about common axis CA facilitates ease of assembly of motor 12 and prevents misalignment between the multiple stator phases 42. The aligned spurs 124 across the various stator phases 42*a*-42*c* facilitate the stator phases 42*a*-42*c* electromagnetically interacting with the misaligned magnet phases 58 to provide continuous smooth torquing by the electrically offset signals to thereby efficiently drive rotor 30 with a smooth torque profile.

Figure 8:
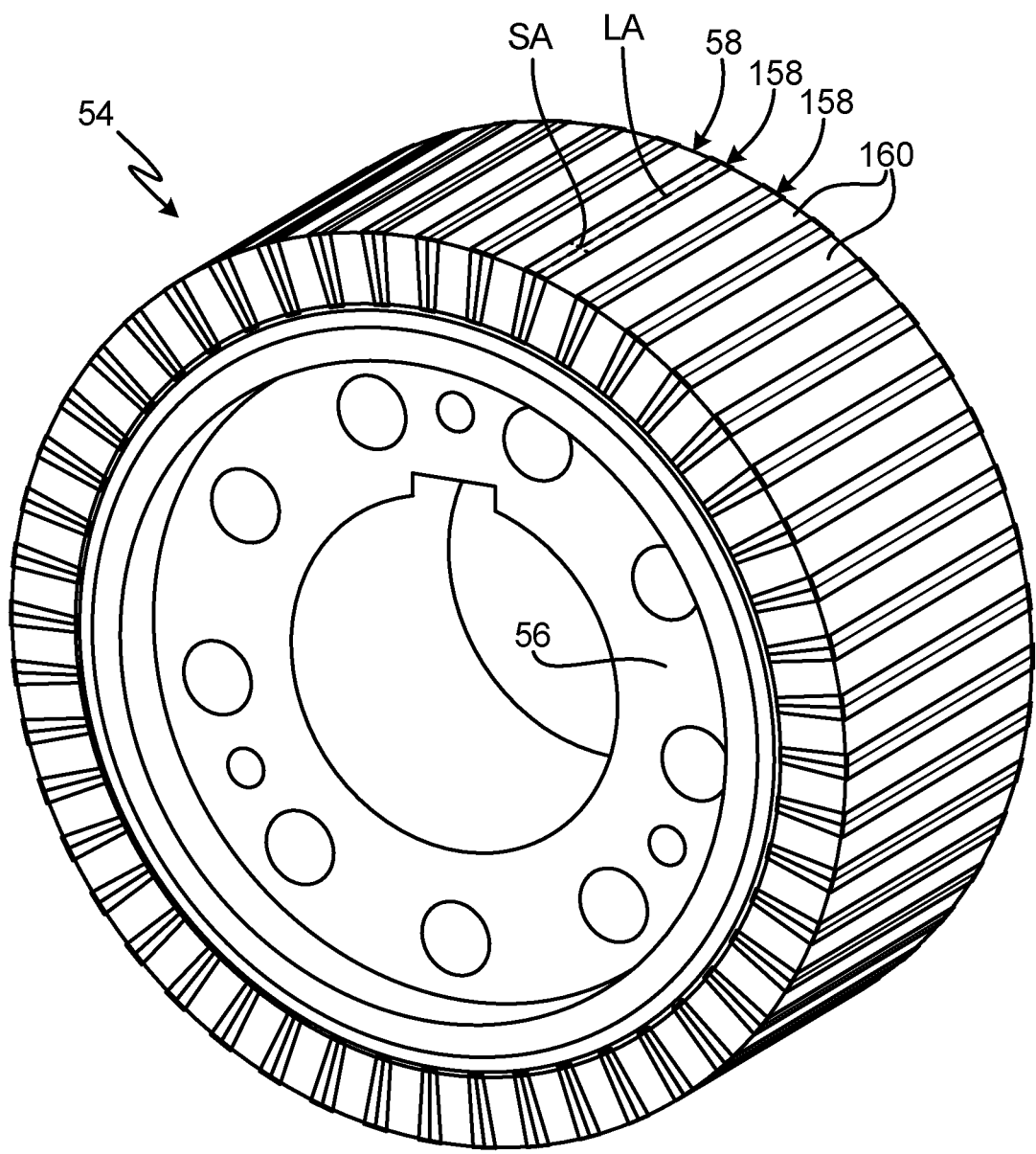
FIG. 8 is an isometric view of a rotor phase.

FIG. 8 is an isometric view of a rotor phase 54. Rotor phase 54 includes rotor hub 56 and magnet phase 58. The magnet phase 58 is the permanent magnet array associated with rotor phase 54 and forms all or a portion of the overall permanent magnet array 52 of the larger rotor 30.

Magnet phase 58 is formed from interspersed permanent magnets 158 and concentrators 160. Each permanent magnet 158 has a long axis LA. The long axis LA is orientated axially, parallel with the common axis CA. Each permanent magnet 158 also has a short axis SA. The short axis SA is orientated orthogonal to the long axis and tangentially with respect to a circle centered on the common axis CA. A length of the short axis SA can vary based on the radial distance from common axis CA. As shown, permanent magnets 158 can vary in width to have a longer short axis length further from common axis CA, in the example shown. The tapered permanent magnets 158 facilitate concentrators 160 having uniform widths along the radial extent, which is advantageous form forming concentrators from stacked laminate sheets.

Each permanent magnet 158 has permanent poles, north N (shown in FIG. 9D) and south S (shown in FIG. 9D), that are circumferentially orientated. More specifically, each permanent magnet 158 has a north pole at one end of the short axis SA and a south pole at the opposite end of the short axis SA. Each of the north pole and south pole extends the length of the long axis LA such that the north and south poles are divided by an axial interface along the long axis LA. The north and south poles of each permanent magnet 158 are not axially orientated in the way that magnets are typically divided to the north and south poles at opposite ends of a long axis. Each permanent magnet 158 is continuous along only one stator phase 42 and circumferentially offset relative to other permanent magnets 158 of other magnet phases 58 between the multiple stator phases 42. Each permanent magnet 158 extends straight, parallel to common axis CA and such that each permanent magnet 158 is positioned to magnetically interact with only the stator phase 42 associated with the rotor phase 54 of that permanent magnet 158.

The long axes LA of the permanent magnets 158 of a first rotor phase 54 (e.g., rotor phase 54*a*) are offset circumferentially from the long axes of the permanent magnets 158 of the other rotor phases 54 (e.g., rotor phases 54*b*, 54*c*). The long axes of the permanent magnets 158 of a second rotor phase 54 (e.g., rotor phase 54*b*) are offset circumferentially from the long axes of the magnets of the other rotor phases 54 (e.g., rotor phases 54*a*, 54*c*). In some examples, the long axes of the permanent magnets 158 of any rotor phase 54 are misaligned with the long axes of the permanent magnets 158 of one or more, up to all, of the other rotor phases 54.

Figure 9A:
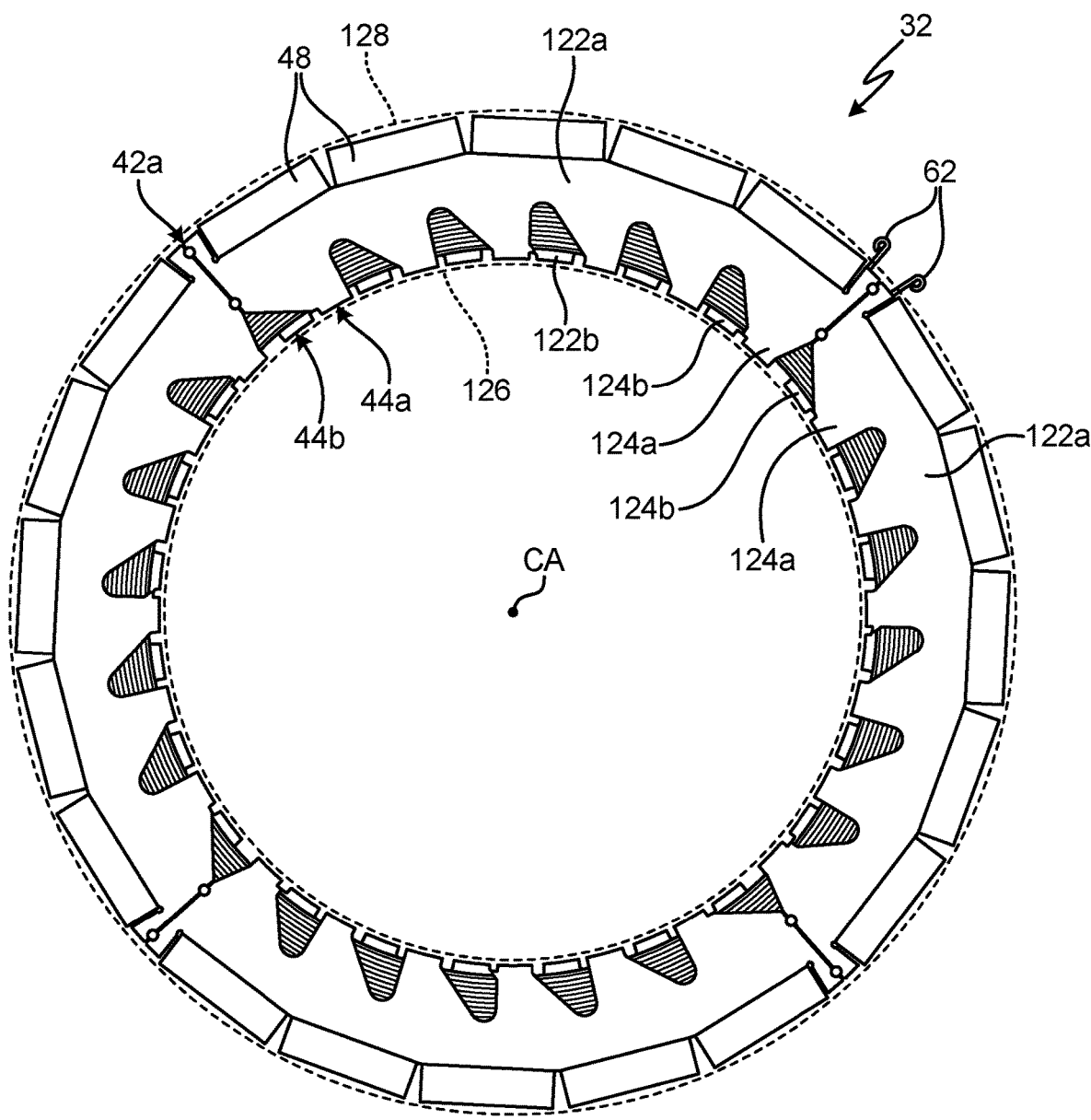
FIG. 9A is an end elevation view of a stator.

FIG. 9A is an end elevation view of stator 32. FIGS. 9B and 9C are isometric cross-sectional views of a portion of stator phase 42 that demonstrate how flux circuits are formed through flux paired spurs 124 of a stator phase 42. FIG. 9D shows a detailed view of flux paired spurs 124*a*, 124*b* of stator phase 42*a* interacting with concentrators 160 and permanent magnets 158 of the magnet phase 58*a* of rotor 30. Stator phase 42*a* includes flux rings 44*a*, 44*b*; coil 46; and axial returns 48. Flux ring 44*a* includes ring segment 122*a* having spurs 124*a*. Flux ring 44*b* includes ring segment 122*b* having spurs 124*b*.

As seen in the view of FIG. 9A, all three stator phases 42*a*-42*c* of motor 12 are stacked along one another and axially aligned such that only the spurs 124*a* of flux ring 44*a* and the spurs 124*b* of flux ring 44*b* are visible, whereas the spurs 124 of the flux rings 44 of stator phases 42*b*, 42*c* are obscured due to being aligned with the spurs 124*a*, 124*b* of the first stator phase 42*a*. In the example shown, the spurs 124 of flux ring 44*c* and flux ring 44*e* are axially aligned with spurs 124*a*, while the spurs 124 of flux ring 44*d* and flux ring 44*f* are axially aligned with spurs 124*b*. Such alignment of the spurs 124 across the stator phases 42*a*-42*c* allows each stator phase 42 to be assembled and aligned in the same manner, simplifying manufacturing, and reducing assembly time and part count. For example, the stator phases 42a-42c can be slid along an assembly fixture or mandrel in the same orientation. The stator phases 42a-42c can further be formed in a common configuration such that a single base configuration of a stator phase 42 can be used to form any stator phase 42 of the stator 32. The base configuration of stator phase 42 can be assembled along axis CA in any desired orientation (e.g., with either flux ring 44 facing in either axial direction AD1 or AD2) and aligned with other stator phases 42 to form stator 32, as discussed in more detail below. The arrangement reduces costs because a single part configuration of a stator phase 42 can be used to form any one of the multiple stator phases 42 of the motor 12.

The cylindrical profiles of the first edge 126 and second edge 128 of the continuous matrix of potting compound are shown in FIG. 9A. As discussed in more detail above, it is understood that an edge of the potting compound (e.g., second edge 128 in the examples shown) disposed opposite the rotor 30 can include a projection from the cylindrical profile. As discussed in more detail below, it is understood that an edge of the potting compound (e.g., first edge 126 in the examples shown) disposed closest to the rotor 30 can include one or more depressions formed into the potting compound. The cylindrical profiles shown are the profiles without the depressions or projections, but it is understood that the first edge 126 and second edge 128 are still considered to have the cylindrical profiles even if some irregularities exist (e.g., the projection and/or depressions). The first edge 126 is disposed radially inward of the radially inner edge of stator 32. The second edge 128 is disposed radially outward of the radially outer edge of stator 32. As such, the laminate portions of stator 32 are fully embedded within the continuous matrix of potting compound between the first edge 126 and the second edge 128. The radially extreme edges of the electromagnetic components of stator 32 (e.g., the outer edge of axial returns 48 facing away from rotor 30 and distal ends of spurs 124 facing rotor 30) are embedded within the continuous matrix of potting compound.

Two opposite polarized states are shown between FIGS. 9B and 9C. As shown, the alternating flux path directions and polarizations are developed through the laminate of the ring segments 122 and axial returns. The alternating flux paths can be due to a sinusoidal signal delivered to each coil 46 to flux pair adjacent spurs 124 on opposite sides of the coil 46. These flux paths polarize the spurs 124a relative to spurs 124b to attract or repel the permanent magnets 158 of rotor 30 in synchrony with rotation of the rotor 30 so that flux paired ones of the spurs 124 attract a permanent magnet 158 as the permanent magnet 158 approaches and/or repel the permanent magnet 158 as the permanent magnet 158 passes.

Flux paired spurs 124 refer to respective closest pairs of spurs 124 of opposed circular spur arrays of a stator phase 42 (e.g., the spurs 124 of flux ring 44a and spurs 124 of flux ring 44b are flux paired, the spurs 124 of flux rings 44c, 44d are flux paired, the spurs 124 of flux rings 44e, 44f are flux paired). While a subset of spurs 124a, 124b are highlighted as flux paired ones of spurs in FIGS. 9B and 9C, it is understood that these are examples and all spurs 124a, 124b of flux rings 44a, 44b similarly flux pair across the circular arrays of spurs 124a, 124b.

Each spur 124a is part of a similar flux circuit with its corresponding flux pair spur 124b. The flux paired spurs 124a, 124b pair generally axially with a spur 124a, 124b of the opposing circular array of spurs 124a, 124b, and not circumferentially to the neighbor spur 124a, 124b of the same circular array of spurs 124a, 124b because all spurs 124a of the circular array of spurs 124a will have the same polarity at any given time while all spurs 124b of the opposed circular arrays of spurs 124b of the same stator phase 42a will have the opposite polarity at any given time. More specifically, each spur 124a of the circular array of spurs 124a flux pairs with the closest spurs 124b of the circular array of spurs 124b on the other axial side of the coil 46. As shown in FIGS. 9B and 9C, a flux circuit is formed through flux paired spurs 124a, 124b such that the spurs 124a, 124b are respectively polarized, north and south.

Each spur 124 narrows circumferentially as the spur 124 extends radially away from the body of its flux ring 44. In the example shown, spurs 124 each narrow to a radial face 164 oriented towards rotor 30. The radial faces 164 can be planar and/or can be formed tangentially to a circle centered on common axis CA. The radial faces 164 provide a narrowed surface area relative to the body of the flux ring 44 and the axial returns 48. Spurs 124 narrow to concentrate flux towards rotor 30 to focus concentrated flux to a limited part of the rotor 30.

The flux is generated by coil 46. Specifically, an AC signal is run through coil 46 which rapidly builds and collapses the magnetic field due to the current reversal of the AC signal through the coil 46. As shown, flux concentrating material of the flux rings 44a, 44b and axial returns 48 is wrapped around at least three sides of the coil 46. The lamination grain of the flux concentrating material is shown in FIGS. 6B, 9B, and 9C. The lamination grain of the concentrators 160 and axial returns 48 can further be seen in FIG. 9D. Generally, flux flows with the grain, along the direction of lamination, as flux will generally follow the path of highest permeability and there is significant resistance to flux jumping from one layer of lamination to another layer of lamination. The lamination grain of the ring segments 122a, 122b, including the spurs 124a, 124b, is radially orientated while the lamination grain of the axial returns 48 is axially oriented. As such, the flux flows axially through the axial returns 48 and radially through the ring segments 122a, 122b and spurs 124a, 124b in a U shape toward the rotor 30, the base of the U on an opposite side of the coil 46 from the rotor 30 and the legs of the U oriented towards the rotor 30. FIGS. 9B and 9C represent the reversal of the AC signal and how the poles of the flux paired spurs 124a, 124b are switched.

The flux paired ones of spurs 124a, 124b are circumferentially offset from each other such that the spurs 124a are not axially aligned with spurs 124b. Being that the ends of the flux paired spurs 124a, 124b are not aligned axially because spurs 124a are offset circumferentially from spurs 124b, the flux circuit travels at least a limited distance circumferentially between the flux paired ones of spurs 124a, 124b. Therefore, a cumulative flux circuit comprised of a plurality of flux paired spurs 124a, 124b can flow in a spiral pattern circumferentially through the spurs 124a, 124b and axial returns 48. It is noted that, while most flux flows between flux paired ones of spurs 124a, 124b, the ring segments 122a, 122b permit flux flow between spurs 124a, 124b of the same ring segment 122a, 122b, such that a limited amount of flux may skip a flux paired spurs 124a, 124b to the next-over spur 124a, 124b of the same ring segment 122a, 122b. As discussed above, adjacent ring segments 122 of the same flux ring 44 (e.g., ring segments 122a of flux ring 44a) are separated by a circumferential gap that is bridged only by potting compound. The adjacent ring segments 122 are isolated to prevent flux flow between the adjacent ring segments 122, thereby inhibiting the formation of eddy currents and facilitating efficient motor 12 operation.

FIG. 9D shows a detailed view of flux paired spurs 124a, 124b of the stator 32 interacting with concentrators 160 and permanent magnets 158 of the magnet phase 58a. The AC signal through the coil 46 changes the direction of the electric current rapidly and thus changes the north-south polarity of the flux paired spurs 124a, 124b rapidly. The view of FIG. 9D shows an instance in which all spurs 124a of the circular array of spurs 124a have a north polarization while all spurs 124b of the circular array of spurs 124b have a south polarization.

Also at this instance, the spurs 124a, 124b are aligned with the concentrators 160 that are disposed circumferentially between the permanent magnets 158. The laminate of the concentrators 160 does not have an inherent polarization, but due to the fixed position of concentrators 160 between magnet poles, the concentrators 160 assume an effective permanent polarization as indicated. Each concentrator 160 contacts two permanent magnets 158. Each concentrator 160 contacts the same pole of the two permanent magnets 158. For example, a concentrator 160 will be in contact with two south poles or in contact with two north poles. The concentrators 160 take on alternating north and south polarization on opposite sides of each permanent magnet 158 depending on the polarization adjacent that concentrator 160. As indicated, each permanent magnet 158 is permanently polarized north and south on opposite sides of its short axis. The interleaved arrangement of permanent magnets 158 and concentrators 160 creates circumferential regions of oppositely polarized concentrators 160 and permanent magnet 158 poles.

The concentrators 160 route the magnetic flux from the permanent magnets 158 toward the stator 32. Flux circuits are completed across the air gap 60 between the stator 32 and rotor 30. The flux from the rotor 30 (specifically the permanent magnets 158) and the flux from the coil 46 (through the spurs 124a, 124b) interact in the air gap 60, and the resulting flux shear forces rotation of the rotor 30. The flux of the present motor 12 has an orientation transverse to the axis of rotation (which axis of rotation is coaxial with common axis CA). This is different from the radial flux orientation of traditional AC and DC brushless motors.

The flux generated by the stator 32 and acting on the rotor 30 is constantly changing due to both changing position of the permanent magnets 158 and concentrators 160 due to rotation of the rotor 30 as well as the change in polarization of the spurs 124a, 124b due to the change in the AC signal through the coil 46. As such, the AC signal routed through the coil 46 is synchronized with rotation of the rotor 30 to develop magnetic fields through the spurs 124a, 124b in time to the concentrators 160 approaching and departing the spurs 124a, 124b to simultaneously push and pull the permanent magnets 158 of the rotor 30 to provide the force that rotates the rotor 30. More specifically, the N—N and S—S interfaces repel while N—S interfaces attract, on approach and departure of alignment.

At least some of the respective AC signals (e.g., sinusoidal or trapezoidal) delivered through the multiple coils 46 forming stator 32 are out of phase with respect to each other. In this way, the rotor 30 (along its axial length) more frequently has flux peaks acting on it, as compared to synchronizing the sinusoidal AC signals, for a smoother torque profile acting on the rotor 30 along the axis of rotation of the rotor 30, which is also the common axis CA. The axially offset magnet phases 58 of the rotor 30 facilitates desired positioning of each permanent magnet 158 in permanent magnet array 52 (e.g., each permanent magnet 158 of the multiple magnet phases 58) being aligned within its own stator phase 42 in time with the electrically offset AC signals.

Being that the permanent magnets 158 are elongate and radially overlap with only a single coil 46, each permanent magnet 158 is electromagnetically acted upon by only a single one of the coils 46. In the example shown, each magnet phase 58 is acted upon and electromagnetically interacts with only one coil 46 of stator 32. As such, while multiple different coils 46 can electromagnetically act on the rotor 30 simultaneously, each magnet phase 58 electromagnetically interacts with only a single coil 46. Each permanent magnet 158 may be electromagnetically acted upon by only the single coil 46 throughout operation, regardless of the number of phases forming the motor 12. For example, motor 12 may include three phases and thus three coils 46, but the permanent magnets 158 of a single rotor phase 54 interact with only a single one of the coils 46 throughout operation. This is unlike conventional AC induction motors in which each magnet interacts will all windings of a traditional circumferential array of windings around the axis of rotation of the rotor. The motor 12 has multiple distinct motor phases that each include a stator phase 42 and associated rotor phase 54. Each motor phase is isolated from the other motor phases in that the stator phase 42 of a motor phase only interacts with the rotor phase 54 of that motor phase and not with other rotor phases 54 of the motor 12. Similarly, the rotor phase 54 of a motor phase only interacts with the stator phase 42 of that motor phase and not with other stator phases 42.

Traditional AC induction motors use a plurality of discrete coils that form an array of coils that extend circumferentially around the axis of rotation of the rotor. Each coil represents a potential pole for acting on a magnet. The discrete coils arrayed circumferentially around the axis of rotation in a conventional AC induction motor are out of phase with respect to each other. The discrete coils can interact with a small subset of the magnets at any given instance. The potential torque generated is proportional to the number of poles. The number of poles in such a motor is limited by the ability to fit discrete coils circumferentially around the axis of rotation within the motor. Coil windings can be made smaller, and the diameter of the stator can be made bigger, to accommodate more coils to support more poles, but this increases the size, weight, and cost of the motor and still has limits. Power can also be increased when the rotor is rotating at a relatively high rate, whereby more coil-magnet passes can be experienced per unit time. But such power increase requires the motor to operate at relatively high speed when some applications may desire low-speed output. Providing reduction gearing to reduce speed and increase torque to the desired high torque and low speed increases cost, weight, size, and friction.

Motors 12 according to the present disclosure are different from traditional AC and DC brushless motors. An aspect of the motor 12 is that it contains relatively few coils 46, only three in the illustrated embodiment. Unlike traditional AC and DC brushless motors, the coils 46 are formed from loops of wire that extend entirely around the axis of rotation of the rotor 30 (and the common axis CA). The axis of rotation of the rotor 30 (and the common axis CA) extends through each loop (e.g., the center of each loop). Each coil 46 is annular, and the loops of each coil 46 are likewise annular, and the circular planar profile of the coil 46 and loops are orthogonal to the common axis CA. The ribbon of each coil 46 forms a single hoop, which has multiple loops that overlap and contact one another to form the single hoop assembly. The coils 46 do not include loops that generate flux that rotates the rotor 30 through which the common axis CA does not extend. Instead of adding a coil for each pole as in traditional AC induction motors, the ring segments 122 and axial returns 48 surrounding a single coil 46 channel the flux to a plurality of spurs 124 that flux pair across the ring segments 122 to create a plurality of poles from the single coil 46. In the example shown, for each stator phase 42, one coil 46 supports twenty-four poles as the example flux rings 44 each include four ring segments 122 that themselves each include six spurs 124, although lower and higher poles can be created depending on the number of spurs 124. As such, activating one coil 46 activates many poles, whereas in some traditional AC and DC brushless motors activation of one coil activates only one pole. Multiple coils 46 are arrayed along the axis of rotation of the rotor 30 with each coil 46 interacting with a dedicated magnet phase 58 as part of the multiple motor phases, thereby multiplying the number of poles.

The high pole count eliminates or reduces the need for reduction gearing for outputs from motor 12, reducing off-center forces as well as reducing weight and friction, allowing for a more compact arrangement of motor 12 and, in some examples, of fan system 10. The motors 12 of the present disclose can generate high torque with a small package size, even at low speed. Therefore, gear reduction of a drive can be minimized or entirely excluded, providing savings on cost, size, weight, and friction.

Figure 10C:
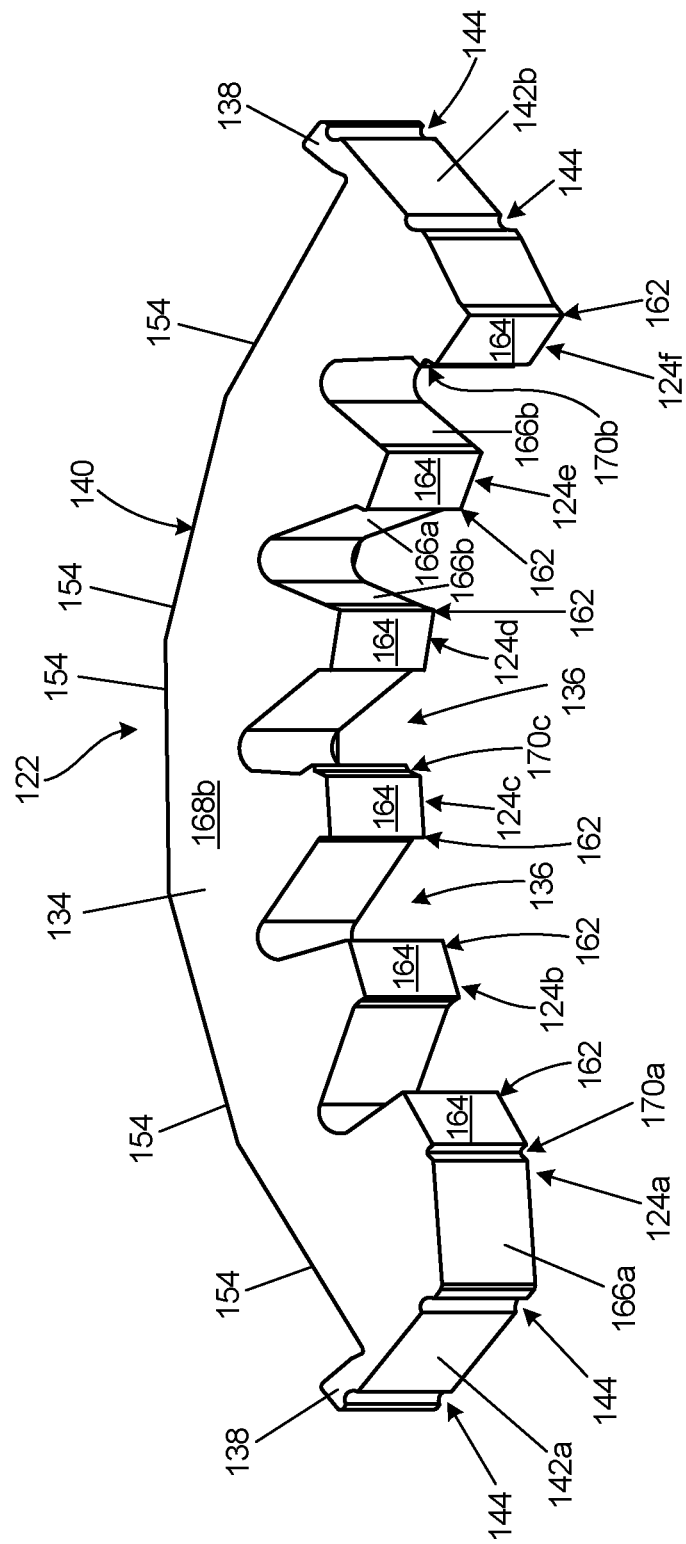
FIG. 10C is an isometric view of the single ring segment shown in FIGS. 10A and 10B.

FIG. 10A is a first elevational end view of a single ring segment 122. FIG. 10B is a second elevational end view of the single ring segment 122, taken from an opposite axial side relative to the view in FIG. 10A. FIG. 10C is an isometric view of the single ring segment 122 shown in FIGS. 10A and 10B. FIGS. 10A-10C will be discussed together. Ring segment 122 includes spurs 124; segment body 134; troughs 136; return projections 138; return interface surface 140; circumferential ends 142a, 142b; depressions 144; axial sides 168a, 168b; and notches 170. Each spur 124 includes plateau 162, radial face 164, and spur sides 166a, 166b. In the example shown, spurs 124 are indicated as spurs 124a-124f, though it is understood that ring segment 122 can include more or fewer spurs 124 as desired. Spurs 124a-124f are collectively referred to as "spur 124" or "spurs 124".

Ring segment 122 is formed as a curved piece configured to extend partially about the central axis of motor 12, which is coaxial with common axis CA. Ring segment 122 is an arcuate segment that is configured to be circumferentially aligned with and fixed relative to other ring segments 122 to form an annular flux ring 44. Ring segment 122 supports a swept subset of spurs 124. The spurs 124 of ring segment 122 form an arcuate array of spurs 124 extending radially from ring segment 122 and towards the rotor 30. Multiple arcuate arrays of the spurs 124 are circumferentially aligned about common axis CA to form the annular array of spurs 124 of a flux ring 44.

Ring segment 122 extends axially between axial sides 168a, 168b. The axial sides 168a, 168b are oriented axially relative to common axis CA. One of the axial sides 168a, 168b can be considered to form an interior face oriented towards the other flux ring 44 of the stator phase 42 of ring segment 122 and the other one of axial sides 168a, 168b can be considered to form an exterior face oriented away from the other flux ring 44. Either one of axial sides 168a, 168b can form the interior face or the exterior face, depending on an orientation of ring segment 122, as discussed in more detail below. The laminate sheets forming each ring segment 122 are stacked axially between the axially sides 168a, 168b.

Ring segment 122 extends circumferentially between circumferential ends 142a, 142b. Segment body 134 extends arcuately between the circumferential ends 142a, 142b. Return interface surface 140 is formed on an outer radial side of segment body 134. Return interface surface 140 extends axially between axial sides 168a, 168b. As discussed above, return interface surface 140 is multifaceted and includes an array of return faces 154 extending between circumferential ends 142a, 142b. Return projections 138 are formed at the circumferential ends 142a, 142b and project radially relative to return interface surface 140 and away from spurs 124. Return projections 138 circumferentially bracket the return interface surface 140.

Spurs 124 project from an opposite radial side of segment body 134 from return interface surface 140. Spurs 124 extend partially in a circumferential direction as spurs 124 extend from segment body 134. Spurs 124 extend circumferentially towards second circumferential end 142b and away from first circumferential end 142a. Spurs 124 are angled relative to the arcuate segment body 134 of ring segment 122. Each spur 124 includes a spur side 166a and a spur side 166b disposed on opposite circumferential sides of the spur 124. As shown, spur side 166a is pitched at a greater angle than spur side 166b relative to a radial line from the common axis CA. Spur side 166b is more closely aligned with the radial direction relative to spur side 166a. For some or all of spurs 124, spur side 166a can be considered to form an angled side of spur 124 and spur side 166b can be considered to form a radial side of spur 124. Spur sides 166a, 166b extend from the base ends of spurs 124 at the interface with segment body 134 to the tip ends of spurs 124 that form the portion of spur 124 closest to rotor 30. In the example shown, spur sides 166a, 166b converge towards plateau 162. Troughs 136 are disposed between adjacent ones of the spurs 124. The end spurs 124 (spurs 124a and 124f in the example shown) each partially define a distal trough 136 that is partially formed by an adjacent ring segment 122 of the flux ring 44. The distal troughs 136 are radially aligned with the circumferential gaps 150 between the adjacent ring segments 122.

Plateau 162 is formed at the radially innermost end of each spur 124, in the example shown. Plateau 162 can have a quadrilateral cross-section taken orthogonal to a radial line extending from the common axis CA. In some examples, plateau 162 has a generally rectangular cross-section facing permanent magnet array 52. Plateau 162 can be formed as a hexahedron, among other geometric options. In some examples, plateau 162 can be formed as a cuboid, among other options. In some examples, plateau 162 can have one or two pairs of convergent side faces. For example, one or both of the axially oriented sides of plateau 162 (e.g., a first face on axial side 168a oriented in a first axial direction relative to common axis CA and a second face on axial side 168b oriented in a second axial direction relative to the common axis CA) can be canted in an axial direction towards the other axially oriented side. In additional or alternative examples, one or both of the circumferentially oriented sides of plateau 162 (e.g., a first face extending from spur side 166a and a second face extending from spur side 166b) can be canted in a circumferential direction towards the other circumferentially oriented side.

Each spur 124 extends to radial face 164 formed at the apex of the spur 124. Radial face 164 formed as the distalmost portion of each spur 124. Radial faces 164 form the portion of the laminates structure of a flux ring 44 disposed radially closest to rotor 30. Radial faces 164 are configured to be oriented towards rotor 30 and disposed across the air gap 60 from permanent magnet array 52. In the example shown, each radial face 164 is formed at the distal end of the plateau 162 that is formed at the distal end of each spur 124. Radial face 164 has a rectangular surface area. Radial face 164 is oriented such that a radial line extending from common axis CA can be orthogonal to radial face 164. In some examples, the orthogonal radial line can intersect with the radial face 164 at a centroid of radial face 164, though it is understood that the orthogonal radial line can intersect radial face 164 at any desired location. In some examples, the orthogonal radial line can intersect the multiple radial faces 164 at varying locations across the multiple spurs 124 of the ring segment 122. For example, spurs 124 can be configured such that the intersect location of the orthogonal radial line and the radial face 164 shifts in one of the two circumferential directions across the spurs 124. For example, a first intersect location can be spaced a first distance in a circumferential direction from the centroid of a first radial face of the spur 124 closest to circumferential end 142a. A second intersect location at a second radial face 164 of the spur closes to circumferential end 142b can be spaced a second distance from the centroid of the second radial face 164. The second distance can be in either the same or the opposite circumferential direction as the first distance extends and can vary from the first distance.

Spurs 124 are formed on ring segment 122 such that spurs 124 are disposed circumferentially within the area of return interface surface 140. Return interface surface 140 extends circumferentially along an arc between the return projections 138. Spurs 124 project from ring segment 122 such that radial faces 164 and plateaus 162 are disposed within the arc. The arc length of an arc between the outer circumferential sides of the radial faces 164 of the circumferentially outermost spurs 124 (e.g., the spurs 124a, 124f closest to the circumferential ends 142a, 142b) is shorter than the arc length of an arc between the inner circumferential faces of the return projections 138, the arcs taken relative to the common axis CA. Positioning radial faces 164 within the area of return interface surface 140 radially aligns radial faces 164 of a ring segment 122 with the arcuate array of axial returns 48 of that ring segment 122. Radially aligning radial faces 164 with the arcuate array of axial returns 48 facilitates efficient flux flow through return faces 154, improving efficiencies and reducing heat generation.

Ring segment 122 includes notches 170 configured to facilitate fixing of ring segment 122 within potting compound. In the example shown, notches 170 are formed proximate the plateau 162. In some examples, notches 170 can be disposed at an opposite radial end of plateau 162 from the radial face 164. In the example shown, ring segment 122 includes a set of three notches 170, though it is understood that ring segment 122 can include fewer or more notches 170 as desired. A first notch 170a is formed on spur 124a and is disposed on a first circumferential side of spur 124a, which is the side including spur side 166a. A second notch 170b is formed on spur 124f and is disposed on a first circumferential side of spur 124f, which is the side including spur side 166a. A third notch 170c, formed as an intermediate notch circumferentially between the first notch 170a and the second notch 170b, is formed on spur 124c and is disposed on a second circumferential side of spur 124c, which is the side including spur side 166b.

The first notch 170a and second notch 170b are outer notches and the third notch 170c is an intermediate notch 170. Notches 170a-170c are spaced radially from radial faces 164 of spurs 124. Notches 170a-170c are recessed away from radial faces 164 and towards segment body 134.

The intermediate notch 170c is disposed such that three radial faces 164 and two troughs 136 are in a first region circumferentially between intermediate notch 170c and the first outer notch 170a on spur 124a and such that two radial faces 164 and three troughs 136 are in a second region circumferentially between intermediate notch 170c and the second outer notch 170b on spur 124f. The circumferential spacing of the notches 170a-170c balances ring segment 122 during assembly and manufacturing, as discussed in more detail below. Ring segment 122 can include at first and second notches 170 facing in the same and/or opposite circumferential directions. In the example shown, the intermediate notch 170c being disposed on an opposite circumferential side of its spur 124c than the outer notches 170a, 170b on their spurs 124a, 124f secures ring segment 122 during assembly as the alternating configuration of notches 170 on opposite circumferential sides of spurs 124 prevents ring segment 122 from shifting circumferentially off of any support or standoff disposed at the notches 170 to manipulate ring segment 122. Ring segment 122 includes a pair of notches 170a, 170c open in opposite circumferential directions and away from each other. Ring segment 122 includes a pair of notches 170b, 170c open in opposite circumferential directions and towards each other.

During motor 12 assembly, the notches 170 can serve as one or more surfaces that engage one or more standoffs during the potting procedure. Ring segments 122 engaging with a standoff may be necessary during the potting procedure, but it would not be ideal to have such standoff engagement at the radial face 164 because corrosion or debris collection along the radial face 164 would unintentionally narrow the air gap 60, risking abrasion or other damage when the rotor 30 rotates relative to the stator 32. But having a standoff at the notches 170, set radially back from the radial face 164, moves the area put at risk for corrosion or debris collection away from the radial face 164 and away from the air gap 60, thereby decreasing the likelihood of abrasion or other damage and providing a more robust motor 12 configuration. Notches 170 provide locations for direct contact with ring segment 122 during assembly of motor 12, which provides precise control for positioning ring segment 122 and maintaining the position of the ring segment 122 during the potting process. Precisely positioning and holding the positions of ring segments 122 is critical for forming a uniform flux interface and smooth torque profile, particularly as ring segments 122 are supported only by the potting compound and not other linking structure.

Depressions 144 are formed on the of circumferential ends 142a, 142b of ring segment 122. In the example shown, depressions 144 are formed as elongate grooves extending between axial sides 168a, 168b. It is understood, however, that depressions 144 can be of any desired configuration forming variances in a flat face of the circumferential ends 142a, 142b to facilitate the formation of position locks of potting compound in the depression 144.

Depressions 144 are oriented circumferentially and extend axially. In the example shown, depressions 144 are configured to align circumferentially with mating depressions 144 on an adjacent ring segment 122. In the example shown, each circumferential end 142a, 142b includes a plurality of depressions 144. The depressions 144 on circumferential end 142a of a first ring segment 122 of a flux ring 44 face the depressions 144 on circumferential end 142*b* of a second ring segment 122 of the flux ring 44 disposed adjacent to the first ring segment 122. The circumferential gaps 150 are formed in the region between the opposing circumferential ends 142*a*, 142*b*.

In the example shown, a radially inner one of the depressions 144 is disposed at a first radial location circumferentially aligned with the spurs 124. A radially outer one of the depressions 144 is disposed at a second radial location circumferentially aligned with return projections 138. Segment body 134 can be disposed in a banded region radially between the inner and outer depressions 144. For example, segment body 134 can be disposed in a region banded on a radially inner side by a first arc between the inner depressions 144 and centered on the common axis CA and banded on a radially outer side by a second arc between the outer depressions 144 and centered on the common axis CA. In some examples, a full radial extent of the segment body 134 is disposed fully within the region banded by the first and second arcs. For example, the first inner arc can extend through the troughs 136 and the second outer arc can be spaced radially outwards relative to return interface surface 140. The positioning of depressions 144 radially relative to segment body 134 braces ring segment 122 relative to adjacent ring segments 122 at the first and second locations to prevent twisting or radial displacement of ring segments 122. The main body portion of each ring segment 122 (e.g., segment body 134) is fixed by the potting compound bulbs on either radial side providing robust fixing of ring segments 122 relative to each other and facilitate being fixed by only potting compound.

Ring segments 122 are configured such that ring segments 122 can form a portion of either the first flux ring 44 or the second flux ring 44 of a stator phase 42. Ring segment is formed with a flip mirror configuration about a flip axis FA. The flip axis FA can be oriented radially relative to the common axis CA, among other options. Flip axis FA divides ring segment 122 into a first lateral portion 172*a* and a second lateral portion 172*b*. Ring segment 122 is operatively aligned with itself about flip axis FA such that a stator phase 42 can be formed from two flux rings 44 that are each formed from ring segments 122 having the same base configuration. As such, each ring segment 122 of a flux ring 44 can be configured identically. In some examples, each ring segment 122 of a stator phase 42 is configured identically (e.g., with the same base configuration). In some examples, each ring segment 122 of a stator 32 is configured identically.

The ring segments 122 of each flux ring 44 have the same base configuration and are disposed in one of a first orientation and a second orientation. The ring segment 122 is in the first orientation in FIG. 10A and is in the second orientation in FIG. 10B. The first and second orientations define the radial and circumferential locations of the spurs 124, segment body 134, circumferential ends 142, return interface surface 140, etc. of each ring segment 122. The ring segments 122 of the first flux ring 44 are placed in the first orientation and the ring segments 122 of the second flux ring 44 are placed in the second orientation flipped about the flip axis FA relative to the first configuration. The second orientation can be flipped 180-degrees about the flip axis FA. The angled spurs 124 facilitate misalignment of the spurs 124 between the opposing ring segments 122 of the opposing flux rings 44, while facilitating aligning of other laminate portions of those ring segments 122. For example, the ring segments 122 of both flux ring 44*a* and flux ring 44*b* of stator phase 42*a* (best seen in FIG. 7C) have the same base configuration. The ring segments 122 of flux ring 44*a* are placed in the first orientation and the ring segments 122 of flux ring 44*b* are flipped to be in the second orientation.

Ring segments 122 of opposing flux rings 44 operatively align with each other to facilitate flux generation. The ring segments 122 are partially aligned and partially misaligned. The return faces 154 of the return interface surface 140 of the ring segments 122 axially align between the first and second orientations of ring segment 122. The axially aligned return interface surfaces 140 facilitate mounting axial returns 48 in direct contact with the opposed ring segments 122 in the different orientations. The return faces 154 formed on the first lateral portion 172*a* of the ring segment 122 are configured to align with the return faces 154 formed on the second lateral portion 172*b* of ring segment 122 about flip axis FA. In the example shown, the central one of the return faces 154, through which flip axis FA extends, self-aligns about flip axis FA.

While the return faces 154 of the return interface surface 140 on lateral portion 172*a*, 172*b* are rotatably aligned about flip axis FA, spurs 124 are rotatably misaligned about flip axis FA. The subset the spurs 124 disposed on first lateral portion 172*a* are not mirrored with the spurs 124 on second lateral portion 172*b*. The spurs 124 on the first lateral portion 172*a* of ring segment 122 axially align with the troughs 136 between adjacent spurs 124 of the second lateral portion 172*b*. The spurs 124 on the second lateral portion 172*b* axially align with the troughs 136 between adjacent spurs 124 of first lateral portion 172*a*. Spurs 124 are misaligned between the two flux rings 44 such that radial faces 164 of the spurs 124 of a first flux ring 44 are disposed fully within the circumferential gap of the troughs 136 of the opposing, second flux ring 44. The radial faces 164 of the spurs 124 of the second flux ring 44 are disposed fully in the circumferential gaps formed by troughs 136 of the first flux ring 44.

Each ring segment 122 is thus operatively aligned about flip axis FA by being partially mirrored about flip axis FA. The portions of ring segment 122 radially between common axis CA and segment body 134 (e.g., troughs 136 and spurs 124, including spur sides 166*a*, 166*b*; plateaus 162; radial faces 164) are not mirrored about flip axis FA and are instead misaligned about flip axis FA. The portions of ring segment 122 radially outward of the interface between spurs 124 and segment body 134 (e.g., segment body 134, return interface surface 140, return projections 138) are mirrored about flip axis FA.

In the example shown, flip axis FA extends through the intermediate notch 170*c*. Having flip axis FA extend through notch 170*c* facilitates formation of mounting groove 174 during assembly of motor 12. In the example shown, notch 170*c* self-aligns between the first and second orientations while notches 170*a*, 170*b* align with each other in the first and second orientations. For example, a mounting groove 174 is formed by notch 170*a* on a first ring segment 122 of a first flux ring 44 and by notch 170*c* on a second ring segment 122 of a second, opposed flux ring 44. Another mounting groove 174 is formed by notch 170*b* on the first ring segment 122 and notch 170*a* on the second ring segment 122. The mounting grooves 174 (best seen in FIG. 9D) allow the multiple ring segments 122 forming a stator phase 42 to be aligned relative to each other and fixed relative to each other by a common fixture during the potting process. The mounting grooves 174 fix the opposing ring segments 122 relative to each other and based on the position of the other ring segment 122 to properly align ring segments 122 and simplify the manufacturing and assembly process. The mounting grooves 174 can extend between multiple stator phases 42 of the stator 32 to facilitate alignment between each ring segment 122 of each flux ring 44 of each stator phase 42 of the stator 32.

The flip mirror configuration of ring segment 122 provides significant advantages. A single base configuration of ring segment 122 can be used to form multiple flux rings 44 of multiple stator phases 42. A ring segment 122 of the base configuration can be used to form either flux ring 44 in a single stator phase 42, simplifying the manufacturing process and reducing part counts. The single base configuration reduces manufacturing costs by speeding the assembly process and requiring fewer individual parts.

Figure 11A:
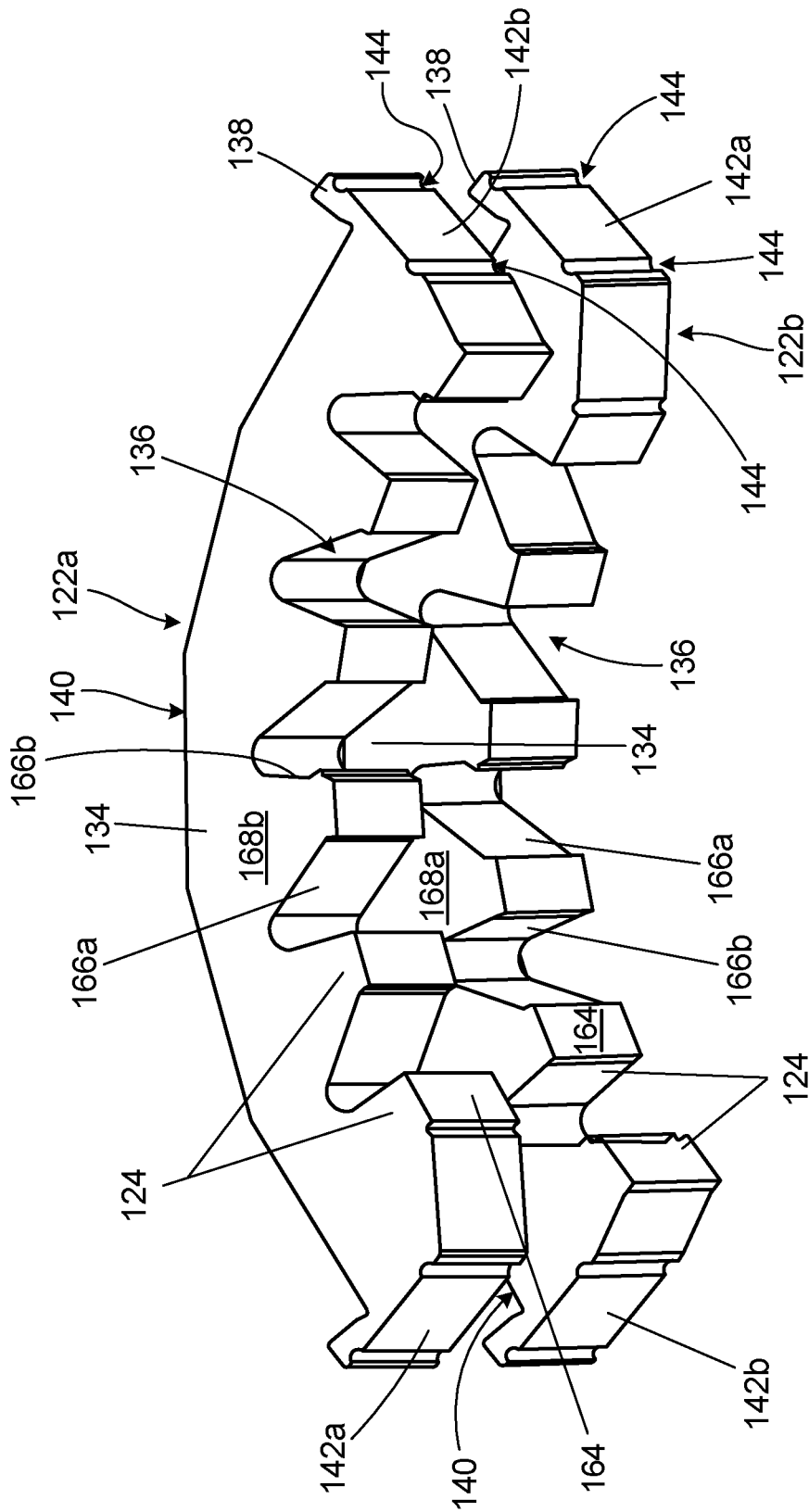
FIG. 11A is a first isometric view of opposing ring segments.
Figure 11B:
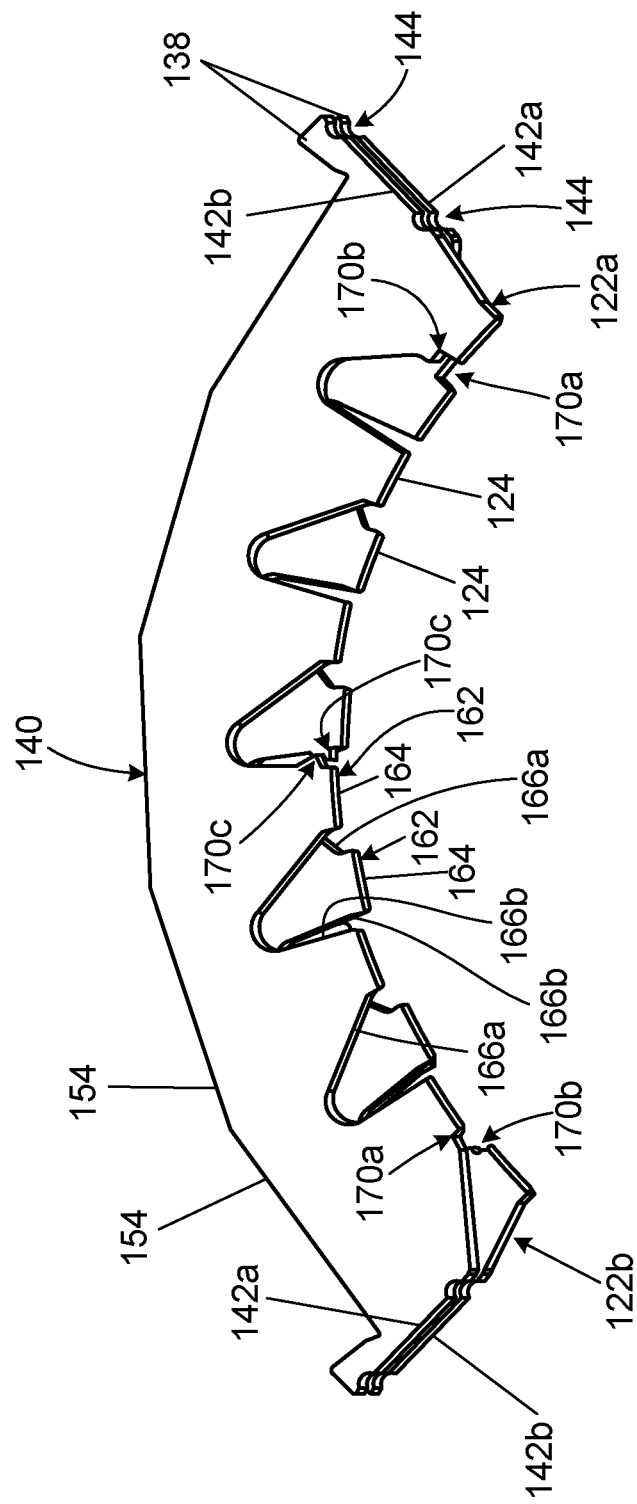
FIG. 11B is a second isometric view of opposing ring segments.

FIG. 11A is a first isometric view of opposing ring segments 122a, 122b. FIG. 11B is a second isometric view of opposing ring segments 122a, 122b. FIGS. 11A and 11B will be discussed together. Ring segment 122a is shown in a first orientation and ring segment 122b is shown in a second orientation. Ring segments 122a, 122b are of the same base configuration, but ring segment 122b has been flipped about its flip axis FA (FIGS. 10A and 10B) such that ring segment 122b is positioned as the flip mirror of ring segment 122a.

Ring segment 122a is in a first orientation and ring segment 122b is in a second orientation. Ring segment 122a are in a first orientation and ring segment 122b is in the second, flipped orientation such that the spurs 124 of ring segment 122a are axially misaligned with the spurs 124 of ring segment 122b. The first and second orientations are flipped relative to each other and the first and second axial positions are circumferentially offset from each other. Other than the axially misaligned spurs 124 between the ring segments 122a, 122b, ring segments 122a, 122b are axially aligned.

Figure 12:
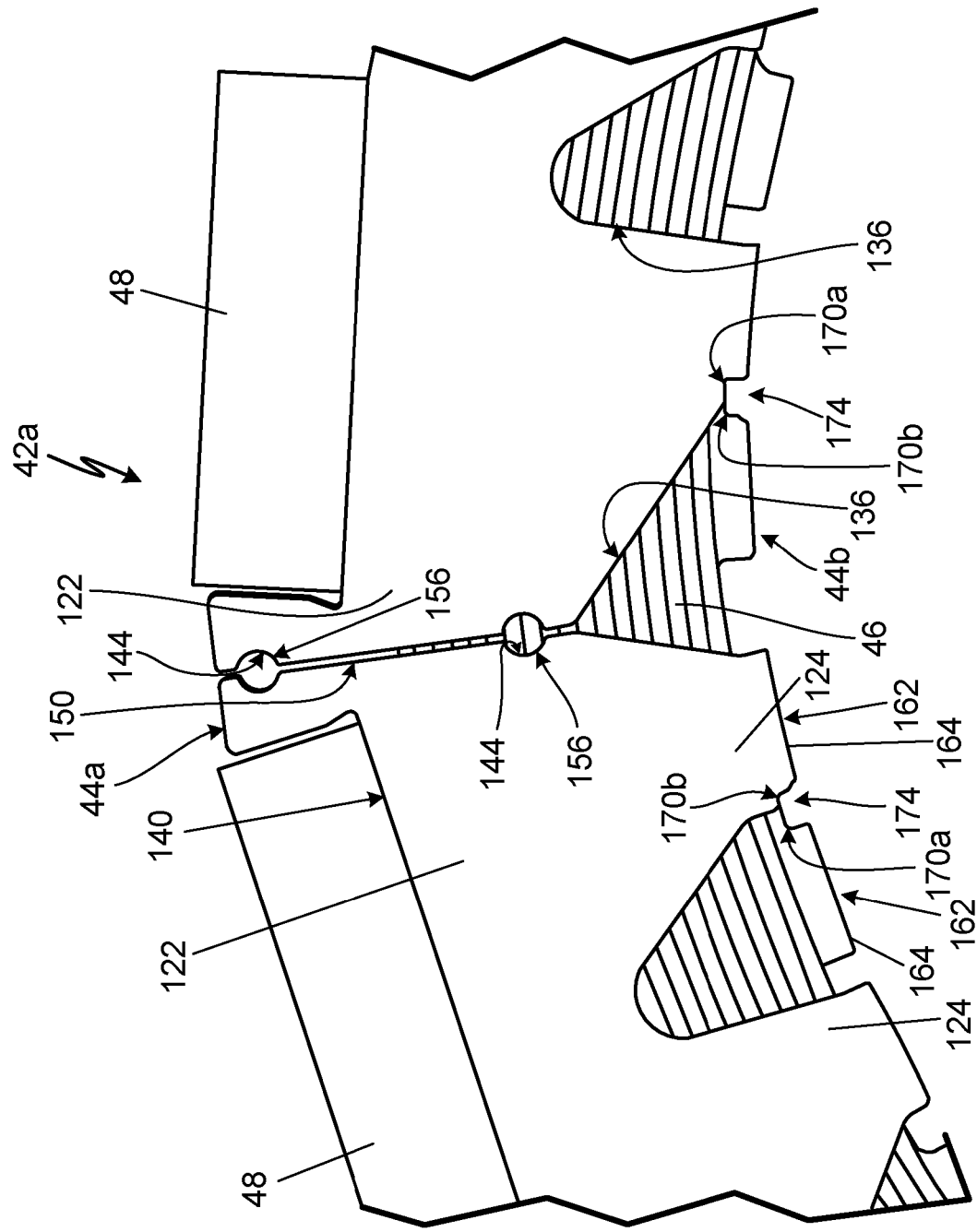
FIG. 12 is an enlarged end view of a portion of a stator phase.

As best seen in FIG. 11A, the spurs 124 of the first one of the ring segments 122a extend in a first circumferential direction CD1 and the spurs 124 of the second one of the ring segments 122b extend in the second circumferential direction CD2, opposite the first circumferential direction. As best seen in FIG. 11B, the angled spurs 124 are configured to be in a staggered arrangement circumferentially about common axis CA (best seen in FIG. 12). As such, the distal ends of the spurs 124 of ring segment 122a are disposed circumferentially between the distal ends of the spurs 124 of ring segment 122b. It is understood that spurs 124 between different flux rings 44 can be considered to be misaligned even though portions of the spurs 124 may axially overlap. In the example shown, portions of the spurs 124 proximate segment body 134 may axially overlap. However, the radial faces 164, in the example shown, have no axial overlap between the opposing ring segments 122 (as best seen in FIG. 12). The staggered arrangement facilitates formation of the flux circuits across stator phase 42, providing a smooth torque profile for driving rotor 30.

Spurs 124 are formed as angled projections (angled circumferentially) extending from segment body 134. The angled spurs 124 facilitate the base configuration of a ring segment 122 being used to form either the first or second flux ring 44 of a stator phase 42. The spurs 124 of the second flux ring 44 are aligned axially but flipped relative to the spurs 124 of the first flux ring 44. Such a configuration simplifies manufacturing because a single type of ring segment 122 can be made to form all annular flux rings 44, whereas merely flipping the ring segment 122 allows for the projection offset between the annular arrays of spurs 124 of each flux ring 44 of a stator phase 42. Put another way, the swept profile of the spurs 124 allows similar ring segments 122 to face the same direction when alignment is needed between the multiple stator phases 42a-42c (e.g., spurs 124 of flux rings 44a, 44c, 44e are aligned axially) but flipped when direct mirroring is not desired within each stator phase 42a-42c (e.g., spurs 124 of flux ring 44a, 44c, 44e are axially offset from the spurs 124 of flux rings 44b, 44d, 44f). As such, both spurs 124 of the first flux ring 44 and the spurs 124 of the second flux ring 44 can be formed by a plurality of similar or identical parts.

While spurs 124 of ring segment 122a are offset from the spurs 124 of ring segment 122b, the ring segments 122a, 122b are otherwise axially aligned. The ring segments 122a, 122b can be considered to be axially aligned in the flip mirror configuration. Each ring segment 122a, 122b has axial side 168a, which can also be referred to as a face side, that is oriented towards the coil gap disposed axially between ring segments 122a, 122b and within which coil 46 is disposed. Each ring segment 122a, 122b also has axial side 168b, which can also be referred to as an away side, that is oriented away from the coil gap between the ring segments 122a, 122b. The coil gap is thus bracketed between axial side 168a of ring segment 122a and axial side 168a of ring segment 122b. The axial sides 168a are oriented towards each other while the axial sides 168b are oriented away from each other.

Ring segments 122 are formed as flip mirrors such that if two ring segments 122 (e.g., of opposing flux rings 44a, 44b) are oriented in the same axial direction, then the ring segments 122 would axially align. For example, if axial side 168a of ring segment 122a faces in first axial direction AD1 and axial side 168a of ring segment 122b also faces in first axial direction AD1, then the ring segments 122a, 122b will fully axially align. Rotating one of the ring segments 122a, 122b about the radial flip axis FA to the second orientation (e.g., such that ring segment 122a is in the first orientation and ring segment 122b is in the second orientation) causes the ring segments 122a, 122b to be operably aligned but axially misaligned. In such a configuration, the axial side 168a of one of the ring segments 122a, 122b faces in the first axial direction AD1 and the axial side 168a of the other one of the ring segments 122a, 122b faces in the opposite, second axial direction AD2. The spurs 124 of the first ring segment 122 are axially offset from the spurs 124 of the second ring segment in the operably alignment to facilitate flux formation. For example, with ring segments 122a, 122b operably aligned, the segment bodies 134 of the opposing ring segments 122a, 122b are axially aligned, the return interface surfaces 140 are axially aligned, the return projections 138 are axially aligned, the depressions 144 are axially aligned; yet the spurs 124 are axially offset between the opposing ring segments 122a, 122b.

Ring segments 122 are configured such that circumferential end 142a of ring segment 122a is axially aligned with circumferential end 142b of ring segment 122b, and circumferential end 142b of ring segment 122a is axially aligned with circumferential end 142a of ring segment 122a. The facets of the return interface surface 140 axially align to facilitate both ring segments 122a, 122b, and thus both flux rings 44 of a stator phase 42, interfacing with axial returns 48.

The positions of the return faces 154 and spurs 124 of the first ring segment 122a are the flip mirror of the positions of the return faces 154 and spurs 124 of the second ring segment 122b. The positions associated with the first ring segment 122a are the flip mirror of the positions associated with the second ring segment 122b such that the positions of the spurs 124 of the first ring segment 122a with respect to the axial side 168a of that first ring segment 122a are the same as the positions of the spurs 124 of the second ring segment 122*b* with respect to the axial side 168*b* of the second ring segment 122*b*. As such, spurs 124 of ring segment 122*a* will axially align with spurs 124 of ring segment 122*b* if the ring segment 122*b* is flipped about the flip axis FA from its operating position such that the axial side 168*a* of ring segment 122*a* and the axial side 168*b* of ring segment 122*b* are oriented to face each other. The positions associated with the first ring segment 122*a* are the flip mirror of the positions associated with the second ring segment 122*b* such that the positions of the return faces 154 of the return interface surface 140 of the ring segment 122*a* with respect to the axial side 168*a* of the first ring segment 122*a* are the same as the positions of the return faces 154 of the return interface surface 140 of the second ring segment 122*b* with respect to both of the axial sides 168*a*, 168*b* of the second ring segment 122*b*. For example, the return faces 154 of ring segment 122*a* will axially align with the return faces 154 of ring segment 122*b* if the ring segment 122*b* is positioned such that axial side 168*a* of ring segment 122*b* faces towards or away from axial side 168*a* of ring segment 122*a*. The return faces 154 of the ring segments 122*a*, 122*b* can align regardless of whether the spurs 124 are aligned or misaligned.

The spurs 124 of the first ring segment 122*a* are configured to flux couple with the spurs 124 of the second ring segment 122*b* to electromagnetically interact with the permanent magnets 158 by way of the concentrators 160 of the complementary rotor phase 54 (e.g., rotor phase 54*a* if ring segments 122*a*, 122*b* are part of stator phase 42*a*). The spurs 124 of ring segment 122*a* can form part of the annular array of spurs 124 of a first flux ring 44 of a first stator phase 42 while the spurs 124 of ring segment 122*b* can form part of the annular array of spurs 124 of a second flux ring 44 of the first stator phase 42.

The flip mirror configuration of ring segment 122 provides significant advantages. A single configuration of ring segment 122 can be used to form each arcuate part of both the first and second flux rings 44 of a stator phase 42. The configuration of ring segment 122 thereby reduces part counts, simplifying manufacturing and speeding up the assembly process. The configuration of ring segment 122 provides improved efficiency and cost savings. The configuration of ring segment 122 facilitates utilizing the same configuration of stator phase 42 for each stator phase 42 of motor 12. Having the same configuration for each stator phase 42 facilitates alignment of spurs 124 across stator phases 42, allowing for the misaligned magnet phases 58. The configuration of each ring segment 122 thereby facilitates the smooth torque profile and compact configuration of motor 12.

FIG. 12 is an enlarged end view of a portion of stator phase 42*a*. The interface between adjacent ring segments 122 of a first flux ring 44*a* of the stator phase 42 is shown. Coil 46 is disposed axially between flux ring 44*a* and flux ring 44*b*. As shown, a first portion of coil 46 is disposed axially between segment bodies 134 of the ring segments 122 of the opposing flux ring 44*a*, 44*b*, and a second portion of coil 46 is disposed axially between spurs 124 of the opposing flux ring 44. Coil 46 is recessed from the distal ends of spurs 124. In the example shown, the inner radial side of coil 46 is spaced radially outward of radial faces 164. The coil 46 can be spaced radially from plateaus 162 such that the radial side of each plateau 162 opposite radial face 164 can be disposed at a radial location between coil 46 and air gap 60.

The circumferential gap 150 between adjacent ring segments 122 of flux ring 44*a* is shown. Bulbs 156 are formed as circumferentially enlarged portions of the circumferential gap 150. Bulbs 156 are formed by the opposed axial grooves forming depressions 144 on the circumferential ends 142*a*, 142*b* defining circumferential gap 150. Circumferential gap 150, including bulbs 156, is configured to be filled with potting compound. The adjacent ring segments 122 do not directly contact each other. Instead, circumferential gap 150 maintains physical separation between the adjacent ring segments 122. The physical separation provided by circumferential gap 150 electrically separates the adjacent ring segments 122, thereby reducing heat generation and preventing the formation of eddy currents. Circumferential gap 150 is bridged only by potting compound and not by any other physical link between the adjacent ring segments 122.

As shown, notches 170 of flux ring 44*a* axially align with notches 170 of flux ring 44*b*. More specifically, notch 170*a* of the ring segment 122 on first flux ring 44*a* axially aligns with the notch 170*b* of the ring segment 122 on the second flux ring 44*b*; notch 170*b* of the ring segment 122 on first flux ring 44*a* axially aligns with the notch 170*a* of the ring segment 122 on the second flux ring 44*b*; and notch 170*c* of the ring segment 122 on first flux ring 44*a* axially aligns with the notch 170*c* of the ring segment 122 on the second flux ring 44*b* (alignment of notches 170*c* shown in FIG. 9A). The axial alignment between notches 170 of the ring segments 122 of the opposing flux rings 44*a*, 44*b* facilitates ease of manufacturing and assembly. The aligned notches 170 form a mounting groove that can engage a standoff and align the opposing flux rings 44*a*, 44*b* axially relative to each other, in the flip mirror configuration. Engagement with a standoff may be necessary during the potting procedure and having a standoff at the notches 170, set back from the radial faces 164, moves the area put at risk for corrosion or debris collection away from the radial face 164 and away from the air gap 60, thereby decreasing the likelihood of abrasion or other damage and providing a more robust motor 12 configuration. The notches 170 and/or mounting groove 174 can form one or more depressions (e.g., edge depression 176 shown in FIGS. 13A and 13B) extending into a surface of the potting compound. In the example shown, the one or more depressions are formed on the inner radial side of the potting compound (e.g., in the first edge 126 of the potting compound). The one or more depressions can be partially or completely devoid of potting compound. The one or more depressions can be co-located with notches 170 and/or extend axially, such as along mounting grooves 174. As such, while radial faces 164 are fully embedded in potting compound, a portion of the laminate structure may be exposed to the air gap 60, at a location spaced radially towards axial returns 48 from radial faces 164. A portion of spur 124 forming a notch 170 can be exposed to the air gap 60 within the depression (e.g., within edge depression 176).

As shown, spurs 124 of the opposing flux rings 44*a*, 44*b* are axially misaligned relative to each other. The spurs 124 of flux ring 44*a* are positioned within the circumferential gaps between troughs of the opposing flux ring 44*b*. The spurs 124 of flux ring 44*a* are positioned such that the plateau 162 is fully within the trough 136 of the opposing flux ring 44*b* and the plateau 162 is not axially overlapped by any laminate structure of flux ring 44*b*. The spurs 124 of flux ring 44*b* are positioned similar to the spurs 124 of flux ring 44*a* such that the plateaus 162 of the spurs 124 of flux ring 44*b* are fully within the troughs 136 of the opposing flux ring 44*a* and not axially overlapped by any laminate structure of flux ring 44*a*. In the example shown, the plateaus 162 are disposed radially inward from coils 46, such that the plateaus 162 do not axially overlap with coil 46 or other laminate structure of stator phase 42a. Radial faces 164 are thereby positioned in the gaps between troughs 136. Positioning radial faces 164 fully within the gaps between troughs 136 facilitates flux pairing between desired ones of spurs 124 of the opposing flux rings 44a, 44b.

FIG. 13A is an end elevation view of ring segment 122 showing inner potting compound edge 126. FIG. 13B is an enlarged view of detail B in FIG. 13A. FIGS. 13A and 13B will be discussed together. In the example shown, ring segment 122 is configured such that the distal ends of each spur 124 are covered by a layer of potting compound. As such, each radial face 164 is entirely covered by and embedded within potting compound. The air gap 60 between ring segment 122 and rotor 30 is thereby defined on at least one side by potting compound.

The continuous matrix of potting compound extends radially beyond the radial faces 164. The first edge 126 is disposed radially inward of radial faces 164 such that first edge 126, and not radial faces 164, defines the air gap 60. The thin layer of potting compound disposed across the radial faces 164 is more than a mere coating that happens to be applied to the distal end of spur 124 during the potting process. Instead, the layer of potting compound forms the first edge 126 of the continuous matrix of potting compound that embeds ring segment 122 and defines air gap 60. The first edge 126 can be cylindrical and is configured to define the air gap 60 such that no radial face 164 of any spur 124 is exposed to the air gap 60. First edge 126 defining the air gap 60 shields radial faces 164 from the air gap 60, preventing contact with any undesired contaminant (e.g., dust, debris, etc.) that may enter into air gap 60. First edge 126 is a smooth edge formed by the potting compound, which prevents accumulation of contaminant on first edge 126, preventing undesired narrowing of air gap 60 during operation.

While the entirety of each radial face 164 is covered by potting compound, some embodiments include portions of ring segment 122 that may be exposed outside of the potting compound. Notches 170 provide locations for directly engaging with ring segment 122 during the potting process, but at locations not circumferentially aligned with first edge 126. Directly engaging ring segment 122 provides greater control during the potting process, facilitating formation of a smaller air gap 60, which increases the operating efficiency of motor 12. Notch projection 178 is recessed within the trough 136 such that notch projection 178 is spaced radially from radial face 164. Notches 170 are also circumferentially offset from radial faces 164, further facilitating embedding radial faces 164 fully within the potting compound.

Recessing notch projection 178 from first edge 126 and radial face 164 can form edge depression 176 (e.g., within mounting groove 174) in the potting compound. For example, the portion of ring segment 122 defining notches 170 may not be covered in potting compound and thus may be exposed. Edge depression 176 can be formed in first edge 126 at a location radially and/or axially aligned with a notch 170. Edge depression 176 extends into the continuous matrix of potting compound such that a cylinder defined by first edge 126 can have a slightly larger diameter at edge depression 176 than at other locations along first edge 126. Edge depression 176 can provide a location to capture debris or other contaminants to prevent accumulation within the air gap 60. The notches 170 can thereby increase the operational life of motor 12 by preventing contaminant ingress and damage.

As shown in FIG. 13B, notch projection 178 extends circumferentially from spur side 166b of spur 124. It is understood that, in some examples, notch projection 178 can extend from spur side 166a. Notch projection 178 at least partially defines notch 170c formed on that spur 124. In the example shown, notch projection 178 projects circumferentially outward at the interface between spur side 166b and plateau 162. Notch projection 178 defines a support surface configured to interface with the standoff to position ring segment 122. In the example shown, each notch 170a-170c is an open notch open on at least one circumferential side of its supporting spur 124. It is understood, however, that notches 170 can be formed in any desired manner suitable for forming an interfacing to support ring segment 122, such as during potting.

While the electric machines of this disclosure are discussed in the context of a fan system, it is understood that electric machines and controls can be utilized in a variety of contexts and systems and are not limited to those discussed. Any one or more of the electric machines discussed can be utilized alone or in unison with one or more additional electric machines to provide mechanical output from an electric signal input for any desired purpose. Further, while electric machine 12 is generally discussed as being an electric motor, electric machine 12 can be of any desired form, such as a generator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. An electric motor comprising:
a rotor configured to rotate on a rotational axis to generate a mechanical output, the rotor comprising a rotor body and a permanent magnet array; and
a stator spaced radially relative to the rotor and disposed about the rotational axis, the stator comprising:
a stator phase formed from a first pair of flux rings, a first coil disposed axially between the first pair of flux rings, and an annular array of axial returns extending between the first pair of flux rings to electromagnetically connect the first pair of flux rings;
wherein a first flux ring of the pair of flux rings includes a plurality of first ring segments disposed circumferentially about the rotor axis, wherein each first ring segment of the plurality of first ring segments is spaced circumferentially from each adjacent first ring segment of the plurality of first ring segments by a first circumferential gap to form a plurality of first circumferential gaps in the first flux ring; and
wherein the plurality of first ring segments are at least partially embedded in potting compound and the plurality of first ring segments are not directly connected to a common metallic link.
2. The electric motor of claim 1, wherein each of the plurality of first circumferential gaps is bridged only by the potting compound.
3. The electric motor of claim 2, wherein each first ring segment of the plurality of first ring segments is suspended in the potting compound such that the plurality of first ring segments are not directly connected by metallic structure.

4. The electric motor of claim 1 wherein each first ring segment of the plurality of first ring segments includes a first smoothly contoured circumferential face and a second smoothly contoured circumferential face.

5. The electric motor of claim 1, wherein each first ring segment of the plurality of first ring segments is electrically isolated from all other first ring segments of the plurality of first ring segments forming the first flux ring.

6. The electric motor of claim 1, wherein the potting compound fills the plurality of first circumferential gaps.

7. The electric motor of claim 6, wherein each of the plurality of first circumferential gaps between adjacent ones of the plurality of first ring segments varies in separation distance between the adjacent ones of the plurality of first ring segments.

8. The electric motor of claim 7, wherein the potting compound filling the plurality of first circumferential gaps forms at least one enlargement in a first one of the plurality of first circumferential gaps between a first segment pair of the adjacent ones of the plurality of first ring segments, and wherein the at least one enlargement has a first circumferential width larger than a mean circumferential width of the first one of the plurality of first circumferential gaps.

9. The electric motor of claim 1, wherein a second flux ring of the pair of flux rings includes a plurality of second ring segments disposed circumferentially about the rotor axis, wherein each second ring segment of the plurality of second ring segments is spaced circumferentially from each adjacent second ring segment of the plurality of second ring segments by a second circumferential gap to form a plurality of second circumferential gaps in the second flux ring.

10. The electric motor of claim 9, wherein a first subset of axial returns of the annular array of axial returns extend between and electromagnetically connect a first ring segment of the first flux ring and a second ring segment of the second flux ring.

11. The electric motor of claim 10, wherein the first ring segment includes a first interface surface and the second ring segment includes a second interface surface, the first interface surface axially aligned with the second interface surface, and wherein each axial return of the first subset of axial returns extends between and contacts the first interface surface and the second interface surface.

12. The electric motor of claim 9, wherein:
the first ring segment includes a first segment body and a first arcuate array of first spurs; and
the second ring segment includes a second segment body and a second arcuate array of second spurs.

13. The electric motor of claim 12, wherein the first spurs are canted in a first circumferential direction.

14. The electric motor of claim 13, wherein the second spurs are canted in a second circumferential direction opposite the first circumferential direction.

15. The electric motor of claim 14, wherein each first spur of the first spurs has a swept profile by having a first side surface angled relative to a second side surface such that the first side surface has a larger surface area relative to the second side surface, and wherein the first side surface is disposed on a first circumferential side of the first spur and the second side surface is disposed on a second circumferential side of the first spur.

16. The electric motor of claim 14, wherein:
the first ring segment is oriented relative to the second ring segment such that the first spurs are axially aligned with second troughs between the second spurs; and
the second spurs are axially aligned with first troughs between the first spur.

17. The electric motor of claim 9, wherein the first ring segment has a base configuration, the second ring segment has the base configuration, and the second flux ring is formed with the second ring segment flipped about a radial axis to be in a second configuration different from the base configuration.

18. A stator phase for an electric motor, the stator phase comprising:
a first flux ring having a plurality of first spurs disposed in a first annular array about an axis;
a second flux ring having a plurality of second spurs disposed in a second annular array about the axis;
a first coil disposed axially between the first flux ring and the second flux ring and extending annularly about the axis;
an axial return extending between the first flux ring and the second flux ring, wherein a return array formed by a plurality of the axial returns extends about the axis;
wherein the first flux ring is formed by a first laminate stack, the second flux ring is formed by a second laminate stack, and the axial return is formed by a third laminate stack; and
wherein the stator phase includes a first laminate boundary on a first radial side of the stator phase and a second laminate boundary on a second radial side of the stator phase; and
wherein the second laminate boundary is at least partially defined by the axial return.

19. An electric motor comprising:
a rotor configured to rotate on a motor axis to generate a mechanical output, the rotor comprising a rotor body and a permanent magnet array; and
a stator spaced radially relative to the rotor and disposed about the motor axis, the stator comprising:
a first stator phase formed from a first flux ring, a second flux ring, a first coil disposed axially between the first flux ring and the second flux ring, and a first annular array of axial returns extending between the first flux ring and the second flux ring to electromagnetically connect the first flux ring and the second flux ring;
wherein potting compound extends radially between a first radial compound edge and a second radial compound edge;
wherein the second radial compound edge is disposed directly between the first annular array of axial returns and an inner wall of a stator housing of the stator at an axial location of the first flux ring; and
wherein the first radial compound edge is disposed radially between a first laminate stack forming the first flux ring and the permanent magnet array.

20. An electric motor comprising:
a rotor configured to rotate on a rotational axis to generate a mechanical output, the rotor comprising a rotor body and a permanent magnet array; and
a stator spaced radially relative to the rotor and disposed about the rotational axis, the stator comprising:
a stator phase formed from a first pair of flux rings, a first coil disposed axially between the first pair of flux rings, and an annular array of axial returns extending between the first pair of flux rings to electromagnetically connect the first pair of flux rings;
wherein a first flux ring of the pair of flux rings includes a plurality of first ring segments disposed circumferentially about the rotor axis, wherein each first ring segment of the plurality of first ring segments is spaced circumferentially from each adjacent first ring segment of the plurality of first ring segments by a first circumferential gap to form a plurality of first circumferential gaps in the first flux ring; and wherein the plurality of first ring segments are at least partially embedded in potting compound and not connected together by metal laminate structure.

* * * * *